US012726845B2

(12) United States Patent
Zhou et al.

(10) Patent No.: US 12,726,845 B2
(45) Date of Patent: Sep. 1, 2026

(54) CHANNEL STATE INFORMATION REPORT FOR MOBILITY ENHANCEMENT

(71) Applicant: Ofinno, LLC, Reston, VA (US)

(72) Inventors: Hua Zhou, Vienna, VA (US); Ali Cagatay Cirik, Chantilly, VA (US); Esmael Hejazi Dinan, McLean, VA (US); Hyoungsuk Jeon, Centreville, VA (US); Gautham Prasad, Herndon, VA (US); Taehun Kim, Fairfax, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/263,642

(22) Filed: Jul. 9, 2025

(65) Prior Publication Data

US 2025/0338161 A1 Oct. 30, 2025

Related U.S. Application Data

(63) Continuation of application No. PCT/US2024/012301, filed on Jan. 22, 2024.

(Continued)

(51) Int. Cl.
*H04W 24/10* (2009.01)
*H04B 17/318* (2015.01)

(52) U.S. Cl.
CPC .......... *H04W 24/10* (2013.01); *H04B 17/328* (2023.05)

(58) Field of Classification Search
CPC ............................ H04W 24/10; H04B 17/328
See application file for complete search history.

(56) References Cited

U.S. PATENT DOCUMENTS

2021/0298038 A1 9/2021 Kang et al.
2022/0124526 A1* 4/2022 Lee .................. H04W 36/0072

(Continued)

FOREIGN PATENT DOCUMENTS

WO 2021/161224 A1 8/2021
WO WO-2023216182 A1 * 11/2023 ........... H04L 5/0048

(Continued)

OTHER PUBLICATIONS

3GPP TS 38.133 V17.4.0 (Dec. 2021); Technical Specification; 3rd Generation Partnership Project; Technical Specification Group Radio Access Network; NR; Requirements for support of radio resource management; (Release 17).

(Continued)

*Primary Examiner* — Charles C Jiang
*Assistant Examiner* — Ryan C Kavleski
(74) *Attorney, Agent, or Firm* — James Bender; Kavon Nasabzadeh; Jacob L. Mangan

(57) ABSTRACT

A wireless device transmits radio resource control (RRC) messages comprising capability parameters indicating support, for a layer 1 and/or layer 2 triggered mobility (LTM) procedure and within a measurement window, for synchronization signal block (SSB) based inter-frequency layer 1 reference signal received power (RSRP) measurement of a candidate cell with a received time difference, between the candidate cell and a serving cell, larger than a cyclic prefix (CP) length. The device receives RRC messages indicating a measurement window. The device receives a command indicating an uplink transmission of a L1 RSRP report of the candidate cell. The first cell and the candidate cell are inter-frequency configured. The device transmits the L1 RSRP report measured over one or more first SSBs of the candidate cell. The first SSBs are received: via the candidate (Continued)

cell with the received time difference being greater than the CP length, and within the measurement window.

20 Claims, 48 Drawing Sheets

Related U.S. Application Data

(60) Provisional application No. 63/440,155, filed on Jan. 20, 2023.

(56) References Cited

U.S. PATENT DOCUMENTS

2024/0015615 A1 1/2024 Li et al.
2024/0163752 A1 5/2024 Cui et al.
2024/0187954 A1* 6/2024 Zhou .................. H04W 72/232
2025/0071648 A1* 2/2025 Hong ................ H04W 36/0058

FOREIGN PATENT DOCUMENTS

WO WO-2024092605 A1 * 5/2024 ........ H04W 36/0085
WO 2024/148531 A1 7/2024

OTHER PUBLICATIONS

3GPP TS 38.211 V17.1.0 (Mar. 2022); Technical Specification; 3rd Generation Partnership Project; Technical Specification Group Radio Access Network; NR; Physical channels and modulation; (Release 17).
3GPP TS 38.212 V17.1.0 (Mar. 2022); Technical Specification; 3rd Generation Partnership Project; Technical Specification Group Radio Access Network; NR; Multiplexing and channel coding; (Release 17).
3GPP TS 38.213 V17.1.0 (Mar. 2022); Technical Specification; 3rd Generation Partnership Project; Technical Specification Group Radio Access Network; NR; Physical layer procedures for control (Release 17).
3GPP TS 38.214 V17.1.0 (Mar. 2022); Technical Specification; 3rd Generation Partnership Project; Technical Specification Group Radio Access Network; NR; Physical layer procedures for data; (Release 17).
3GPP TS 38.215 V17.1.0 (Mar. 2022); Technical Specification; 3rd Generation Partnership Project; Technical Specification Group Radio Access Network; NR; Physical layer measurements; (Release 17).
3GPP TS 38.300 V16.7.0 (Sep. 2021); Technical Specification; 3rd Generation Partnership Project; Technical Specification Group Radio Access Network; NR; NR and NG-RAN Overall Description; Stage 2; (Release 16).
3GPP TS 38.321 V17.0.0 (Mar. 2022); Technical Specification; 3rd Generation Partnership Project; Technical Specification Group Radio Access Network; NR; Medium Access Control (MAC) protocol specification; (Release 17).
3GPP TS 38.331 V16.7.0 (Dec. 2021); Technical Specification; 3rd Generation Partnership Project; Technical Specification Group Radio Access Network; NR; Radio Resource Control (RRC) protocol specification; (Release 16).
3GPP TSG RAN WG1 #111; Toulouse, France, Nov. 14-18, 2022; Title: RAN1 Chair's Notes.
R1-2210008; 3GPP TSG RAN WG1 Meeting #110-Bis-e; Oct. 10-19, 2022; Agenda item: 9.12.1; Source: Qualcomm Incorporated; Title: L1 Enhancements for Inter-Cell Beam Management; Document for: Discussion/Decision.
R1-2210897; 3GPP TSG-RAN WG1 Meeting #111; Toulouse, France, Nov. 14-18, 2022; Agenda Item: 9.12.1; Source: Huawei, HiSilicon; Title: L1 enhancements for inter-cell beam management; Document for: Discussion and Decision.
R1-2210942; 3GPP TSG RAN WG1 #111; Toulouse, France, Nov. 14-18, 2022; Source: ZTE; Title: L1 enhancements for inter-cell beam management; Agenda Item: 9.12.1; Document for: Discussion and Decision.
R1-2211028; 3GPP TSG RAN WG1 #111; Toulouse, France, Nov. 14-18, 2022; Source: vivo; Title: Discussion on L1 enhancements for L1/L2 mobility; Agenda Item: 9.12.1; Document for: Discussion and Decision.
R1-2211053; 3GPP TSG-RAN WG1 Meeting #111Tdoc; Toulouse, France, Nov. 14-18, 2022; Agenda Item: 9.12.1; Source: Ericsson; Title: L1 enhancements to inter-cell beam management; Document for: Discussion.
R1-2211083; 3GPP TSG RAN WG1 Meeting #111; Toulouse, France, Nov. 14-18, 2022; Source: Fujitsu; Title: Views on L1 enhancements for inter-cell beam management; Agenda Item: 9.12.1; Document for: Discussion and Decision.
R1-2211130; 3GPP TSG RAN WG1 #111; Toulouse, France, Nov. 14-18, 2022; Agenda Item: 9.12.1; Source: Google; Title: On Inter-Cell Beam Management Enhancement for NR Mobility; Document for: Discussion/Decision.
R1-2211180; 3GPP TSG RAN WG1 #111; Toulouse, France, Nov. 14-18, 2022; Source: CATT; Title: Discussion on L1 enhancements for inter-cell beam management; Agenda Item: 9.12.1; Document for: Discussion and Decision.
R1-2211250; 3GPP TSG RAN WG1 #111; Toulouse, France, Nov. 14-18, 2022; Agenda item: 9.12.1; Source: Spreadtrum Communications; Title: Discussion on L1 enhancements for inter-cell beam management; Document for: Discussion and decision.
R1-2211297; 3GPP TSG RAN WG1#111; Toulouse, France, Nov. 14-18, 2022; Agenda Item: 9.12.1; Source: Lenovo; Title: Discussion on L1 enhancements for inter-cell beam management; Document for: Discussion.
R1-2211306; 3GPP TSG RAN WG1 #111; Toulouse, France, Nov. 14-18, 2022; Agenda item: 9.12.1; Source: Nokia, Nokia Shanghai Bell; Title: Discussion on L1 enhancements for L1/L2-triggered mobility; Document for: Discussion and Decision.
R1-2211322; 3GPP TSG RAN WG1 #111; Toulouse, France, Nov. 14-18, 2022; Agenda Item: 9.12.1; Source: InterDigital, Inc.; Title: L1 enhancements for inter-cell beam management; Document for: Discussion and Decision.
R1-2211346; 3GPP TSG RAN WG1 #110; Meeting, Nov. 14-18, 2022; Agenda Item: 9.12.1; Source: Xiaomi; Title: Discussion on L1 enhancements for inter-cell beam management; Document for: Discussion and Decision.
R1-2211418; 3GPP TSG RAN WG1 #111; Toulouse, France, Nov. 14-18, 2022; Source: Intel Corporation; Title: L1 Enhancements for Inter-cell Beam Management; Agenda item: 9.12.1; Document for: Discussion and Decision.
R1-2211440; 3GPP TSG RAN WG1 #111; Toulouse, Nov. 14-18, 2022; Source: OPPO; Title: Discussions on Inter-cell beam management enhancement; Agenda Item: 9.12.1; Document for: Discussion and Decision.
R1-2211702; 3GPP TSG RAN WG1 #111; Toulouse, France, Nov. 14-18, 2022; Source: CMCC; Title: Discussion on L1 enhancements for inter-cell beam management; Agenda Item: 9.12.1; Document for: Discussion and Decision.
R1-2211753; 3GPP TSG RAN WG1 #111; Toulouse, France, Nov. 14-18, 2022; Agenda item: 9.12.1; Source: NEC; Title: Discussion on L1 enhancements for inter-cell beam management; Document for: Discussion and Decision.
R1-2211832; 3GPP TSG RAN WG1 #111; Toulouse, France, Nov. 14-18, 2022; Source: Apple Inc.; Title: L1 enhancements to inter-cell beam management; Agenda item: 9.12.1; Document for: Discussion and Decision.
R1-2211873; 3GPP TSG RAN WG1 #111; Toulouse, France, Nov. 14-18, 2022; Agenda item: 9.12.1; Source: LG Electronics; Title: Enhancements on inter-cell beam management for mobility; Document for: Discussion and Decision.
R1-2212004; 3GPP TSG RAN WG1 #111; Toulouse, France, Nov. 14-18, 2022; Source: NTT Docomo, Inc.; Title: Discussion on L1 enhancements for inter-cell mobility; Agenda Item: 9.12.1; Document for: Discussion and Decision.

(56) References Cited

OTHER PUBLICATIONS

R1-2212068; 3GPP TSG RAN WG1 #111; Toulouse, France, Nov. 14-Nov. 18, 2022; Agenda item: 9.12.1; Source: Samsung; Title: On L1 enhancements for inter-cell beam management; Document for: Discussion and Decision.
R1-2212140; 3GPP TSG RAN WG1 Meeting #111; Nov. 14-18, 2022; Toulouse, France; Agenda item: 9.12.1; Source: Qualcomm Incorporated; Title: L1 Enhancements for Inter-Cell Beam Management; Document for: Discussion/Decision.
R1-2212235; 3GPP TSG RAN WG1 #111; Toulouse, France, Nov. 14-18, 2022; Agenda item: 9.12.1; Title: L1 enhancements for inter-cell beam management; Source: MediaTek Inc.; Document for: Discussion.
R1-2212850; 3GPP TSG RAN WG1 #111; Toulouse, France, Nov. 14-18, 2022; Title: Session notes for 9.12 (Further NR mobility enhancements); Source: Ad-hoc Chair (CMCC).
R1-2210801; 3GPP TSG RAN WG1 Meeting #111; Toulouse, France, Nov. 14-18, 2022; Source: MCC Support; Title: Final Report of 3GPP TSG RAN WG1 #110bis-e v1.0.0; (Online, Oct. 10-19, 2022); Document for: Approval.
R1-2210414; 3GPP TSG RAN WG1 Meeting #110bis-e; e-Meeting, Oct. 10-19, 2022 ; Source: Moderator (Fujitsu); Title: FL summary 1 on L1 enhancements for inter-cell beam management; Agenda Item: 9.12.1; Document for: Information.
R1-2212946; 3GPP TSG RAN WG1 Meeting #111; Toulouse, France, Nov. 14-18, 2022 ; Source: Moderator (Fujitsu); Title: Final FL summary on L1 enhancements for inter-cell beam management; Agenda Item: 9.12.1; Document for: Information.
R1-2305128; 3GPP TSG RAN WG1 Meeting #113; Incheon, Korea, May 22-26, 2023; Source: Moderator (Fujitsu, MediaTek); Title: FL summary 1 on L1 enhancements for inter-cell beam management; Agenda Item: 9.10.1; Document for: Information.
International Search Report and Written Opinion of the International Searching authority mailed May 7, 2024, in International Application No. PCT/US2024/012301.
R2-2212815; 3GPP TSG-RAN WG2 Meeting #120; Toulouse, France, Nov. 14-18, 2022; Agenda item: 8.4.2.1.1 (Characteristics and scenarios); Source: Samsung; Title: Discussion on potential aspects for enhancement on LTM; Document for: Discussion & Decision.
R1-2212948; 3GPP TSG RAN WG1 #111; Toulouse, France, Nov. 14-18, 2022; Title: LS on RAN1 agreements for L 1/L2-based inter-cell mobility.
European Office Action mailed Nov. 12, 2025 in EP Patent Application No. 24706653.3.

* cited by examiner

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 2_7 | Notifying Paging early indication and TRS availability indication for one or more UEs |
| 3_0 | Scheduling of NR sidelink in one cell |
| 3_1 | Scheduling of LTE sidelink in one cell |
| 4_0 | Scheduling of PDSCH with CRC scrambled by MCCH-RNTI/G-RNTI for broadcast |
| 4_1 | Scheduling of PDSCH with CRC scrambled by G-RNTI/G-CS-RNTI for multicast |
| 4_2 | Scheduling of PDSCH with CRC scrambled by G-RNTI/G-CS-RNTI for multicast |

FIG. 23

```
MIB ::=                        SEQUENCE {
   systemFrameNumber              BIT STRING (SIZE (6)),
   subCarrierSpacingCommon        ENUMERATED {scs15or60, scs30or120},
   ssb-SubcarrierOffset           INTEGER (0..15),
   dmrs-TypeA-Position            ENUMERATED {pos2, pos3},
   pdcch-ConfigSIB1               PDCCH-ConfigSIB1,
   cellBarred                     ENUMERATED {barred, notBarred},
   intraFreqReselection           ENUMERATED {allowed, notAllowed},
   spare                          BIT STRING (SIZE (1))}

PDCCH-ConfigSIB1 ::=           SEQUENCE {
   controlResourceSetZero         ControlResourceSetZero,
   searchSpaceZero                SearchSpaceZero}
```

FIG. 24A

| Index | SS/PBCH block and CORESET multiplexing pattern | Number of RBs per coreset | Number of Symbols per coreset | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| ... | ... | ... | ... | ... |

FIG. 24B

| Index | *O* | Number of search space sets per slot | *M* | First symbol index |
|---|---|---|---|---|
| 0 | 0 | 1 | 1 | 0 |
| 1 | 0 | 2 | 1/2 | {0, if *i* is even}, {*N*, if is odd} |
| 2 | 2 | 1 | 1 | 0 |
| 3 | 2 | 2 | 1/2 | {0, if *i* is even}, {*N*, if *i* is odd} |
| 4 | 5 | 1 | 1 | 0 |
| 5 | 5 | 2 | 1/2 | {0, if *i* is even}, *N*, if *i* is odd |
| 6 | 7 | 1 | 1 | 0 |
| 7 | 7 | 2 | 1/2 | {0, if *i* is even}, {*N*, if *i* is odd} |
| ... | ... | ... | ... | ... |

FIG. 24C

```
SIB1 ::=      SEQUENCE {
   cellSelectionInfo             SEQUENCE {
      q-RxLevMin                    Q-RxLevMin,
      q-RxLevMinOffset               INTEGER (1..8) ...}
   cellAccessRelatedInfo          CellAccessRelatedInfo,
   connEstFailureControl          ConnEstFailureControl
   si-SchedulingInfo             SI-SchedulingInfo
   servingCellConfigCommon           ServingCellConfigCommonSIB
   ims-EmergencySupport            ENUMERATED {true}
   eCallOverIMS-Support           ENUMERATED {true}
   ue-TimersAndConstants           UE-TimersAndConstants
   uac-BarringInfo               SEQUENCE { ...}
   useFullResumeID                ENUMERATED {true}
   lateNonCriticalExtension        OCTET STRING
   nonCriticalExtension           SIB1-v16xy-IEs  }

ServingCellConfigCommonSIB ::=     SEQUENCE {
   downlinkConfigCommon             DownlinkConfigCommonSIB,
   uplinkConfigCommon             UplinkConfigCommonSIB
   supplementaryUplink            UplinkConfigCommonSIB
   n-TimingAdvanceOffset           ENUMERATED { n0, n25600, n39936 }
   ssb-PositionsInBurst          SEQUENCE {
      inOneGroup                 BIT STRING (SIZE (8)),
      groupPresence               BIT STRING (SIZE (8)) },
   ssb-PeriodicityServingCell      ENUMERATED {ms5, ms10, ms20, ms40, ms80, ms160},
   tdd-UL-DL-ConfigurationCommon     TDD-UL-DL-ConfigCommon
   ss-PBCH-BlockPower              INTEGER (-60..50),
   ...,}

DownlinkConfigCommonSIB ::=    SEQUENCE {
   frequencyInfoDL              FrequencyInfoDL-SIB,
   initialDownlinkBWP            BWP-DownlinkCommon,
   bcch-Config                  BCCH-Config,
   pcch-Config                  PCCH-Config,  ...}

PCCH-Config ::=          SEQUENCE {
   defaultPagingCycle             PagingCycle,
   nAndPagingFrameOffset             CHOICE {
      oneT                       NULL,
      halfT                     INTEGER (0..1), ...},
   ns                        ENUMERATED {four, two, one},
   firstPDCCH-MonitoringOccasionOfPO   CHOICE {
      sCS15KHZoneT       SEQUENCE (SIZE (1..maxPO-perPF)) OF INTEGER (0..139),...}
   ...,
   [[   nrofPDCCH-MonitoringOccasionPerSSB-InPO-r16  INTEGER (2..4)  ]]
}
```

FIG. 25

```
BWP-DownlinkCommon ::=          SEQUENCE {
   genericParameters            BWP,
   pdcch-ConfigCommon           SetupRelease { PDCCH-ConfigCommon }
   pdsch-ConfigCommon           SetupRelease { PDSCH-ConfigCommon }
   ...}

PDCCH-ConfigCommon ::=          SEQUENCE {
   controlResourceSetZero       ControlResourceSetZero
   commonControlResourceSet     ControlResourceSet
   searchSpaceZero              SearchSpaceZero
   commonSearchSpaceList        SEQUENCE (SIZE(1..4)) OF SearchSpace
   searchSpaceSIB1              SearchSpaceId
   searchSpaceOtherSystemInformation  SearchSpaceId
   pagingSearchSpace            SearchSpaceId
   ra-SearchSpace               SearchSpaceId
    [[
   firstPDCCH-MonitoringOccasionOfPO  CHOICE {
      sCS15KHZoneT    SEQUENCE (SIZE (1..maxPO-perPF)) OF INTEGER (0..139),
      ...
   }OPTIONAL    -- Cond OtherBWP
    ]]
   ...,}

PDCCH-ServingCellConfig ::=     SEQUENCE {
   slotFormatIndicator          SetupRelease { SlotFormatIndicator }...,
   [[
   availabilityIndicator-r16    SetupRelease {AvailabilityIndicator-r16}
   searchSpaceSwitchTimer-r16   INTEGER (1..80)
   ]]
}

SearchSpaceSwitchConfig-r16 ::=   SEQUENCE {
   cellGroupsForSwitchList-r16    SEQUENCE(SIZE (1..4)) OF CellGroupForSwitch-r16
   searchSpaceSwitchDelay-r16     INTEGER (10..52)
}
CellGroupForSwitch-r16 ::= SEQUENCE(SIZE (1..16)) OF ServCellIndex

ControlResourceSet ::=          SEQUENCE {
   controlResourceSetId         ControlResourceSetId,
   frequencyDomainResources     BIT STRING (SIZE (45)),
   duration                     INTEGER (1..maxCoReSetDuration),
   cce-REG-MappingType          CHOICE {
      interleaved               SEQUENCE {
         reg-BundleSize         ENUMERATED {n2, n3, n6},
         interleaverSize        ENUMERATED {n2, n3, n6},
         shiftIndex             INTEGER(0..maxNrofPhysicalResourceBlocks-1)},
      nonInterleaved            NULL},
   precoderGranularity          ENUMERATED {sameAsREG-bundle, allContiguousRBs},
   pdcch-DMRS-ScramblingID      INTEGER (0..65535)
   ...,  }
```

FIG. 26

```
SearchSpace ::=                    SEQUENCE {
  searchSpaceId                      SearchSpaceId,
  controlResourceSetId                 ControlResourceSetId
  monitoringSlotPeriodicityAndOffset      CHOICE {
    sl1                             NULL,
    sl2                             INTEGER (0..1),...}
  duration                          INTEGER (2..2559)
  monitoringSymbolsWithinSlot            BIT STRING (SIZE (14))
  nrofCandidates                     SEQUENCE {
    aggregationLevel1                  ENUMERATED {n0, n1, n2, ... n8},
    aggregationLevel2                  ENUMERATED {n0, n1, n2, ... n8},
    ...}
  searchSpaceType                    CHOICE {
    common                          SEQUENCE {
      dci-Format0-0-AndFormat1-0          SEQUENCE {...}
      dci-Format2-0                   SEQUENCE {
        nrofCandidates-SFI               SEQUENCE {
          aggregationLevel1               ENUMERATED {n1, n2}
          aggregationLevel2               ENUMERATED {n1, n2}...},
        ...}
      dci-Format2-1                   SEQUENCE {...}
...
    },
    ue-Specific                      SEQUENCE {
      dci-Formats       ENUMERATED {formats0-0-And-1-0, formats0-1-And-1-1},
      ...,}
  }
}

SearchSpaceExt-r16 ::=              SEQUENCE {
  controlResourceSetId-r16             ControlResourceSetId-r16
  searchSpaceType-r16                 SEQUENCE {
    common-r16                      SEQUENCE {
      dci-Format2-4-r16                 SEQUENCE {
        nrofCandidates-CI-r16              SEQUENCE {
          aggregationLevel1-r16              ENUMERATED {n1, n2}...},...}
      dci-Format2-5-r16                SEQUENCE {
        nrofCandidates-IAB-r16             SEQUENCE {
          aggregationLevel1-r16              ENUMERATED {n1, n2}...},...}
      dci-Format2-6-r16                 SEQUENCE {...}
      ...}
  }
  searchSpaceGroupIdList-r16        SEQUENCE (SIZE (1.. 2)) OF INTEGER (0..1)
  freqMonitorLocations-r16                BIT STRING (SIZE (5))
}

SearchSpaceSwitchTrigger-r16 ::=   SEQUENCE {
  servingCellId-r16             ServCellIndex,
  positionInDCI-r16
INTEGER(0..maxSFI-DCI-PayloadSize-1)
}
```

FIG. 27

| SCS | OFDM starting Symbols of the candidate SSBs | fc<=3GHz, Lmax=4 | 3GHz<fc<=6GHz, Lmax=8 | fc>6GHz, Lmax=64 |
|---|---|---|---|---|
| CaseA: 15 KHz | {2,8}+14n | n=0,1 | n=0,1,2,3 | Not Applicable (NA) |
| CaseB: 30 KHz | {4,8,16,20}+28n | n=0 | n=0,1 | NA |
| CaseC: 30 KHz | {2,8}+14n | n=0,1 | n=0,1,2,3 | NA |
| CaseD: 120 KHz | {4,8,16,20}+28n | NA | NA | n=0,1,2,3,5,6,7,8,10,11,12,13,15,16,17,18 |
| CaseE: 240 KHz | {8,12,16,20,32,36,40,44} + 56n | NA | NA | n=0,1,2,3,5,6,7,8 |

FIG. 28

```
RRCReconfiguration-IEs ::=          SEQUENCE {
  radioBearerConfig                 RadioBearerConfig
  secondaryCellGroup                OCTET STRING (CONTAINING CellGroupConfig)
  measConfig                        MeasConfig
  nonCriticalExtension              RRCReconfiguration-v1530-IEs
}
RRCReconfiguration-v1530-IEs ::=    SEQUENCE {
  masterCellGroup          OCTET STRING (CONTAINING CellGroupConfig)
  fullConfig               ENUMERATED {true}       OPTIONAL, -- Cond FullConfig
  ...}
CellGroupConfig ::=                 SEQUENCE {
  cellGroupId                       CellGroupId,
  rlc-BearerToAddModList     SEQUENCE (SIZE(1..maxLC-ID)) OF RLC-BearerConfig
  mac-CellGroupConfig        MAC-CellGroupConfig
  physicalCellGroupConfig    PhysicalCellGroupConfig
  spCellConfig               SpCellConfig
  sCellToAddModList          SEQUENCE (SIZE (1..maxNrofSCells)) OF SCellConfig
...,}

SpCellConfig ::=                SEQUENCE {
  servCellIndex                ServCellIndex
  reconfigurationWithSync          ReconfigurationWithSync
  spCellConfigDedicated            ServingCellConfig
  ...,}
ServingCellConfig ::=          SEQUENCE {
  initialDownlinkBWP               BWP-DownlinkDedicated
  downlinkBWP-ToAddModList  SEQUENCE (SIZE (1..maxNrofBWPs)) OF BWP-Downlink
  firstActiveDownlinkBWP-Id        BWP-Id
  defaultDownlinkBWP-Id            BWP-Id
  uplinkConfig                 UplinkConfig
  ...}

UplinkConfig ::=              SEQUENCE {
  initialUplinkBWP               BWP-UplinkDedicated
  uplinkBWP-ToAddModList    SEQUENCE (SIZE (1..maxNrofBWPs)) OF BWP-Uplink
  firstActiveUplinkBWP-Id        BWP-Id
  carrierSwitching              SetupRelease { SRS-CarrierSwitching }
  ...,}

ReconfigurationWithSync ::=       SEQUENCE {
  spCellConfigCommon               ServingCellConfigCommon
  newUE-Identity                 RNTI-Value,
  t304                       ENUMERATED {ms50, ms100, ms150, ...},
  rach-ConfigDedicated             CHOICE {
    uplink                      RACH-ConfigDedicated,
    supplementaryUplink             RACH-ConfigDedicated
  }...,}
```

FIG. 33

```
RACH-ConfigDedicated ::=      SEQUENCE {
   cfra                       CFRA
   ra-Prioritization          RA-Prioritization
...}

CFRA ::=                  SEQUENCE {
   occasions                  SEQUENCE {
      rach-ConfigGeneric        RACH-ConfigGeneric,
      ssb-perRACH-Occasion  ENUMERATED {oneEighth, oneFourth, oneHalf, one, two, ...}
      }
   resources                  CHOICE {
      ssb                     SEQUENCE {
         ssb-ResourceList   SEQUENCE (SIZE(1..maxRA-SSB-Resources)) OF CFRA-SSB-
Resource,
         ra-ssb-OccasionMaskIndex       INTEGER (0..15)
      },
      csirs                   SEQUENCE {
         csirs-ResourceList          SEQUENCE (SIZE(1..maxRA-CSIRS-Resources)) OF
CFRA-CSIRS-Resource,
         rsrp-ThresholdCSI-RS         RSRP-Range
      }
   },
   ...,}

CFRA-SSB-Resource ::=         SEQUENCE {
   ssb                        SSB-Index,
   ra-PreambleIndex              INTEGER (0..63),
   ...,}

CFRA-CSIRS-Resource ::=       SEQUENCE {
   csi-RS                     CSI-RS-Index,
   ra-OccasionList               SEQUENCE (SIZE(1..maxRA-OccasionsPerCSIRS)) OF
INTEGER (0..maxRA-Occasions-1),
   ra-PreambleIndex              INTEGER (0..63),
   ...}


RACH-ConfigGeneric ::=           SEQUENCE {
   prach-ConfigurationIndex         INTEGER (0..255),
   msg1-FDM                      ENUMERATED {one, two, four, eight},
   msg1-FrequencyStart             INTEGER (0..maxNrofPhysicalResourceBlocks-1),
   zeroCorrelationZoneConfig        INTEGER(0..15),
   preambleReceivedTargetPower       INTEGER (-202..-60),
   preambleTransMax               ENUMERATED {n3, n4, n5, n6, n7, n8, n10, ...},
   powerRampingStep               ENUMERATED {dB0, dB2, dB4, dB6},
   ra-ResponseWindow              ENUMERATED {sl1, sl2, sl4, sl8, sl10, sl20, sl40, sl80},
   ...,}
```

FIG. 34

```
RRCReconfiguration-v1610-IEs ::=       SEQUENCE {
   otherConfig-v1610                 OtherConfig-v1610
   bap-Config-r16                    SetupRelease { BAP-Config-r16 }
   iab-IP-AddressConfigurationList-r16    IAB-IP-AddressConfigurationList-r16
   conditionalReconfiguration-r16       ConditionalReconfiguration-r16
   daps-SourceRelease-r16              ENUMERATED{true}
   t316-r16                         SetupRelease {T316-r16}
  ...
   targetCellSMTC-SCG-r16              SSB-MTC
   }

ConditionalReconfiguration-r16 ::=   SEQUENCE {
   attemptCondReconfig-r16            ENUMERATED {true}
condReconfigToRemoveList-r16         CondReconfigToRemoveList-r16
condReconfigToAddModList-r16         CondReconfigToAddModList-r16
 ...
}

CondReconfigToAddModList-r16 ::= SEQUENCE (SIZE (1.. maxNrofCondCells-r16)) OF
CondReconfigToAddMod-r16

CondReconfigToAddMod-r16 ::=    SEQUENCE {
   condReconfigId-r16            CondReconfigId-r16,
   condExecutionCond-r16           SEQUENCE (SIZE (1..2)) OF MeasId
   condRRCReconfig-r16            OCTET STRING (CONTAINING RRCReconfiguration)
   ...,
}

CondReconfigId-r16 ::=          INTEGER (1.. maxNrofCondCells-r16)
```

*condExecutionCond*

The execution condition that needs to be fulfilled in order to trigger the execution of a conditional reconfiguration for CHO, CPA, intra-SN CPC without MN involvement or MN initiated inter-SN CPC. When configuring 2 triggering events (Meas Ids) for a candidate cell, network ensures that both refer to the same *measObject*. For CHO, if network configures *condEventD1* or *condEventT1* for a candidate cell network configures a second triggering event *condEventA3, condEventA4* or *condEventA5* for the same candidate cell. Network does not configure both *condEventD1* and *condEventT1* for the same candidate cell.

CondEvent A3: Conditional reconfiguration candidate becomes amount of offset better than PCell/PSCell;
CondEvent A4: Conditional reconfiguration candidate becomes better than absolute threshold;
CondEvent A5: PCell/PSCell becomes worse than absolute threshold1 AND Conditional reconfiguration candidate becomes better than another absolute threshold2;

FIG. 36

```
ServingCellConfig ::=          SEQUENCE {
   ...
   csi-MeasConfig              SetupRelease { CSI-MeasConfig }
OPTIONAL,  -- Need M
   servingCellMO               MeasObjectId
OPTIONAL,  -- Cond MeasObject
   ...,
}

CSI-MeasConfig ::=             SEQUENCE {
   nzp-CSI-RS-ResourceToAddModList    SEQUENCE (SIZE (1..maxNrofNZP-CSI-RS-
Resources)) OF NZP-CSI-RS-Resource
   nzp-CSI-RS-ResourceSetToAddModList  SEQUENCE (SIZE (1..maxNrofNZP-CSI-
RS-ResourceSets)) OF NZP-CSI-RS-ResourceSet
   csi-SSB-ResourceSetToAddModList    SEQUENCE (SIZE (1..maxNrofCSI-SSB-
ResourceSets)) OF CSI-SSB-ResourceSet   OPTIONAL, -- Need N
   csi-ResourceConfigToAddModList     SEQUENCE (SIZE (1..maxNrofCSI-
ResourceConfigurations)) OF CSI-ResourceConfig
   csi-ReportConfigToAddModList       SEQUENCE (SIZE (1..maxNrofCSI-
ReportConfigurations)) OF CSI-ReportConfig  OPTIONAL, -- Need N
   reportTriggerSize              INTEGER (0..6)
   aperiodicTriggerStateList         SetupRelease { CSI-AperiodicTriggerStateList }
   semiPersistentOnPUSCH-TriggerStateList    SetupRelease { CSI-
SemiPersistentOnPUSCH-TriggerStateList }
   ...,
}

NZP-CSI-RS-Resource ::=        SEQUENCE {
   nzp-CSI-RS-ResourceId          NZP-CSI-RS-ResourceId,
   ...
   periodicityAndOffset          CSI-ResourcePeriodicityAndOffset
   qcl-InfoPeriodicCSI-RS         TCI-StateId
   ...
}

NZP-CSI-RS-ResourceSet ::=       SEQUENCE {
   nzp-CSI-ResourceSetId          NZP-CSI-RS-ResourceSetId,
   nzp-CSI-RS-Resources           SEQUENCE (SIZE (1..maxNrofNZP-CSI-RS-
ResourcesPerSet)) OF NZP-CSI-RS-ResourceId,
   repetition                ENUMERATED { on, off }
   aperiodicTriggeringOffset        INTEGER(0..6)
   trs-Info                 ENUMERATED {true}
   ...,
  }
```

FIG. 40

```
CSI-SSB-ResourceSet ::=          SEQUENCE {
   csi-SSB-ResourceSetId            CSI-SSB-ResourceSetId,
   csi-SSB-ResourceList             SEQUENCE (SIZE(1..maxNrofCSI-SSB-
ResourcePerSet)) OF SSB-Index,
   ...,
   [[
   servingAdditionalPCIList-r17       SEQUENCE (SIZE(1..maxNrofCSI-SSB-
ResourcePerSet)) OF ServingAdditionalPCIIndex-r17
   ]]
}
ServingAdditionalPCIIndex-r17  ::=  INTEGER(0..maxNrofAdditionalPCI-r17)
```

*servingAdditionalPCIList*
Indicates the physical cell IDs (PCI) of the SSBs in the *csi-SSB-ResourceList*. If present, the list has the same number of entries as *csi-SSB-ResourceList*. The first entry of the list indicates the value of the PCI for the first entry of *csi-SSB-ResourceList*, the second entry of this list indicates the value of the PCI for the second entry of *csi-SSB-ResourceList*, and so on. For each entry, the following applies:
- If the value is zero, the PCI is the PCI of the serving cell in which this *CSI-SSB-ResourceSet* is defined;
- otherwise, the value is *additionalPCIIndex-r17* of an *SSB-MTC-AdditionalPCI-r17* configured using the *additionalPCI-ToAddModList-r17* in *ServingCellConfig*, and the PCI is the *additionalPCI-r17* in this *SSB-MTC-AdditionalPCI-r17*.

```
SSB-MTC-AdditionalPCI-r17 ::=      SEQUENCE {
   additionalPCIIndex-r17            AdditionalPCIIndex-r17,
   additionalPCI-r17                PhysCellId,
   periodicity-r17                ENUMERATED { ms5, ms10, ms20, ms40, ms80, ms160, ... },
   ssb-PositionsInBurst-r17          CHOICE {
      shortBitmap                    BIT STRING (SIZE (4)),
      ...},
   ss-PBCH-BlockPower-r17           INTEGER (-60..50)
}
AdditionalPCIIndex-r17  ::=  INTEGER(1..maxNrofAdditionalPCI-r17)
```

```
CSI-ResourceConfig ::=     SEQUENCE {
   csi-ResourceConfigId       CSI-ResourceConfigId,
   csi-RS-ResourceSetList     CHOICE {
      nzp-CSI-RS-SSB           SEQUENCE {
         nzp-CSI-RS-ResourceSetList  SEQUENCE (SIZE (1..maxNrofNZP-CSI-RS-
ResourceSetsPerConfig)) OF NZP-CSI-RS-ResourceSetId
         csi-SSB-ResourceSetList    SEQUENCE (SIZE (1..maxNrofCSI-SSB-
ResourceSetsPerConfig)) OF CSI-SSB-ResourceSetId  OPTIONAL
      },
      csi-IM-ResourceSetList     SEQUENCE (SIZE (1..maxNrofCSI-IM-
ResourceSetsPerConfig)) OF CSI-IM-ResourceSetId
   },
   bwp-Id                  BWP-Id,
   resourceType               ENUMERATED { aperiodic, semiPersistent, periodic },
   ...,
}
```

FIG. 41

```
CSI-ReportConfig ::=            SEQUENCE {
   reportConfigId                  CSI-ReportConfigId,
   carrier                       ServCellIndex
   resourcesForChannelMeasurement        CSI-ResourceConfigId,
    reportConfigType                 CHOICE {
      periodic                    SEQUENCE { ...},
      semiPersistentOnPUCCH               SEQUENCE {...},
      semiPersistentOnPUSCH               SEQUENCE {...},
      aperiodic                    SEQUENCE {...}
   },
   reportQuantity                  CHOICE {
      ...
      cri-RSRP                     NULL,
      ssb-Index-RSRP                   NULL,
      cri-RI-LI-PMI-CQI                NULL
   },
   timeRestrictionForChannelMeasurements   ENUMERATED {configured, notConfigured},
    dummy                            ENUMERATED {n1, n2}
   groupBasedBeamReporting                  CHOICE {
      enabled                        NULL,
      disabled                       SEQUENCE {
         nrofReportedRS                   ENUMERATED {n1, n2, n3, n4}
      }
   },
   ...,
   [[
   cqi-BitsPerSubband-r17           ENUMERATED {bits4}
   groupBasedBeamReporting-v1710      SEQUENCE {
      nrofReportedGroups-r17          ENUMERATED {n1, n2, n3, n4}
   }
   codebookConfig-r17               CodebookConfig-r17
   sharedCMR-r17                  ENUMERATED {enable}
   csi-ReportMode-r17              ENUMERATED {mode1, mode2}
   numberOfSingleTRP-CSI-Mode1-r17    ENUMERATED {n0, n1, n2}
   reportQuantity-r17              CHOICE {
      cri-RSRP-Index-r17            NULL,
      ssb-Index-RSRP-Index-r17          NULL,
      cri-SINR-Index-r17            NULL,
      ssb-Index-SINR-Index-r17          NULL
   }
   ]],
}
```

FIG. 42

| $\mu$ | $Z_1$[symbols] | |
|---|---|---|
| | $Z_1$ | $Z'_1$ |
| 0 | 10 | 8 |
| 1 | 13 | 11 |
| 2 | 25 | 21 |
| 3 | 43 | 36 |

FIG. 44A

| $\mu$ | $Z_1$[symbols] | | $Z_2$[symbols] | | $Z_3$[symbols] | |
|---|---|---|---|---|---|---|
| | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | $\min(44, X_2+KB_1)$ | $X_2$ |
| 3 | 97 | 85 | 152 | 140 | $\min(97, X_3+KB_2)$ | $X_3$ |
| 5 | 388 | 340 | 608 | 560 | $\min(388, X_5+KB_3)$ | $X_5$ |
| 6 | 776 | 680 | 1216 | 1120 | $\min(776, X_6+KB_4)$ | $X_6$ |

FIG. 44B

CHANNEL STATE INFORMATION REPORT FOR MOBILITY ENHANCEMENT

CROSS-REFERENCE TO RELATED APPLICATIONS

This application is a continuation of International Application No. PCT/US2024/012301, filed Jan. 22, 2024, which claims the benefit of U.S. Provisional Application No. 63/440,155, filed Jan. 20, 2023, all of which are hereby incorporated by reference in their entireties.

BRIEF DESCRIPTION OF THE DRAWINGS

Examples of several of the various embodiments of the present disclosure are described herein with reference to the drawings.

FIG. 19 shows an example of multiple LCIDs of downlink.

FIG. 20 shows an example of multiple LCIDs of uplink.

FIG. 23 shows examples of various DCI formats.

FIG. 24A shows an example of MIB message.

FIG. 24B shows an example of configuration of CORESET 0.

FIG. 24C shows an example of configuration of search space 0.

FIG. 25 shows an example of SIB1 message.

FIG. 26 shows an example of RRC configurations of a BWP, PDCCH, and a CORESET.

FIG. 27 shows an example of RRC configuration of a search space.

FIG. 28 shows an example of SSB configurations.

FIG. 33 shows an example embodiment of RRC message for layer 3 based handover.

FIG. 34 shows an example embodiment of RRC message for layer 3 based handover.

FIG. 36 shows an example embodiment of RRC message for layer 3 based conditional handover procedure.

FIG. 40 shows an example embodiment of RRC message for CSI report.

FIG. 41 shows an example embodiment of RRC message for CSI report.

FIG. 42 shows an example embodiment of RRC message for CSI report.

FIG. 44A and FIG. 44B show example embodiments of CSI computation delay requirements.

DETAILED DESCRIPTION

Figure 1A:
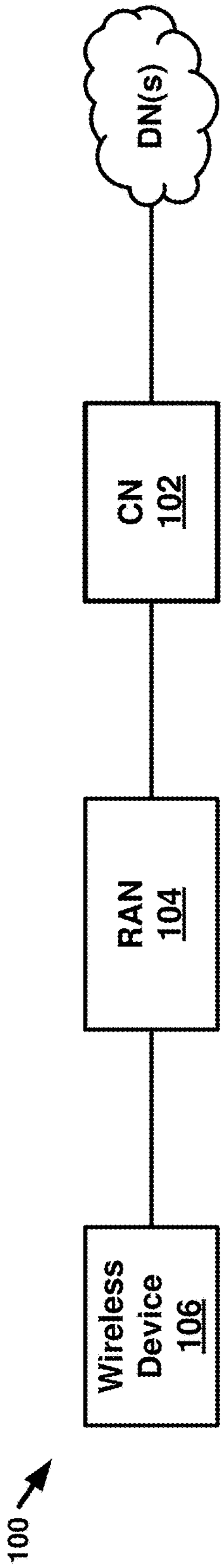
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
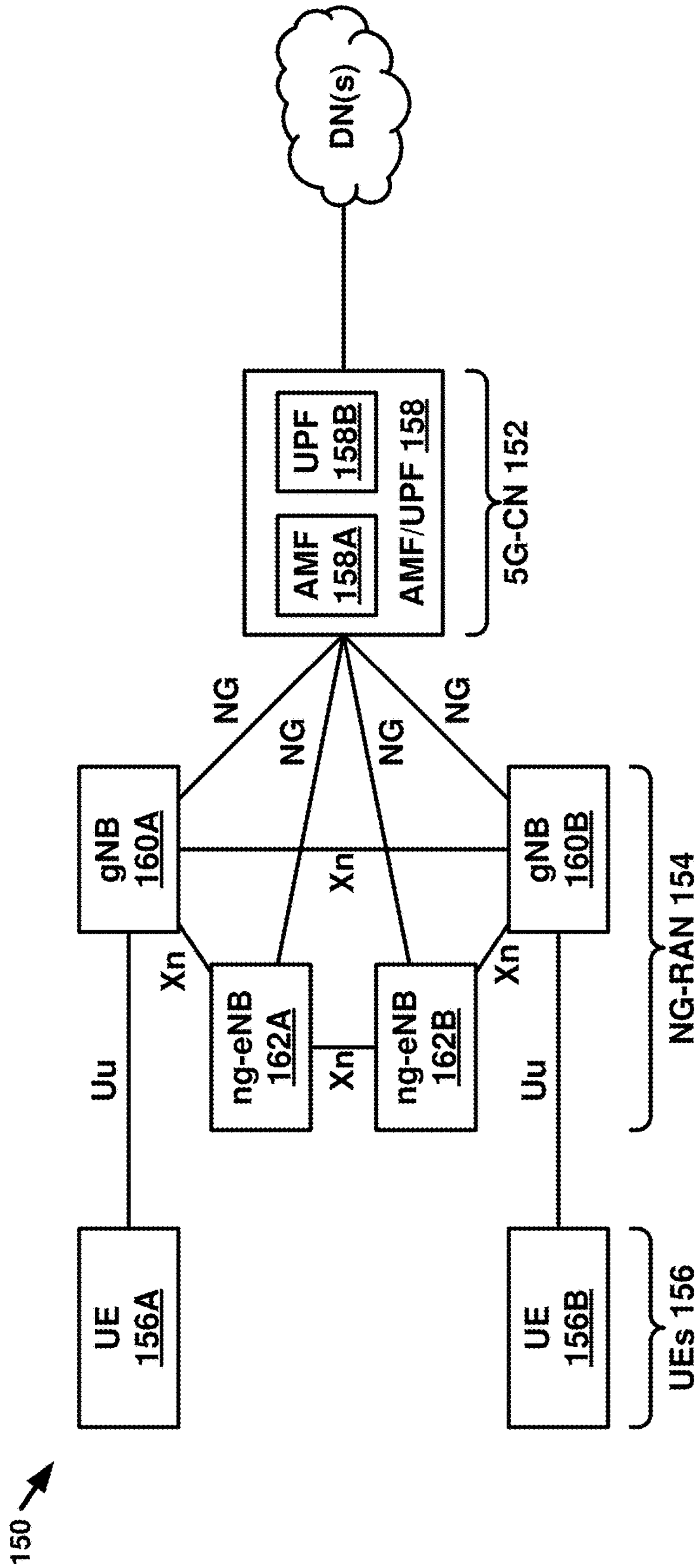

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNS, quality of service (QOS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
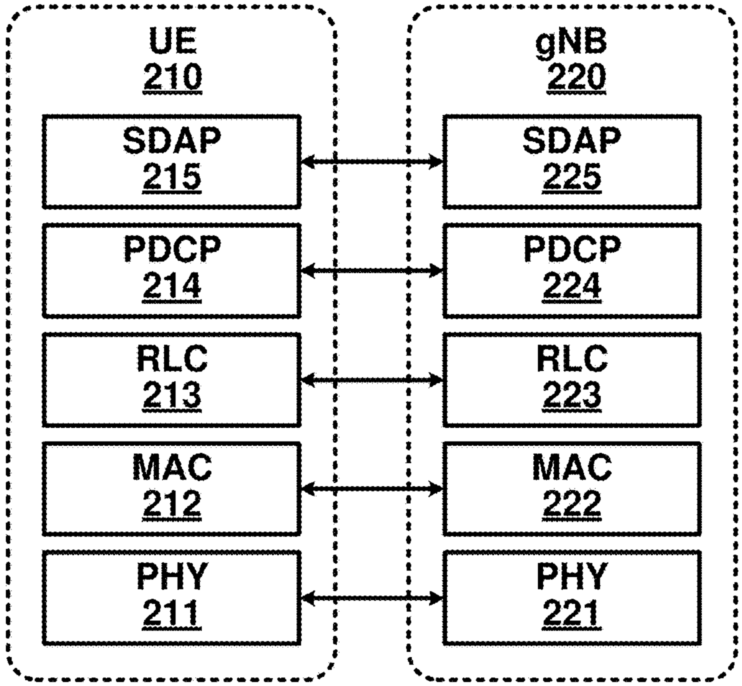
FIG. 2A and FIG. 2B respectively illustrate a New Radio (NR) user plane and control plane protocol stack.
Figure 2B:
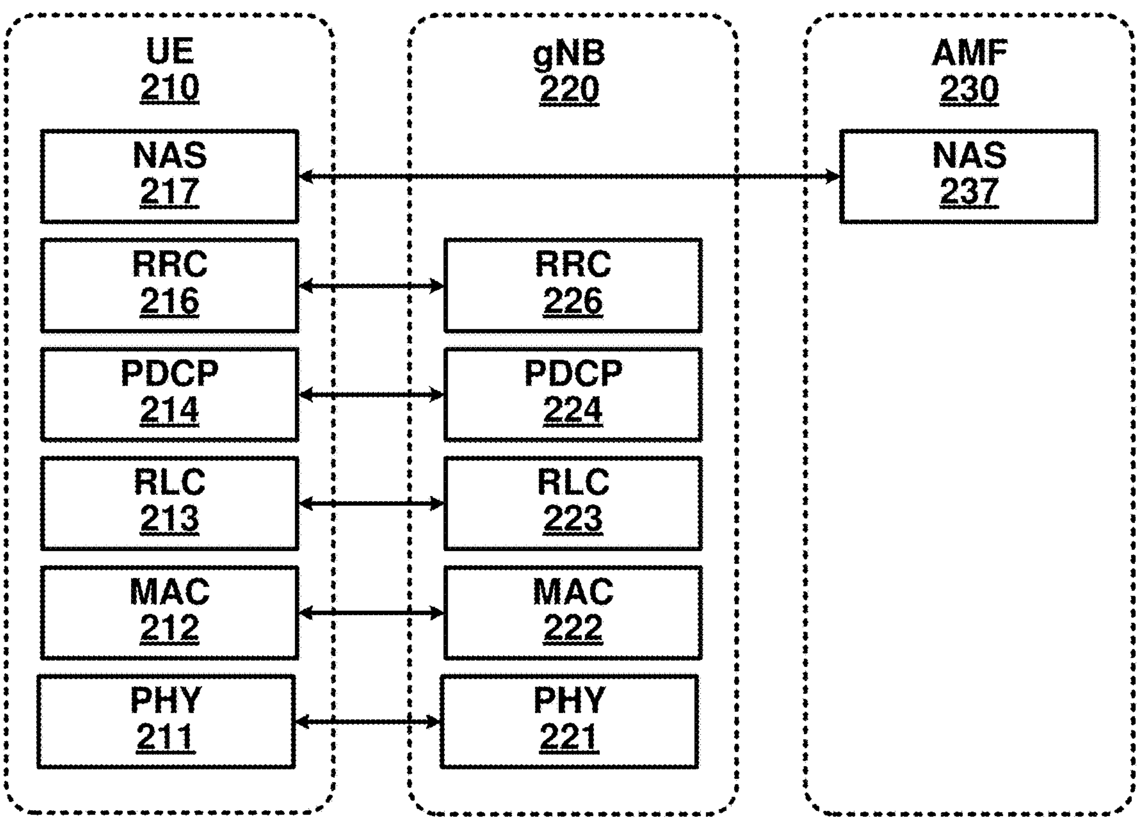

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
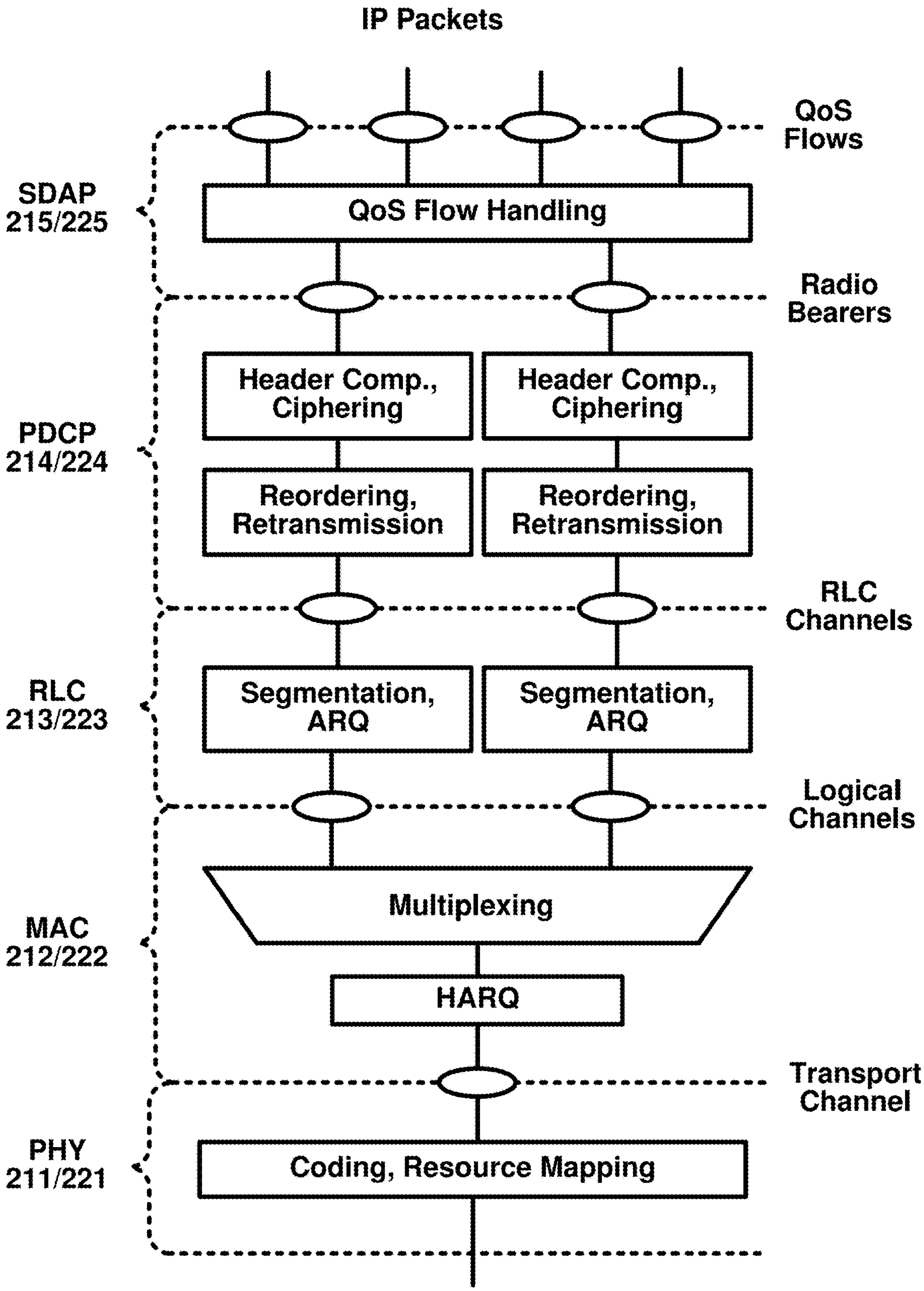
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ)(e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
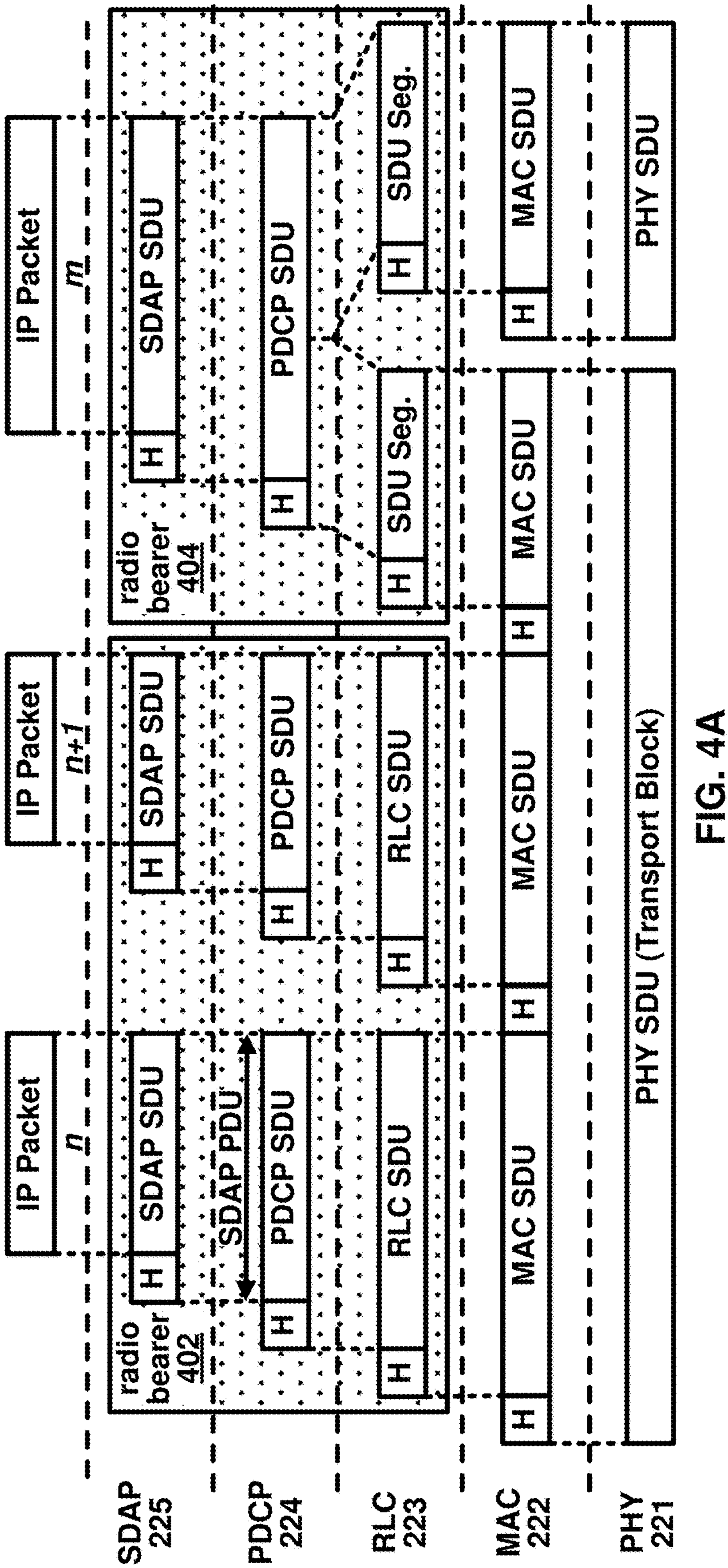
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
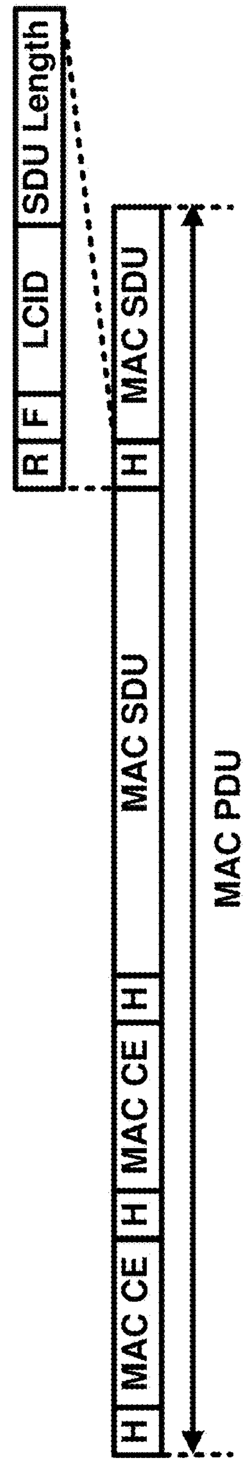
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
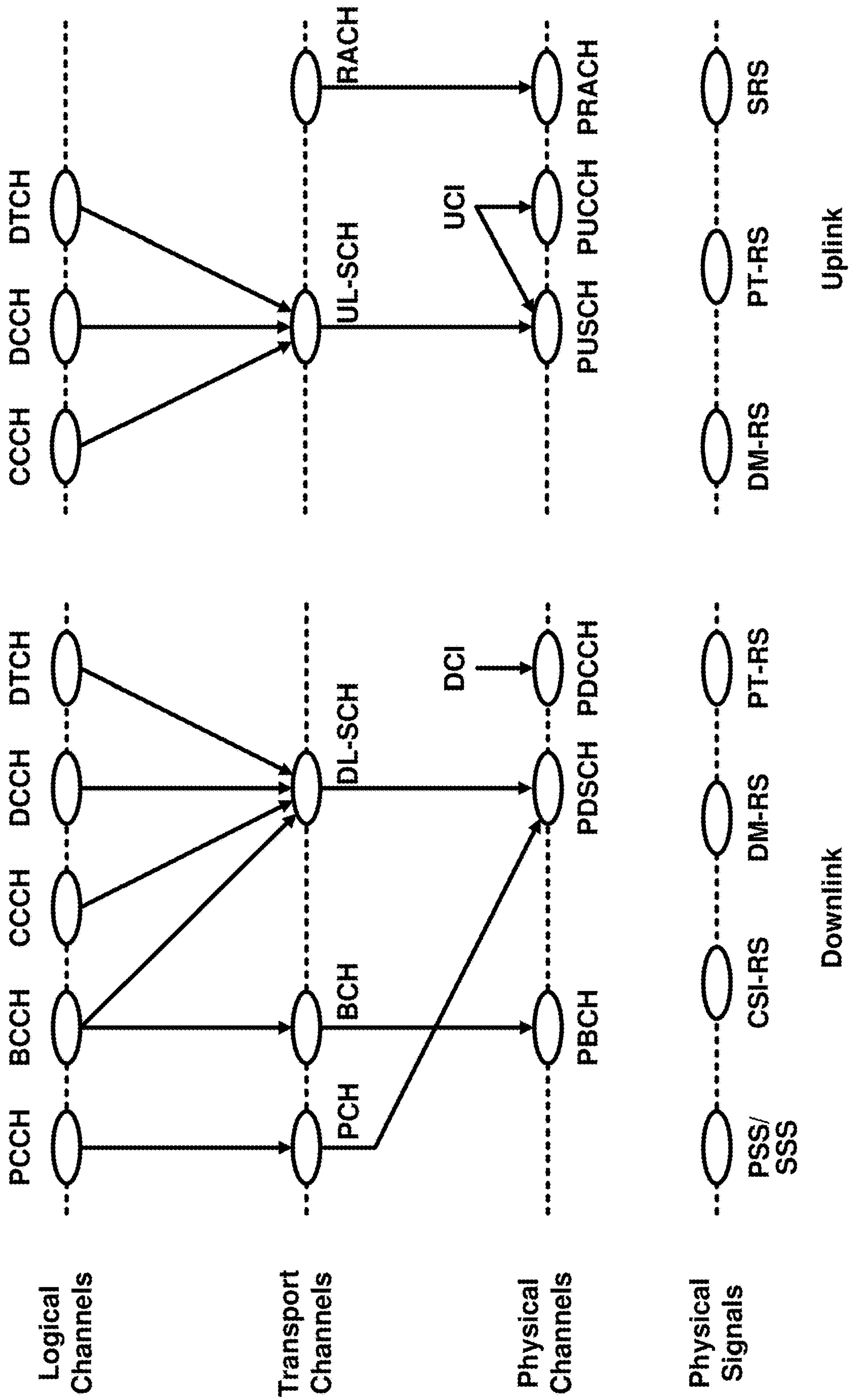
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example: a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
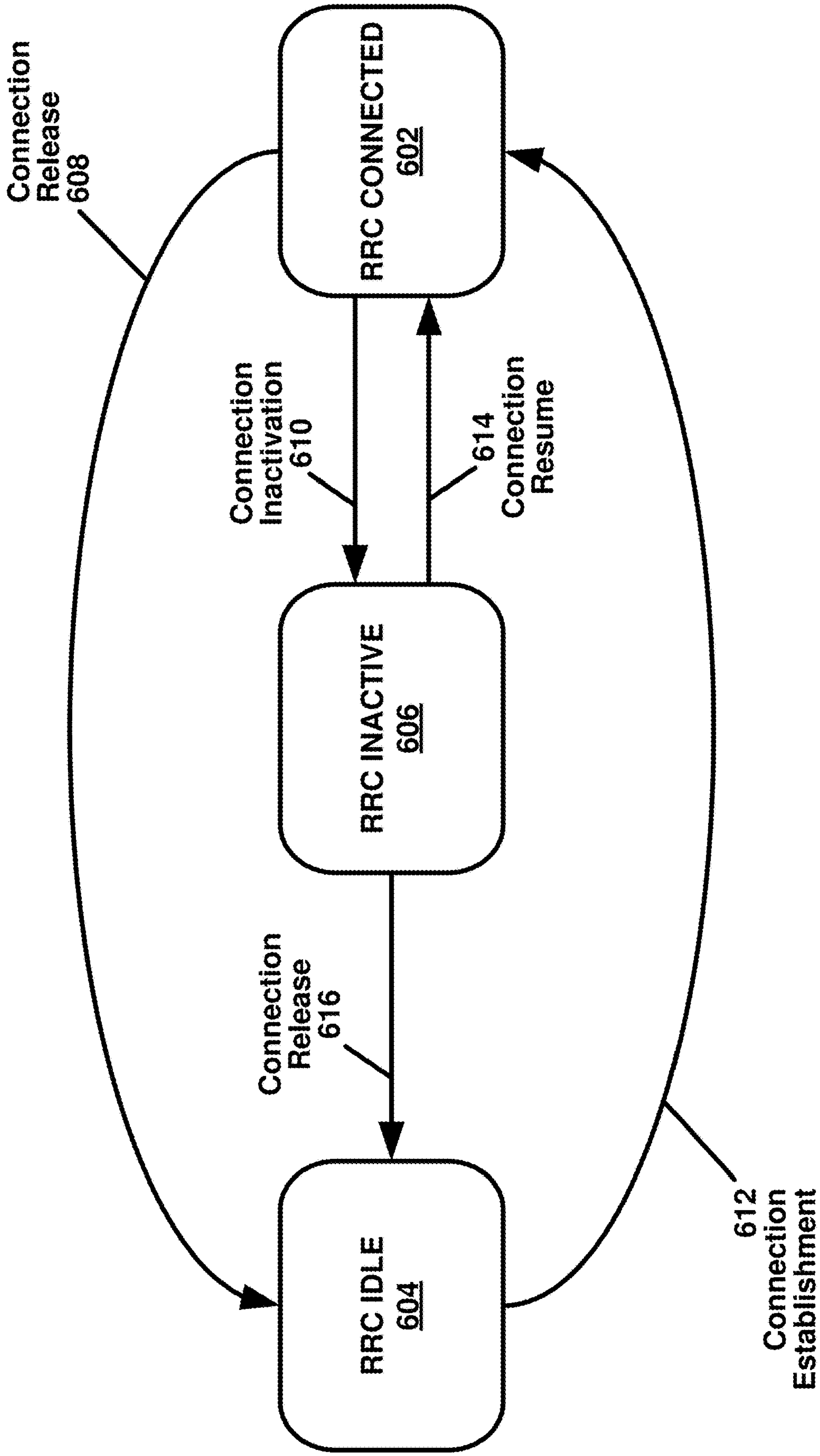
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
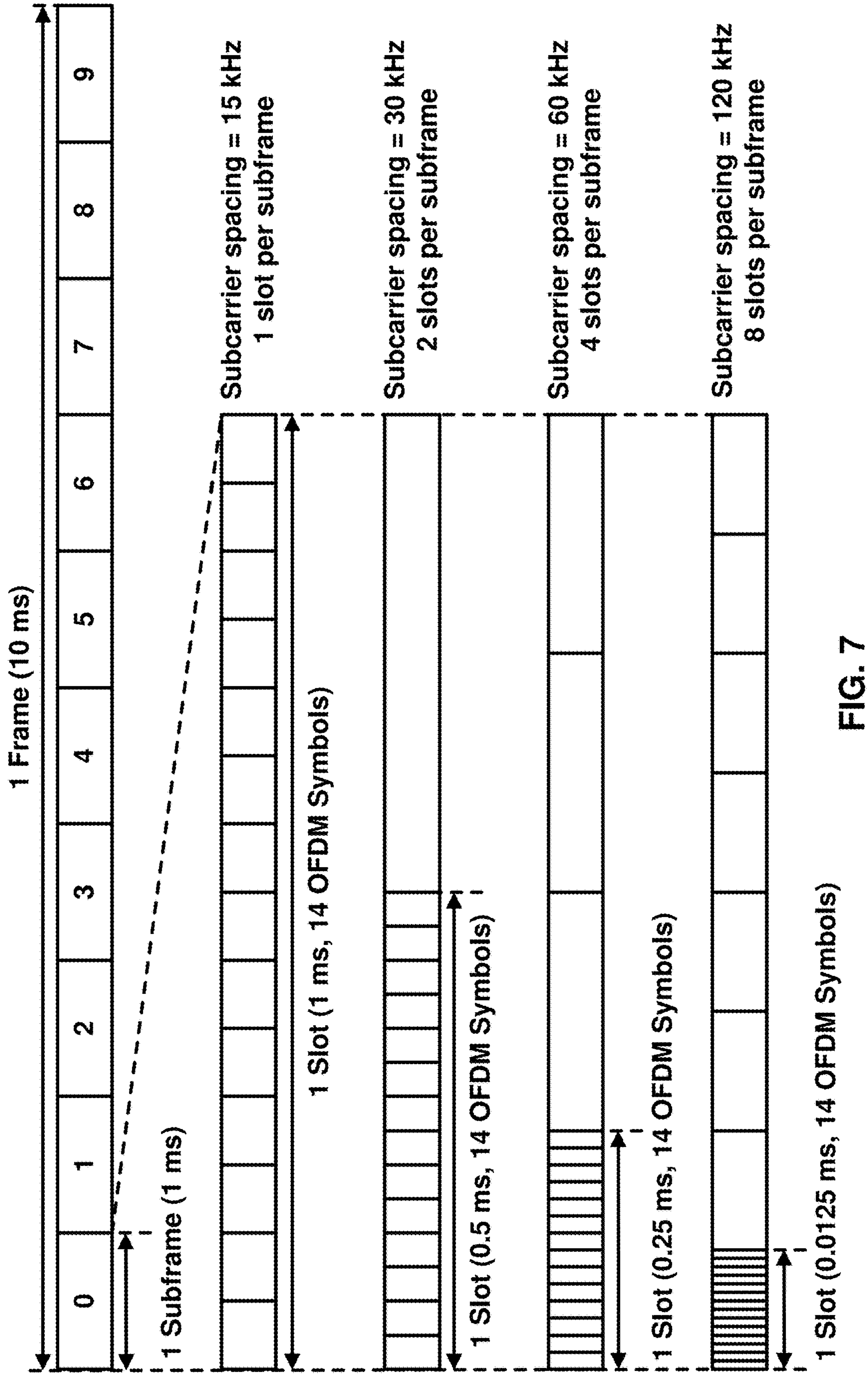
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHZ up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 KHz/4.7 μs; 30 KHz/2.3 μs; 60 KHz/1.2 μs; 120 KHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 KHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
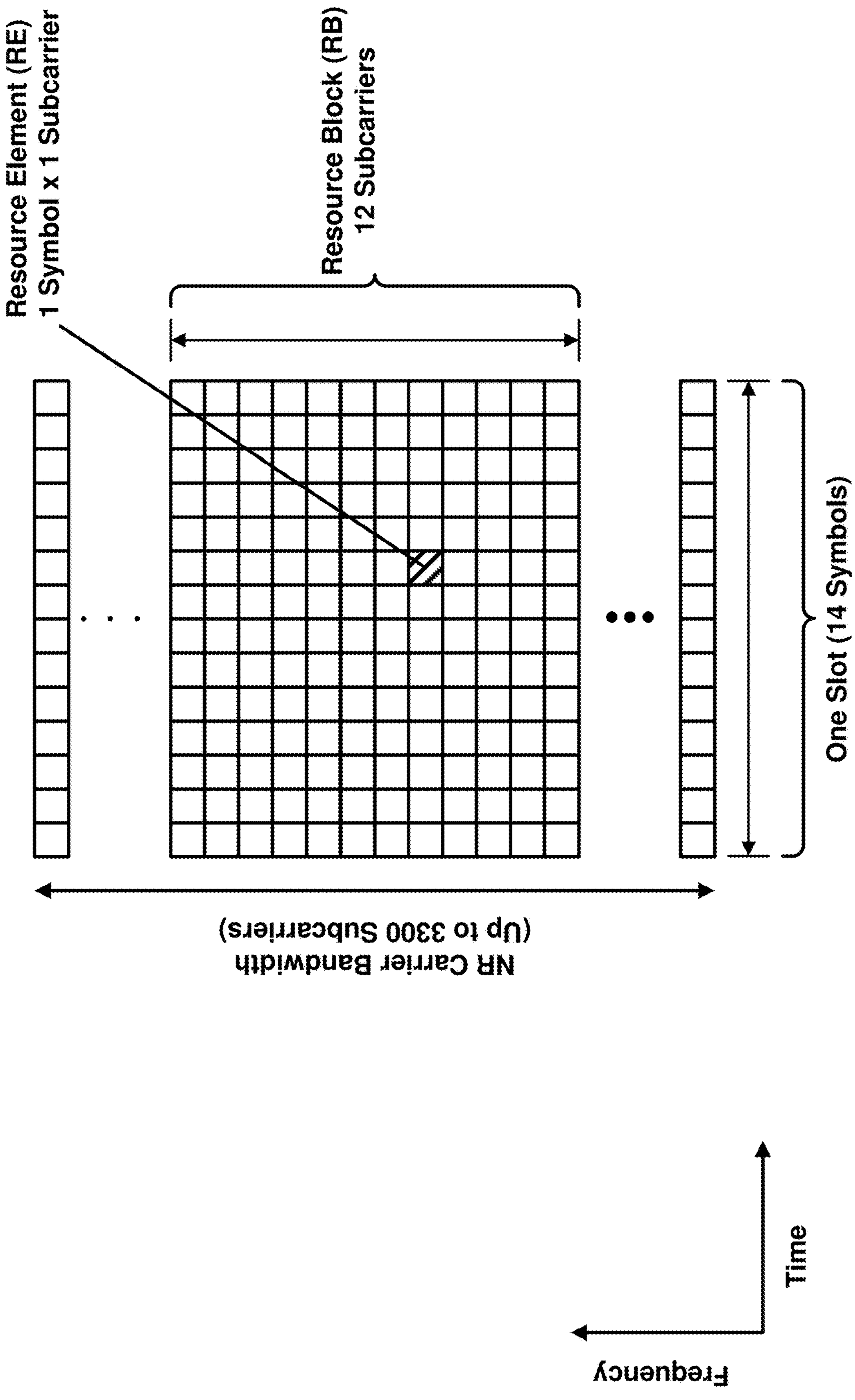
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
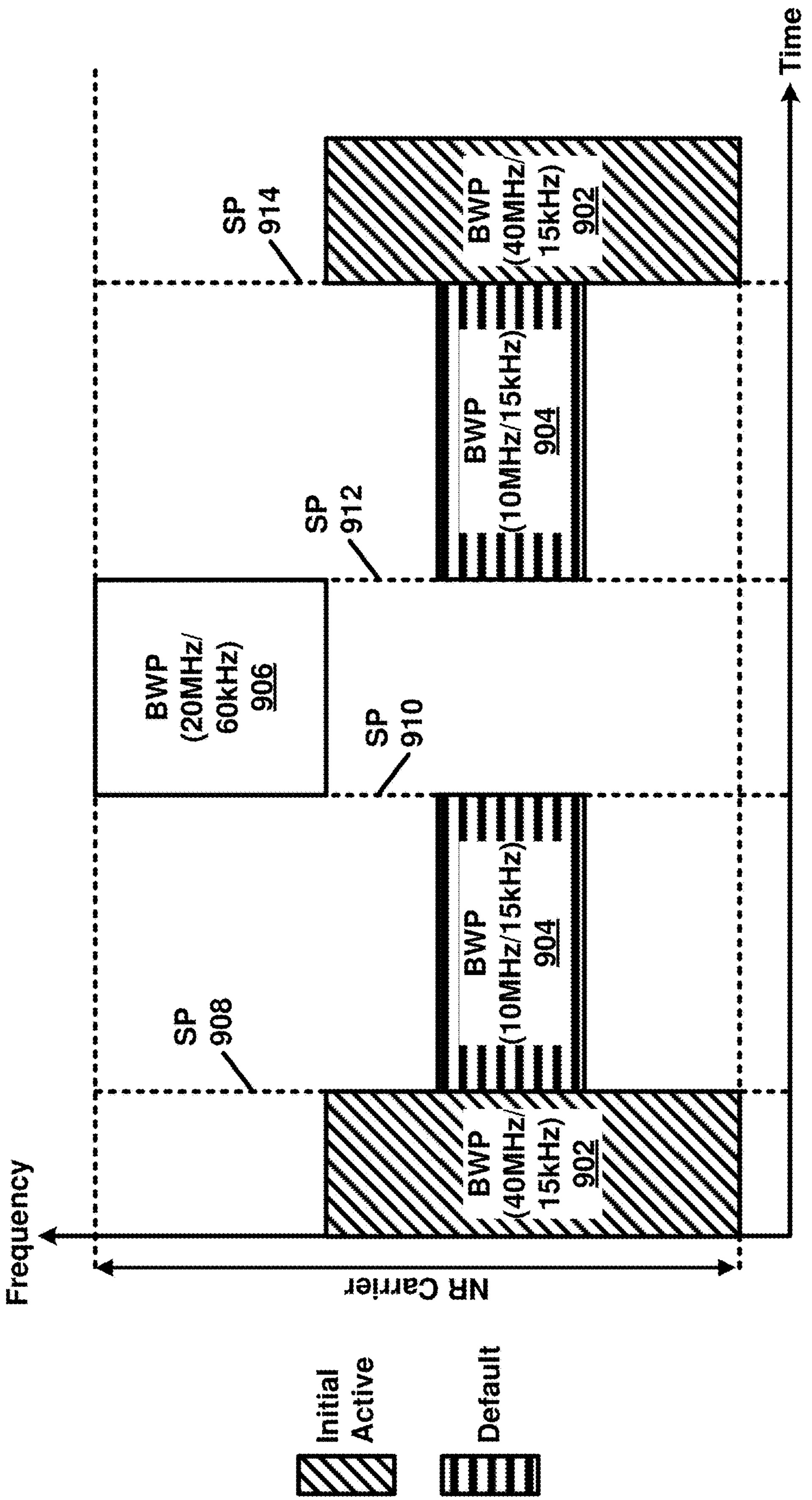
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 KHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
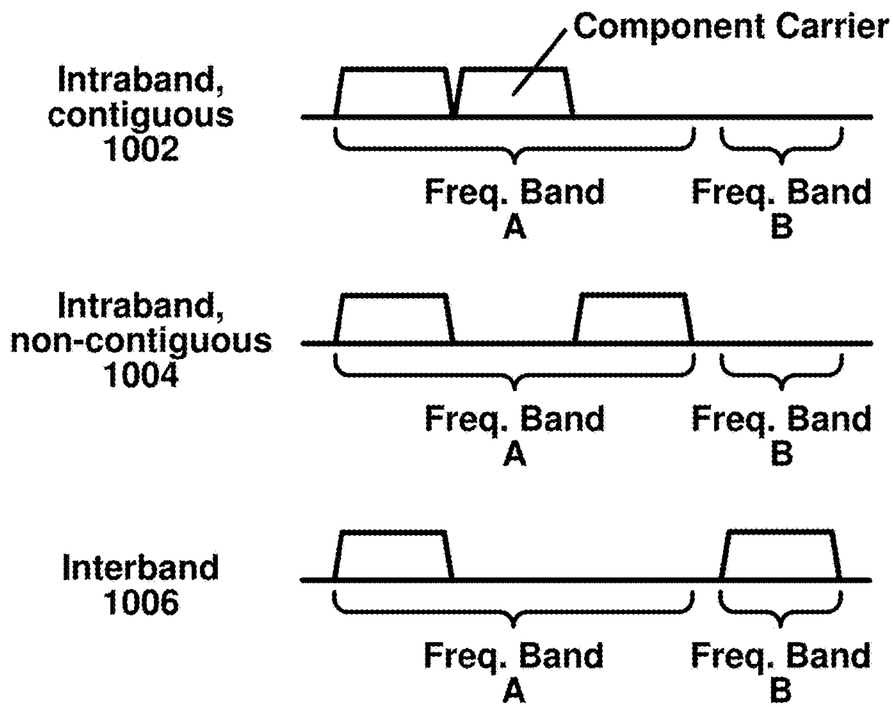
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
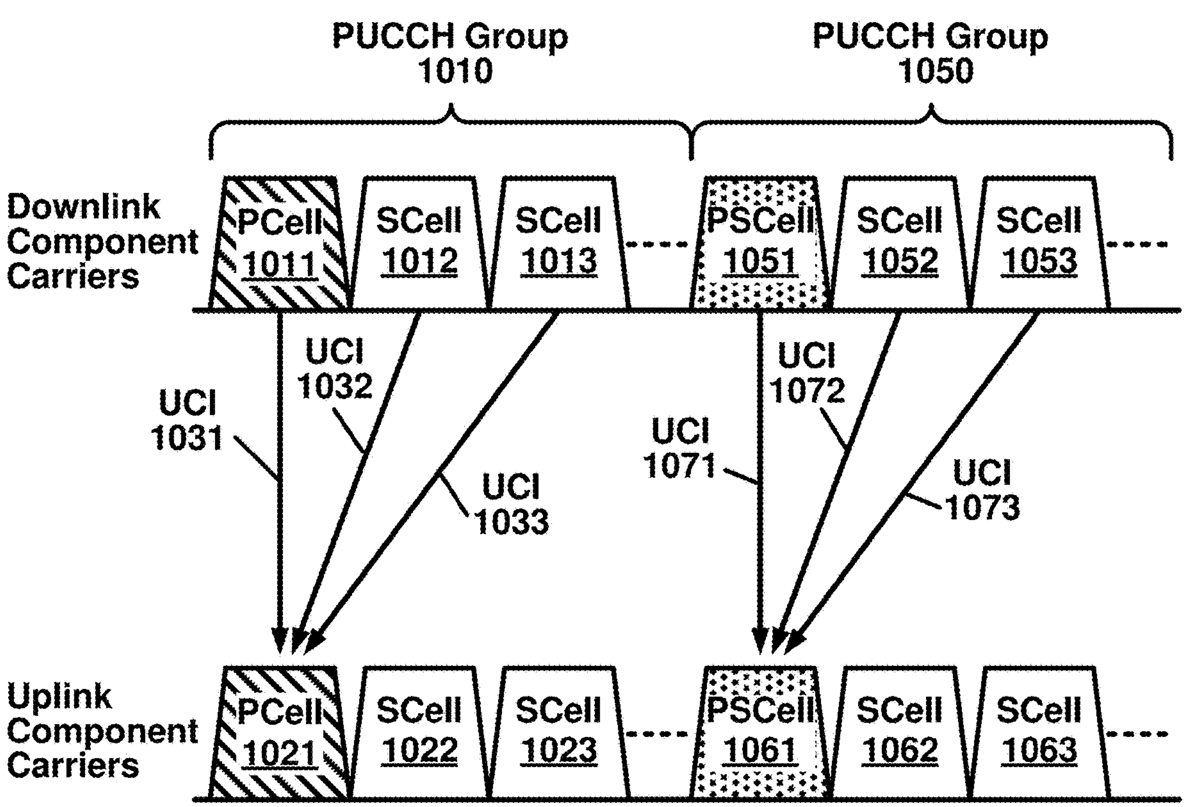
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
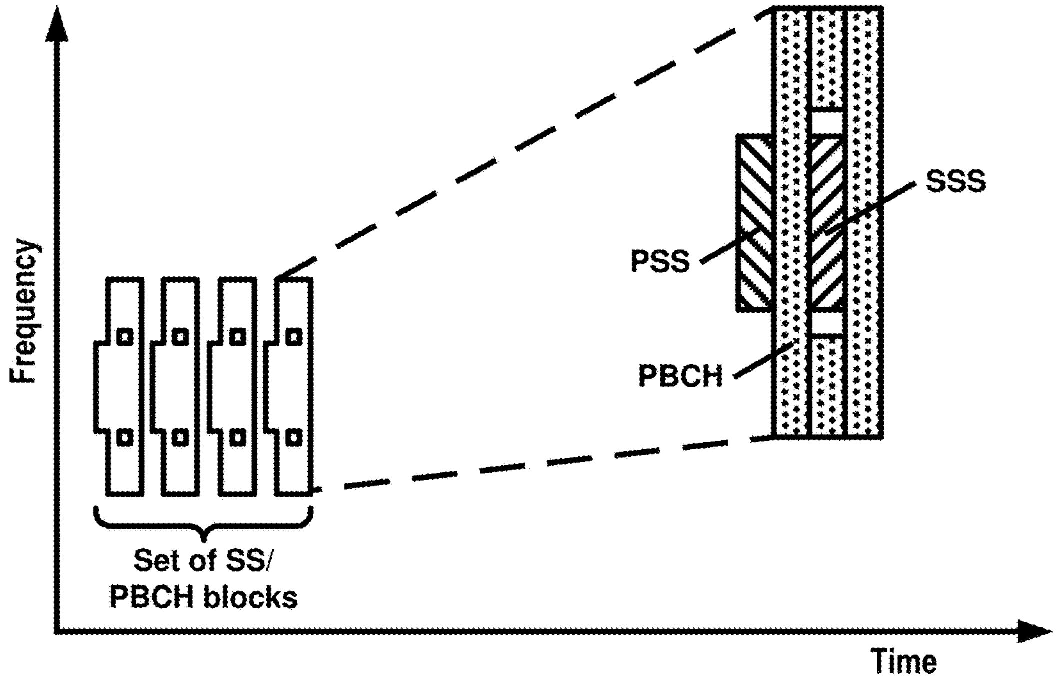
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed)(e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
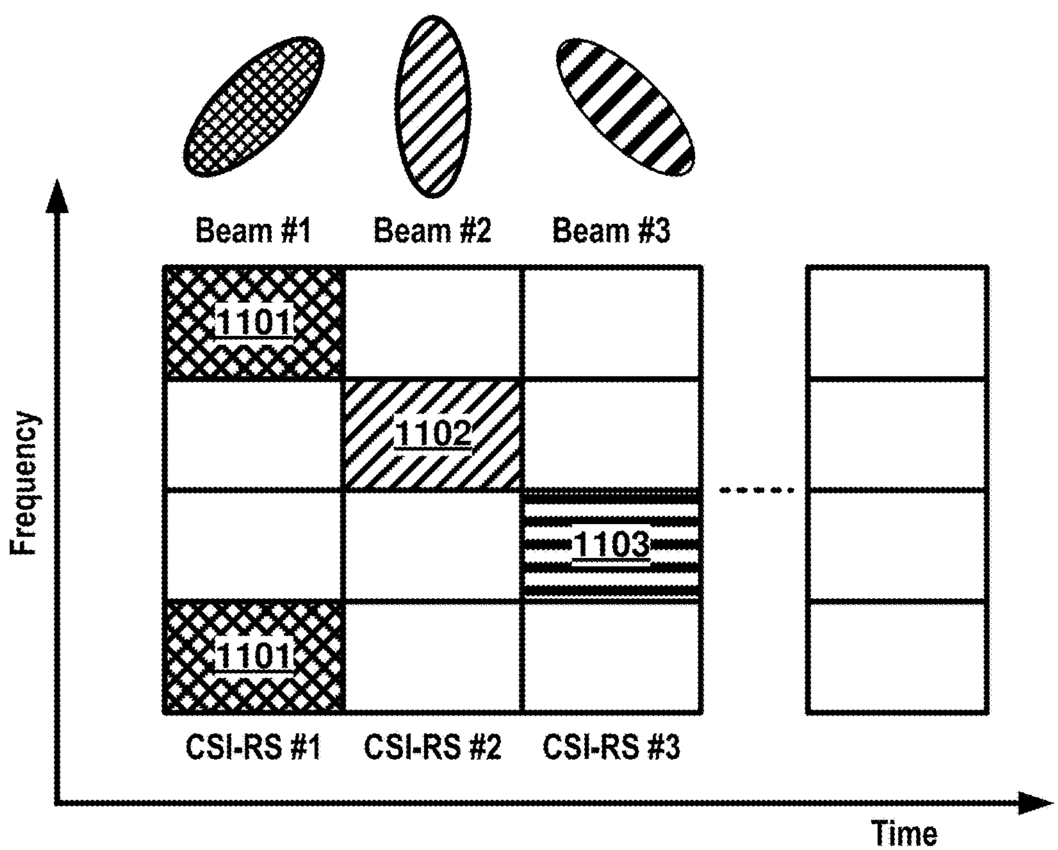
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figure 12A:
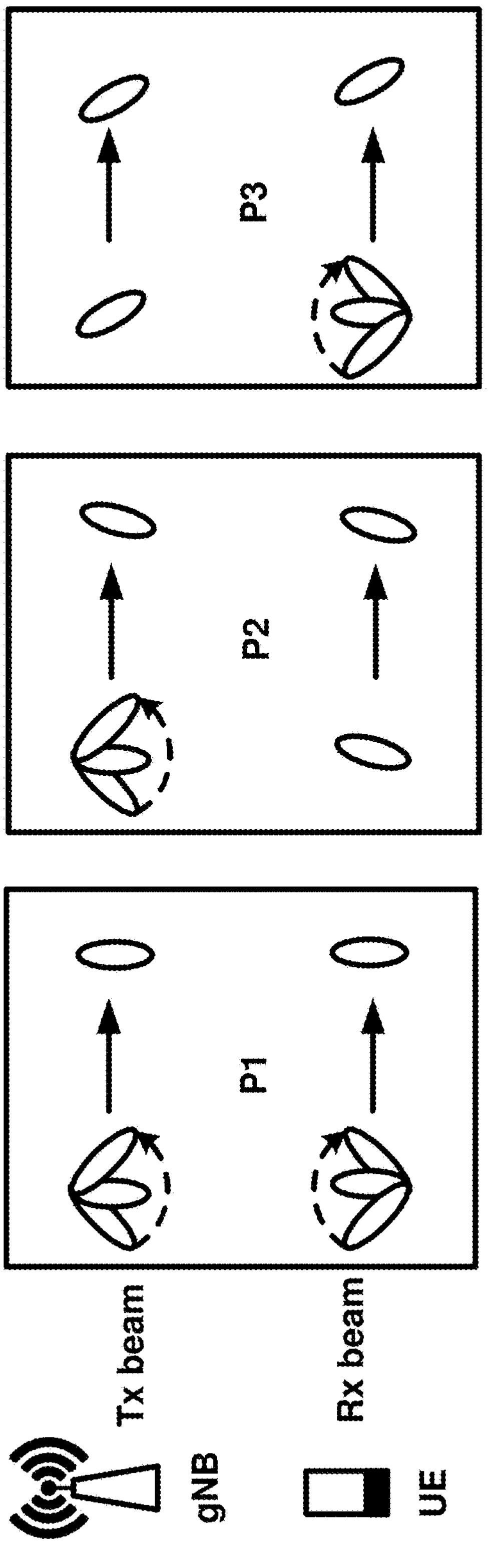
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP)(or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

Figure 12B:
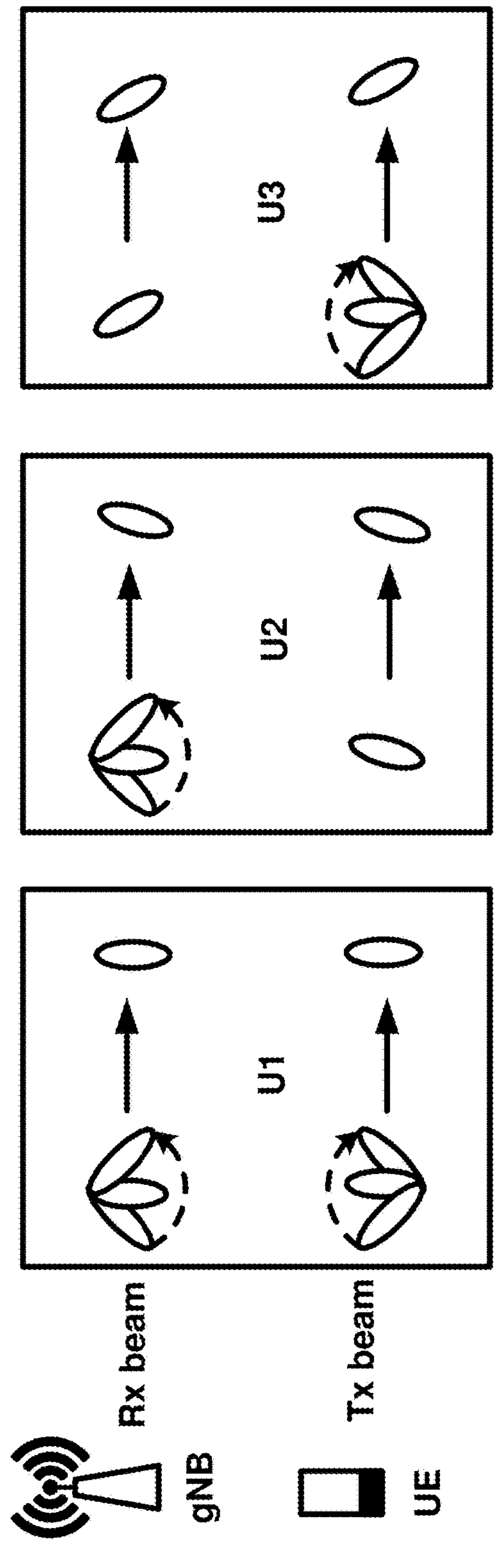

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs)(e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13A:
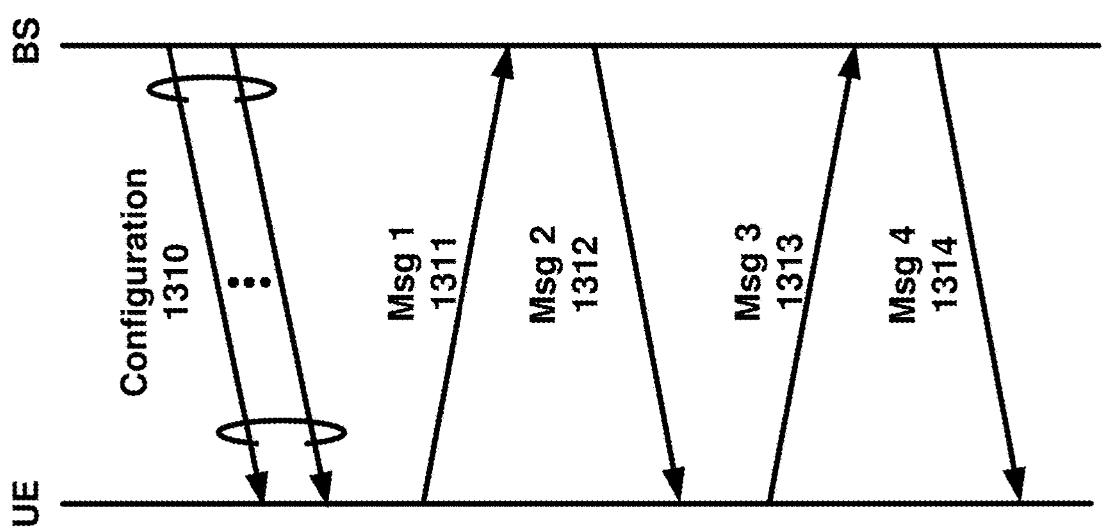
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$RA\text{-}RNTI=1+s\_id+14\times t\_id+14\times 80\times f\_id+14\times 80\times 8\times ul\_carrier\_id$, where s_id may be an index of a first OFDM symbol of the PRACH occasion (e.g., $0\leq s\_id<14$), t_id may be an index of a first slot of the PRACH occasion in a system frame (e.g., $0\leq t\_id<80$), f_id may be an index of the PRACH occasion in the frequency domain (e.g., $0\leq f\_id<8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

Figure 13B:
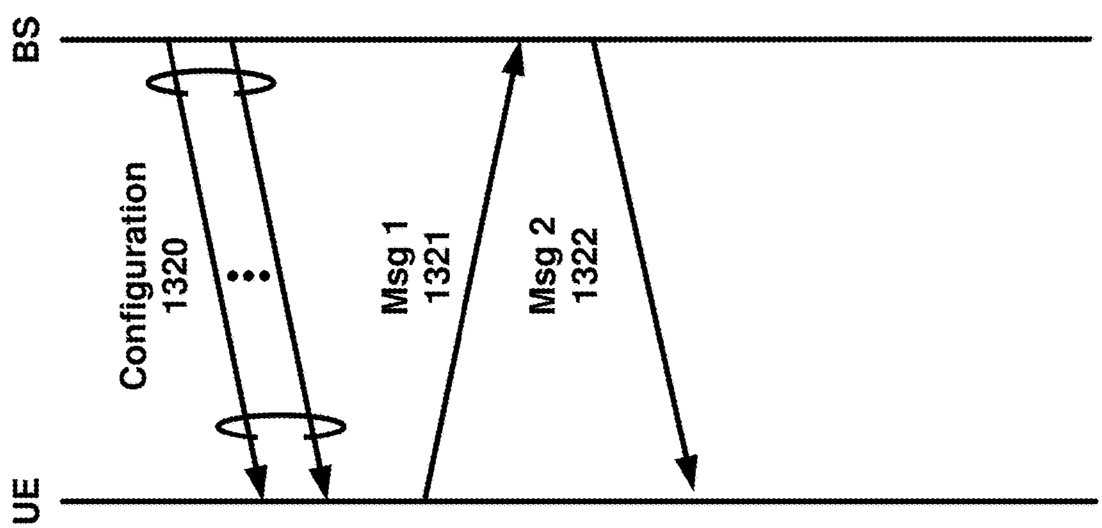

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or as sign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

Figure 13C:
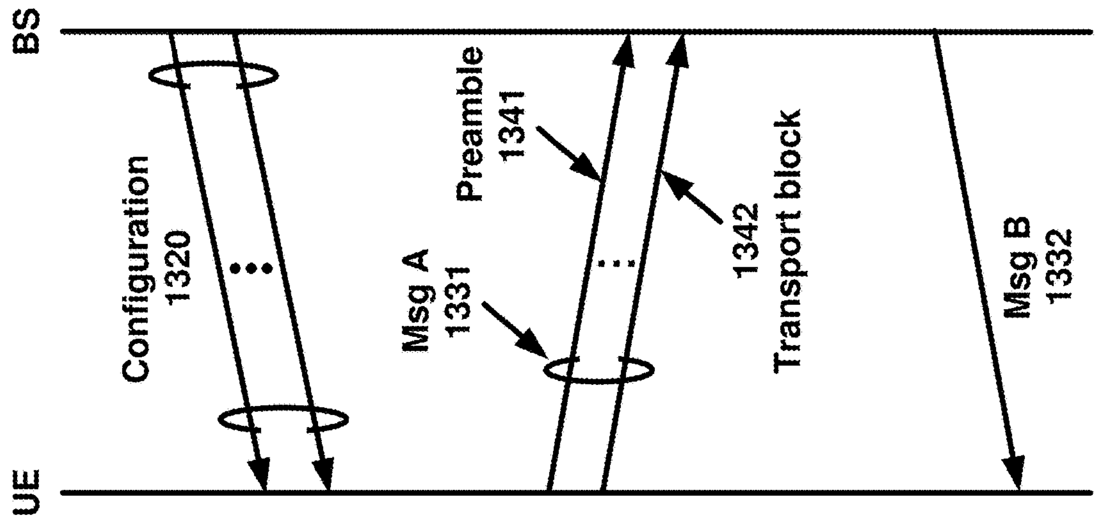

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
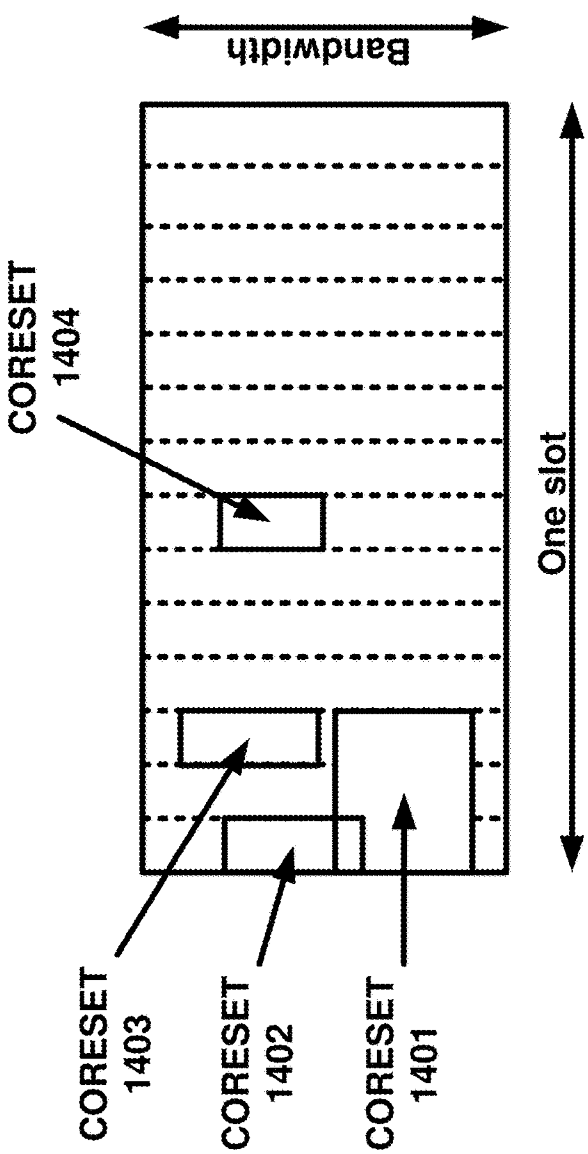
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
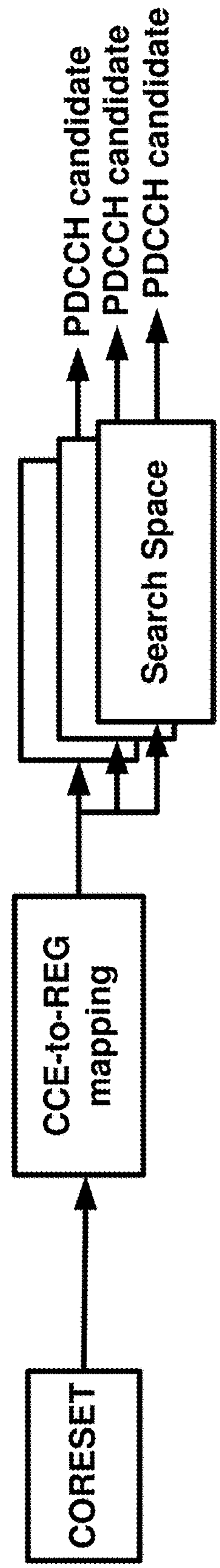
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
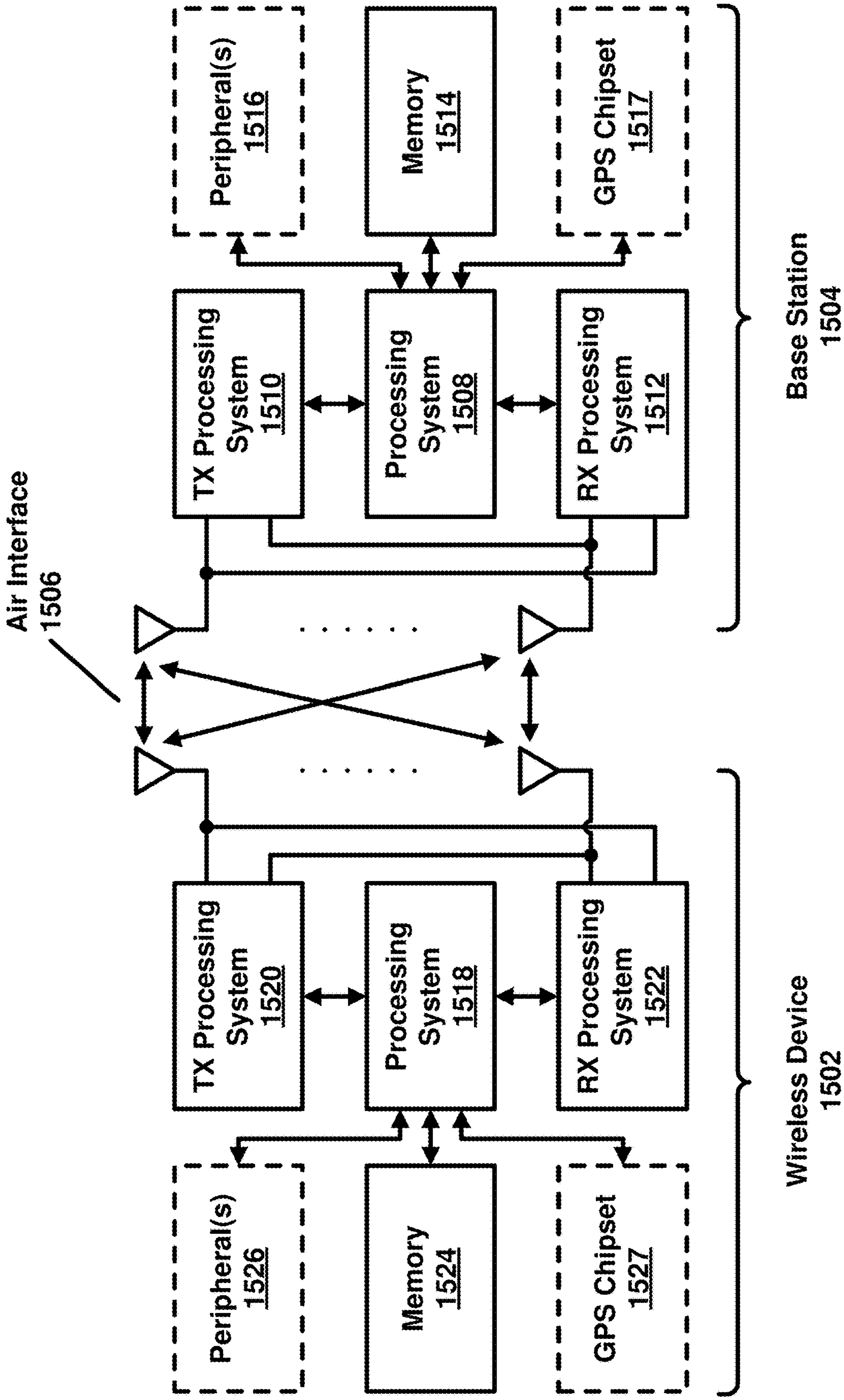
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
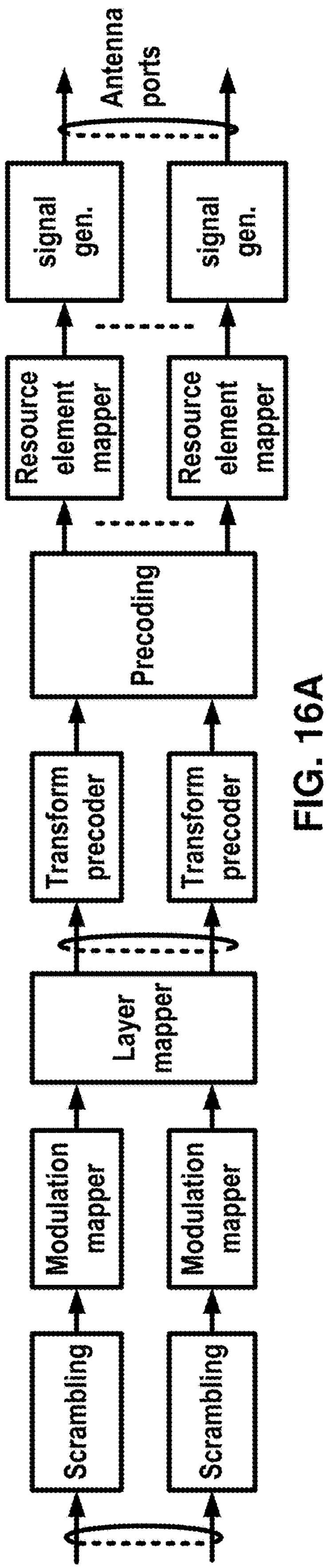
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

Figure 16B:
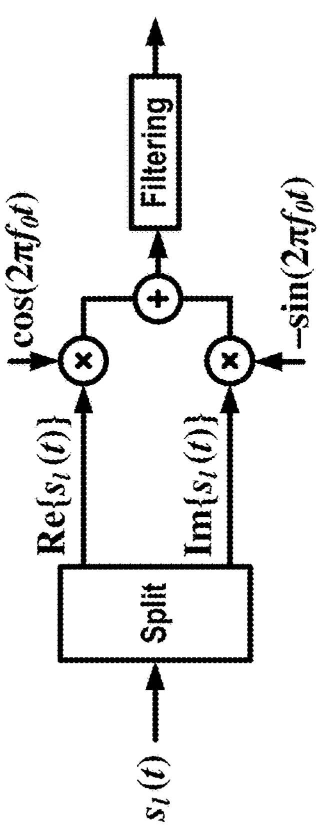

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

Figure 16D:
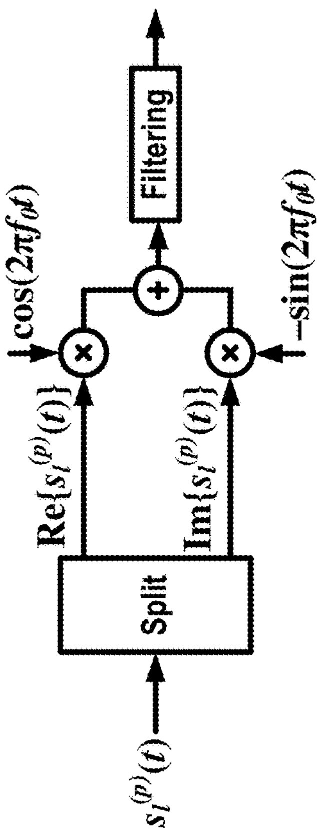
Figure 16C:
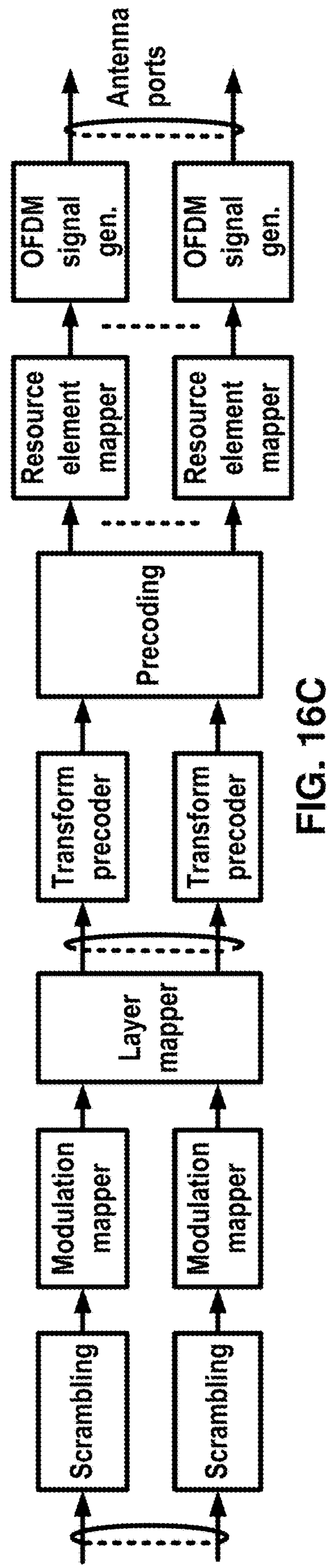

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A base station may transmit one or more MAC PDUs to a wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., aligned to a multiple of eight bits) in length. In an example, a MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. In an example, a MAC subheader may be placed immediately in front of a corresponding MAC SDU, MAC CE, or padding. A MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: an R field with a one-bit length; an F field with a one-bit length; an LCID field with a multi-bit length; an L field with a multi-bit length, or a combination thereof.

Figure 17A:
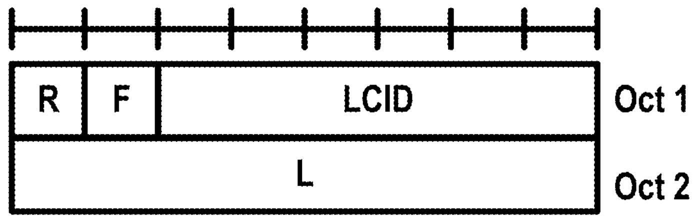
FIG. 17A, FIG. 17B and FIG. 17C show examples of MAC subheaders.
Figure 17B:
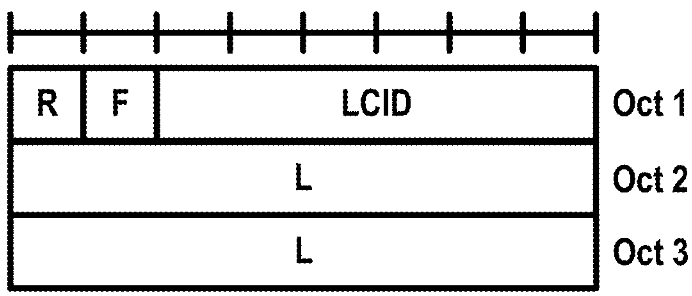
Figure 17C:
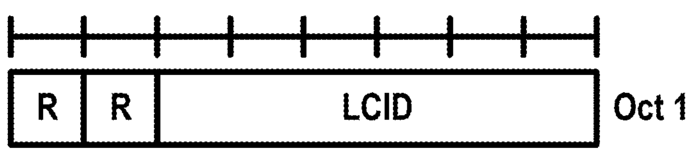

FIG. 17A shows an example of a MAC subheader with an R field, an F field, an LCID field, and an L field. In the example MAC subheader of FIG. 17A, the LCID field may be six bits in length, and the L field may be eight bits in length. FIG. 17B shows example of a MAC subheader with an R field, a F field, an LCID field, and an L field. In the example MAC subheader shown in FIG. 17B, the LCID field may be six bits in length, and the L field may be sixteen bits in length. When a MAC subheader corresponds to a fixed sized MAC CE or padding, the MAC subheader may comprise: a R field with a two-bit length and an LCID field with a multi-bit length. FIG. 17C shows an example of a MAC subheader with an R field and an LCID field. In the example MAC subheader shown in FIG. 17C, the LCID field may be six bits in length, and the R field may be two bits in length.

Figure 18A:
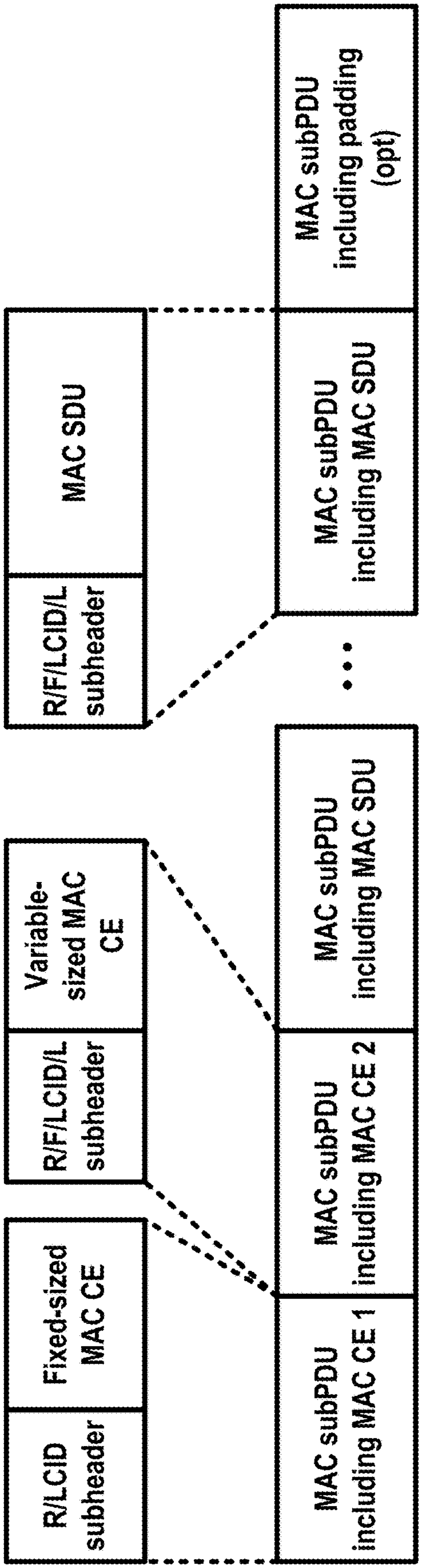
FIG. 18A shows an example of a DL MAC PDU.
Figure 18B:
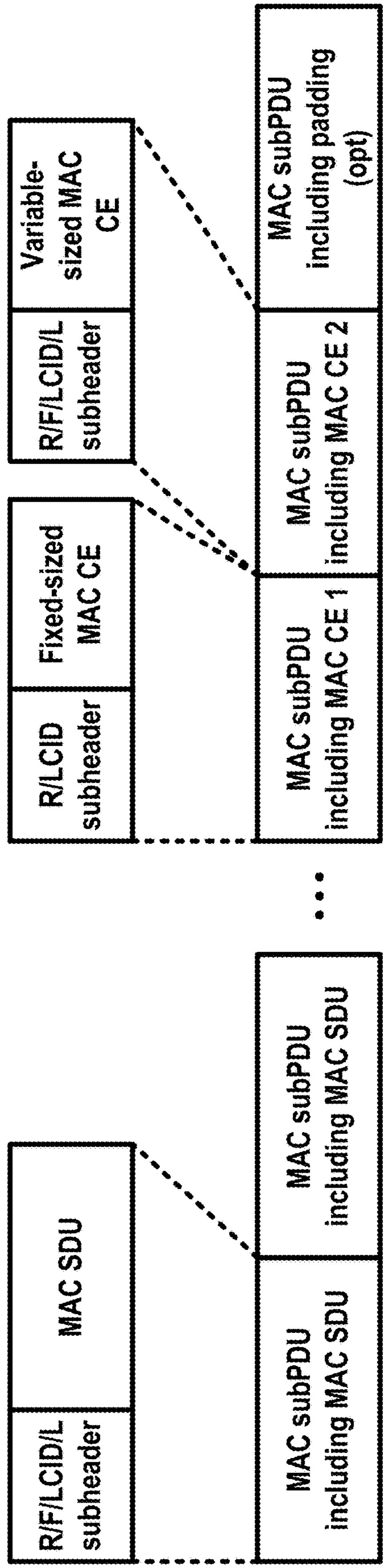
FIG. 18B shows an example of an UL MAC PDU.

FIG. 18A shows an example of a DL MAC PDU. Multiple MAC CEs, such as MAC CE 1 and 2, may be placed together. A MAC subPDU, comprising a MAC CE, may be placed before: a MAC subPDU comprising a MAC SDU, or a MAC subPDU comprising padding. FIG. 18B shows an example of a UL MAC PDU. Multiple MAC CEs, such as MAC CE 1 and 2, may be placed together. In an embodiment, a MAC subPDU comprising a MAC CE may be placed after all MAC subPDUs comprising a MAC SDU. In addition, the MAC subPDU may be placed before a MAC subPDU comprising padding.

In an example, a MAC entity of a base station may transmit one or more MAC CEs to a MAC entity of a wireless device. FIG. 19 shows an example of multiple LCIDs that may be associated with the one or more MAC CEs. The one or more MAC CEs comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a wireless device contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of a base station to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the base station one or more MAC CEs. FIG. 20 shows an example of the one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a short truncated BSR, and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an embodiment, a wireless device may support CA for contiguous CCs and/or for non-contiguous CCs. CCs may be organized into cells. For example, CCs may be organized into one primary cell (PCell) and one or more secondary cells (SCells). When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a base station may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a base station may activate or deactivate at least one of the one or more SCells. Upon configuration of an SCell, the SCell may be deactivated unless an SCell state associated with the SCell is set to "activated" or "dormant".

A wireless device may activate/deactivate an SCell in response to receiving an SCell Activation/Deactivation MAC CE. In an example, a base station may transmit, to a wireless device, one or more messages comprising an SCell timer (e.g., sCellDeactivation Timer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising SRS transmissions on the SCell; CQI/PMI/RI/CRI reporting for the SCell; PDCCH monitoring on the SCell; PDCCH monitoring for the SCell; and/or PUCCH transmissions on the SCell. In response to the activating the SCell, the wireless device may start or restart a first SCell timer (e.g., sCellDeactivation Timer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivation Timer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

When an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell. When at least one first PDCCH on an activated SCell indicates an uplink grant or a downlink assignment, a wireless device may restart a first SCell timer (e.g., sCellDeactivation Timer) associated with the activated SCell. In an example, when at least one second PDCCH on a serving cell (e.g., a PCell or an SCell configured with PUCCH, i.e., PUCCH SCell) scheduling the activated SCell indicates an uplink grant or a downlink assignment for the activated SCell, a wireless device may restart the first SCell timer (e.g., sCellDeactivation Timer) associated with the activated SCell. In an example, when an SCell is deactivated, if there is an ongoing random access procedure on the SCell, a wireless device may abort the ongoing random access procedure on the SCell.

Figure 21A:
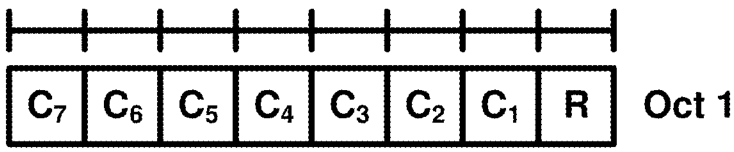
FIG. 21A and FIG. 21B show examples of SCell activation/deactivation MAC CE formats.

FIG. 21A shows an example of an SCell Activation/Deactivation MAC CE of one octet. A first MAC PDU subheader with a first LCID (e.g., '111010' as shown in FIG. 19) may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g., seven) and a second number of R-fields (e.g., one).

Figure 21B:
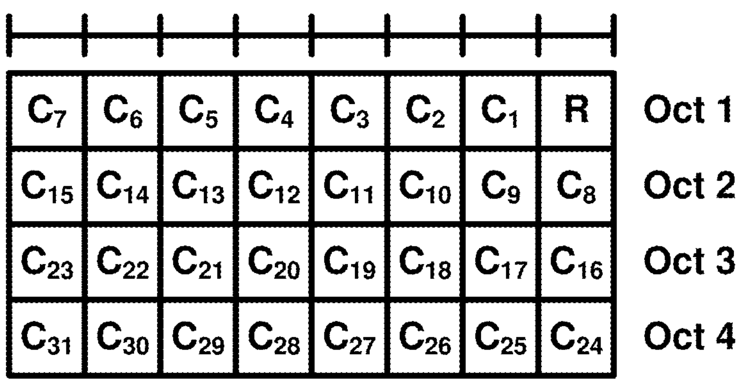

FIG. 21B shows an example of an SCell Activation/Deactivation MAC CE of four octets. A second MAC PDU subheader with a second LCID (e.g., '111001' as shown in FIG. 19) may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 21A and/or FIG. 21B, a C, field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 21A and FIG. 21B, an R field may indicate a reserved bit. The R field may be set to zero.

A base station may configure a wireless device with uplink (UL) bandwidth parts (BWPs) and downlink (DL) BWPs to enable bandwidth adaptation (BA) on a PCell. If carrier aggregation is configured, the base station may further configure the wireless device with at least DL BWP(s)(i.e., there may be no UL BWPs in the UL) to enable BA on an SCell. For the PCell, an initial active BWP may be a first BWP used for initial access. For the SCell, a first active BWP may be a second BWP configured for the wireless device to operate on the SCell upon the SCell being activated. In paired spectrum (e.g., FDD), a base station and/or a wireless device may independently switch a DL BWP and an UL BWP. In unpaired spectrum (e.g., TDD), a base station and/or a wireless device may simultaneously switch a DL BWP and an UL BWP.

In an example, a base station and/or a wireless device may switch a BWP between configured BWPs by means of a DCI or a BWP inactivity timer. When the BWP inactivity timer is configured for a serving cell, the base station and/or the wireless device may switch an active BWP to a default BWP in response to an expiry of the BWP inactivity timer associated with the serving cell. The default BWP may be configured by the network. In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve wireless device battery consumption. BWPs other than the one active UL BWP and the one active DL BWP that the wireless device may work on may be deactivated. On deactivated BWPs, the wireless device may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time. In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-InactivityTimer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

Figure 22:
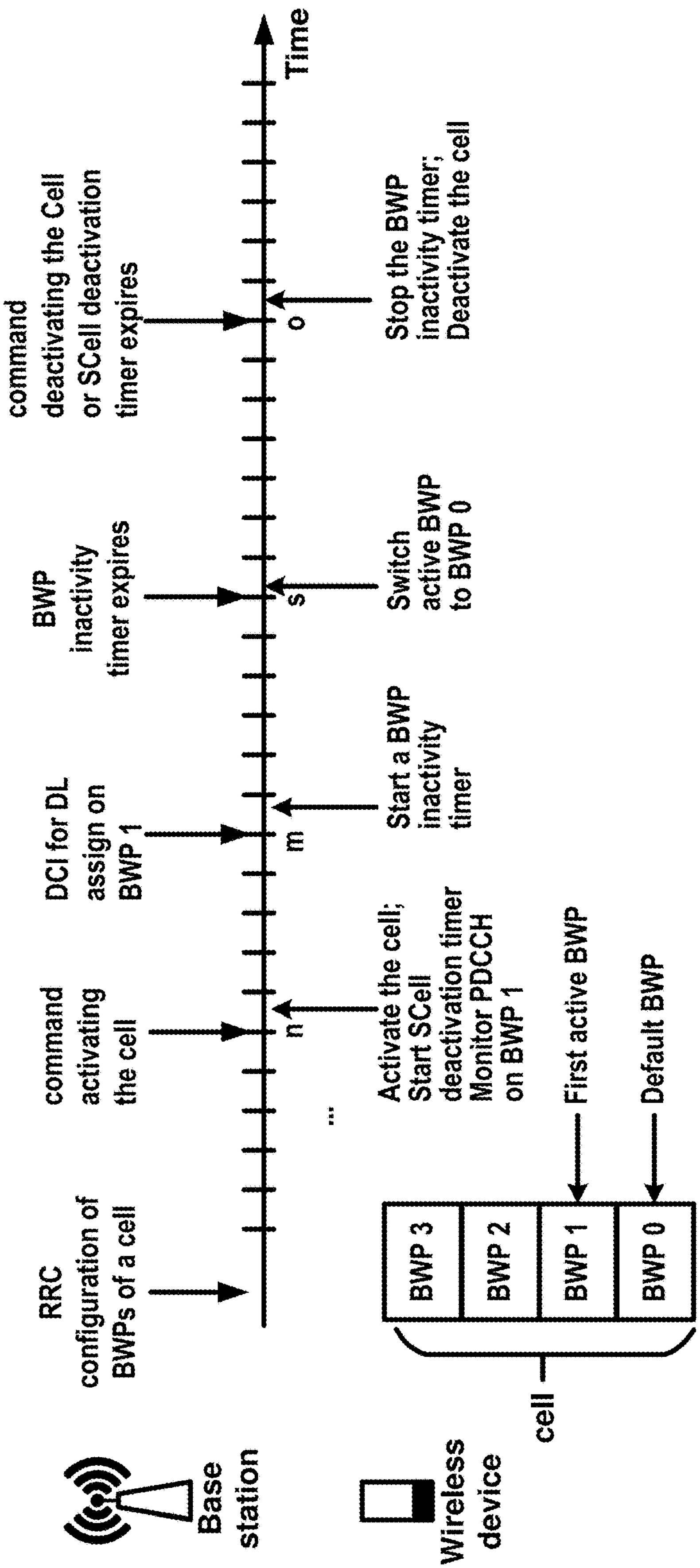
FIG. 22 shows an example of BWP activation/deactivation on a cell.

FIG. 22 shows an example of BWP switching on a cell (e.g., PCell or SCell). In an example, a wireless device may receive, from a base station, at least one RRC message comprising parameters of a cell and one or more BWPs associated with the cell. The RRC message may comprise: RRC connection reconfiguration message (e.g., RRCReconfiguration); RRC connection reestablishment message (e.g., RRCRestablishment); and/or RRC connection setup message (e.g., RRCSetup). Among the one or more BWPs, at least one BWP may be configured as the first active BWP (e.g., BWP 1), one BWP as the default BWP (e.g., BWP 0). The wireless device may receive a command (e.g., RRC message, MAC CE or DCI) to activate the cell at an $n^{th}$ slot. In case the cell is a PCell, the wireless device may not receive the command activating the cell, for example, the wireless device may activate the PCell once the wireless device receives RRC message comprising configuration parameters of the PCell. The wireless device may start monitoring a PDCCH on BWP 1 in response to activating the cell.

In an example, the wireless device may start (or restart) a BWP inactivity timer (e.g., bwp-InactivityTimer) at an $m^{th}$ slot in response to receiving a DCI indicating DL assignment on BWP 1. The wireless device may switch back to the default BWP (e.g., BWP 0) as an active BWP when the BWP inactivity timer expires, at $s^{th}$ slot. The wireless device may deactivate the cell and/or stop the BWP inactivity timer when the sCellDeactivation Timer expires (e.g., if the cell is a SCell). In response to the cell being a PCell, the wireless device may not deactivate the cell and may not apply the sCellDeactivation Timer on the PCell.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-)initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a wireless device may perform the BWP switching to a BWP indicated by the PDCCH. In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a wireless device may be provided by a higher layer parameter Default-DL-BWP a default DL BWP among the configured DL BWPs. If a wireless device is not provided a default DL BWP by the higher layer parameter Default-DL-BWP, the default DL BWP is the initial active DL BWP. In an example, a wireless device may be provided by higher layer parameter bwp-InactivityTimer, a timer value for the primary cell. If configured, the wireless device may increment the timer, if running, every interval of 1 millisecond for frequency range 1 or every 0.5 milliseconds for frequency range 2 if the wireless device may not detect a DCI format 1_1 for paired spectrum operation or if the wireless device may not detect a DCI format 1_1 or DCI format 0_1 for unpaired spectrum operation during the interval.

In an example, if a wireless device is configured for a secondary cell with higher layer parameter Default-DL-BWP indicating a default DL BWP among the configured DL BWPs and the wireless device is configured with higher layer parameter bwp-Inactivity Timer indicating a timer value, the wireless device procedures on the secondary cell may be same as on the primary cell using the timer value for the secondary cell and the default DL BWP for the secondary cell.

In an example, if a wireless device is configured by higher layer parameter Active-BWP-DL-SCell a first active DL BWP and by higher layer parameter Active-BWP-UL-SCell a first active UL BWP on a secondary cell or carrier, the wireless device may use the indicated DL BWP and the indicated UL BWP on the secondary cell as the respective first active DL BWP and first active UL BWP on the secondary cell or carrier.

In an example, a set of PDCCH candidates for a wireless device to monitor is defined in terms of PDCCH search space sets. A search space set comprises a CSS set or a USS set. A wireless device monitors PDCCH candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by a SI-RNTI on the primary cell of the MCG, a Type1-PDCCH CSS set configured by ra-SearchSpace in PDCCH-ConfigCommon for a DCI format with CRC scrambled by a RA-RNTI, a MsgB-RNTI, or a TC-RNTI on the primary cell, a Type2-PDCCH CSS set configured by pagingSearch Space in PDCCH-ConfigCommon for a DCI format with CRC scrambled by a P-RNTI on the primary cell of the MCG, a Type3-PDCCH CSS set configured by SearchSpace in PDCCH-Config with searchSpace Type=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, only for the primary cell, C-RNTI, MCS-C-RNTI, or CS-RNTI(s), and a USS set configured by SearchSpace in PDCCH-Config with searchSpace Type=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

In an example, a wireless device determines a PDCCH monitoring occasion on an active DL BWP based on one or more PDCCH configuration parameters (e.g., based on example embodiment of FIG. 27) comprising: a PDCCH monitoring periodicity, a PDCCH monitoring offset, and a PDCCH monitoring pattern within a slot. For a search space set (SS s), the wireless device determines that a PDCCH monitoring occasion(s) exists in a sit with number $$n_{s,f}^{\mu}$$

in a frame with number $n_f$ if $$\left(n_f \cdot N_{slot}^{frame,\mu} + n_{s,f}^{\mu} - o_s\right) \bmod k_s = 0. \ N_{slot}^{frame,\mu}$$

is a number of slots in a frame when numerology μ is configured. $o_s$ is a slot offset indicated in the PDCCH configuration parameters (e.g., based on example embodiment of FIG. 27). $k_s$ is a PDCCH monitoring periodicity indicated in the PDCCH configuration parameters (e.g., based on example embodiment of FIG. 27). The wireless device monitors PDCCH candidates for the search space set for $T_s$ consecutive slots, starting from slot $$n_{s,f}^{\mu},$$

and does not monitor PDCCH candidates for search space set s for the next $k_s$-$T_S$ consecutive slots. In an example, a USS at CCE aggregation level L∈{1, 2, 4, 8, 16} is defined by a set of PDCCH candidates for CCE aggregation level L.

In an example, a wireless device decides, for a search space set s associated with CORESET μ, CCE indexes for aggregation level L corresponding to PDCCH candidate $m_{s,n_{CI}}$ of the search space set in slot $$n_{s,f}^{\mu}$$

for an active DL BWP of a serving cell corresponding to carrier indicator field value $n_{CI}$ as $$L\cdot\left\{\left(Y_{p,n_{s,f}^{\mu}}+\left\lfloor\frac{m_{s,n_{CI}}\cdot N_{CCE,p}}{L\cdot M_{s,max}^{(L)}}\right\rfloor+n_{CI}\right)\bmod\lfloor N_{CCE,p}/L\rfloor\right\}+i,$$

where, $$Y_{p,n_{s,f}^{\mu}}=0 \text{ for any } CSS;$$

$$Y_{p,n_{s,f}^{\mu}}=\left(A_p\cdot Y_{p,n_{s,f}^{\mu}-1}\right)\bmod D \text{ for a } USS,$$

$$Y_{p,-1}=n_{RNTI}\neq 0,$$

$$A_p=39827 \text{ for } p \bmod 3=0,$$

$$A_p=39829 \text{ for } p \bmod 3=1,$$

$$A_p=39839 \text{ for } p \bmod 3=2,$$

and $$D=65537;$$

i=0, . . . , L−1; $N_{CCE,p}$ is the number of CCEs, numbered from 0 to $N_{CCE,p}-1$, in CORESET p; $n_{CI}$ is the carrier indicator field value if the wireless device is configured with a carrier indicator field by CrossCarrierSchedulingConfig for the serving cell on which PDCCH is monitored; otherwise, including for any CSS, $n_{CI}=0$; $m_{s,n_{CI}}=0, \ldots,$ $$M_{s,n_{CI}}^{(L)}-1,$$

where $$M_{s,n_{CI}}^{(L)}$$

is the number of PDCCH candidates the wireless device is configured to monitor for aggregation level L of a search space set s for a serving cell corresponding to $n_{CI}$; for any $$CSS,\ M_{s,max}^{(L)}=M_{s,0}^{(L)};$$

for a USS, $$M_{s,max}^{(L)}$$

is the maximum of $$M_{s,n_{CI}}^{(L)}$$

over all configured $n_{CI}$ values for a CCE aggregation level L of search space set s; and the RNTI value used for $n_{RNTI}$ is the C-RNTI.

In an example, a wireless device may monitor a set of PDCCH candidates according to configuration parameters of a search space set comprising a plurality of search spaces (SSs). The wireless device may monitor a set of PDCCH candidates in one or more CORESETs for detecting one or more DCIs. A CORESET may be configured based on example embodiment of FIG. 26. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common SSs, and/or number of PDCCH candidates in the UE-specific SSs) and possible (or configured) DCI formats. The decoding may be referred to as blind decoding. The possible DCI formats may be based on example embodiments of FIG. 23.

FIG. 23 shows examples of DCI formats which may be used by a base station transmit control information to a wireless device or used by the wireless device for PDCCH monitoring. Different DCI formats may comprise different DCI fields and/or have different DCI payload sizes. Different DCI formats may have different signaling purposes. In an example, DCI format 0_0 may be used to schedule PUSCH in one cell. DCI format 0_1 may be used to schedule one or multiple PUSCH in one cell or indicate CG-DFI (configured grant-Downlink Feedback Information) for configured grant PUSCH, etc. The DCI format(s) which the wireless device may monitor in a SS may be configured.

FIG. 24A shows an example of configuration parameters of a master information block (MIB) of a cell (e.g., PCell). In an example, a wireless device, based on receiving primary synchronization signal (PSS) and/or secondary synchronization signal (SSS), may receive a MIB via a PBCH. The configuration parameters of a MIB may comprise six bits (systemFrameNumber) of system frame number (SFN), subcarrier spacing indication (subCarrierSpacingCommon), a frequency domain offset (ssb-SubcarrierOffset) between SSB and overall resource block grid in number of subcarriers, an indication (cellBarred) indicating whether the cell is bared, a DMRS position indication (dmrs-TypeA-Position) indicating position of DMRS, parameters of CORESET and SS of a PDCCH (pdcch-ConfigSIB1) comprising a common CORESET, a common search space and necessary PDCCH parameters, etc.

In an example, a pdcch-ConfigSIB1 may comprise a first parameter (e.g., controlResourceSetZero) indicating a common ControlResourceSet (CORESET) with ID #0 (e.g., CORESET #0) of an initial BWP of the cell. controlResourceSetZero may be an integer between 0 and 15. Each integer between 0 and 15 may identify a configuration of CORESET #0.

FIG. 24B shows an example of a configuration of CORESET #0. As shown in FIG. 24B, based on a value of the integer of controlResourceSetZero, a wireless device may determine a SSB and CORESET #0 multiplexing pattern, a number of RBs for CORESET #0, a number of symbols for CORESET #0, an RB offset for CORESET #0.

In an example, a pdcch-ConfigSIB1 may comprise a second parameter (e.g., searchSpaceZero) indicating a common search space with ID #0 (e.g., SS #0) of the initial BWP of the cell. searchSpaceZero may be an integer between 0 and 15. Each integer between 0 and 15 may identify a configuration of SS #0.

FIG. 24C shows an example of a configuration of SS #0. As shown in FIG. 24C, based on a value of the integer of searchSpaceZero, a wireless device may determine one or more parameters (e.g., O, M) for slot determination of PDCCH monitoring, a first symbol index for PDCCH monitoring and/or a number of search spaces per slot.

In an example, based on receiving a MIB, a wireless device may monitor PDCCH via SS #0 of CORESET #0 for receiving a DCI scheduling a system information block 1 (SIB1). A SIB1 message may be implemented based on example embodiment of FIG. 25. The wireless device may receive the DCI with CRC scrambled with a system information radio network temporary identifier (SI-RNTI) dedicated for receiving the SIB1.

FIG. 25 shows an example of RRC configuration parameters of system information block (SIB). A SIB (e.g., SIB1) may be transmitted to all wireless devices in a broadcast way. The SIB may contain information relevant when evaluating if a wireless device is allowed to access a cell, information of paging configuration and/or scheduling configuration of other system information. A SIB may contain radio resource configuration information that is common for all wireless devices and barring information applied to a unified access control. In an example, a base station may transmit to a wireless device (or a plurality of wireless devices) one or more SIB information. As shown in FIG. 25, parameters of the one or more SIB information may comprise: one or more parameters (e.g., cellSelectionInfo) for cell selection related to a serving cell, one or more configuration parameters of a serving cell (e.g., in ServingCellConfigCommonSIB IE), and one or more other parameters. The ServingCellConfigCommonSIB IE may comprise at least one of: common downlink parameters (e.g., in DownlinkConfigCommonSIB IE) of the serving cell, common uplink parameters (e.g., in UplinkConfigCommonSIB IE) of the serving cell, and other parameters.

In an example, a DownlinkConfigCommonSIB IE may comprise parameters of an initial downlink BWP (initialDownlinkBWP IE) of the serving cell (e.g., SpCell). The parameters of the initial downlink BWP may be comprised in a BWP-DownlinkCommon IE (as shown in FIG. 26). The BWP-DownlinkCommon IE may be used to configure common parameters of a downlink BWP of the serving cell. The base station may configure the locationAndBandwidth so that the initial downlink BWP contains the entire CORESET #0 of this serving cell in the frequency domain. The wireless device may apply the locationAndBandwidth upon reception of this field (e.g., to determine the frequency position of signals described in relation to this locationAndBandwidth) but it keeps CORESET #0 until after reception of RRCSetup/RRCResume/RRCReestablishment.

In an example, the DownlinkConfigCommonSIB IE may comprise parameters of a paging channel configuration. The parameters may comprise a paging cycle value (T, by defaultPagingCycle IE), a parameter (nAndPagingFrameOffset IE) indicating total number N) of paging frames (PFs) and paging frame offset (PF_offset) in a paging DRX cycle, a number (Ns) for total paging occasions (POs) per PF, a first PDCCH monitoring occasion indication parameter (firstPDCCH-MonitoringOccasionofPO IE) indicating a first PDCCH monitoring occasion for paging of each PO of a PF. The wireless device, based on parameters of a PCCH configuration, may monitor PDCCH for receiving paging message.

In an example, the parameter first-PDCCH-MonitoringOccasionOfPO may be signaled in SIB1 for paging in initial DL BWP. For paging in a DL BWP other than the initial DL BWP, the parameter first-PDCCH-MonitoringOccasionOfPO may be signaled in the corresponding BWP configuration.

FIG. 26 shows an example of RRC configuration parameters (e.g., BWP-DownlinkCommon IE) in a downlink BWP of a serving cell. A base station may transmit to a wireless device (or a plurality of wireless devices) one or more configuration parameters of a downlink BWP (e.g., initial downlink BWP) of a serving cell. As shown in FIG. 26, the one or more configuration parameters of the downlink BWP may comprise: one or more generic BWP parameters of the downlink BWP, one or more cell specific parameters for PDCCH of the downlink BWP (e.g., in pdcch-ConfigCommon IE), one or more cell specific parameters for the PDSCH of this BWP (e.g., in pdsch-ConfigCommon IE), and one or more other parameters. A pdcch-ConfigCommon IE may comprise parameters of CORESET #0 (e.g., controlResourceSetZero) which may be used in any common or UE-specific search spaces. A value of the controlResourceSetZero may be interpreted like the corresponding bits in MIB pdcch-ConfigSIB1. A pdcch-ConfigCommon IE may comprise parameters (e.g., in commonControlResourceSet) of an additional common control resource set which may be configured and used for any common or UE-specific search space. If the network configures this field, it uses a ControlResourceSetId other than 0 for this ControlResourceSet. The network configures the commonControlResourceSet in SIB1 so that it is contained in the bandwidth of CORESET #0. A pdcch-ConfigCommon IE may comprise parameters (e.g., in commonSearchSpaceList) of a list of additional common search spaces. Parameters of a search space may be implemented based on example of FIG. 27. A pdcch-ConfigCommon IE may indicate, from a list of search spaces, a search space for paging (e.g., pagingSearchSpace), a search space for random access procedure (e.g., ra-SearchSpace), a search space for SIB1 message (e.g., searchSpaceSIB1), a common search space #0 (e.g., searchSpaceZero), and one or more other search spaces.

As shown in FIG. 26, a control resource set (CORESET) may be associated with a CORESET index (e.g., ControlResourceSetId). A CORESET may be implemented based on example embodiments described above with respect to FIG. 14A and/or FIG. 14B. The CORESET index with a value of 0 may identify a common CORESET configured in MIB and in ServingCellConfigCommon (controlResourceSetZero) and may not be used in the ControlResourceSet IE. The CORESET index with other values may identify CORESETs configured by dedicated signaling or in SIB1. The controlResourceSetId is unique among the BWPs of a serving cell. A CORESET may be associated with coresetPoolIndex indicating an index of a CORESET pool for the CORESET. A CORESET may be associated with a time duration parameter (e.g., duration) indicating contiguous time duration of the CORESET in number of symbols. In an example, as shown in FIG. 26, configuration parameters of a CORESET may comprise at least one of: frequency resource indication (e.g., frequencyDomainResources), a CCE-REG mapping type indicator (e.g., cce-REG-MappingType), a plurality of TCI states, an indicator indicating whether a TCI is present in a DCI, and the like. The frequency resource indication, comprising a number of bits (e.g., 45 bits), may indicate frequency domain resources, each bit of the indication corresponding to a group of 6 RBs, with grouping starting from the first RB group in a BWP of a cell (e.g., SpCell, SCell). The first (left-most/most significant) bit may correspond to the first RB group in the BWP, and so on. A bit that is set to 1 may indicate that an RB group, corresponding to the bit, belongs to the frequency domain resource of this CORESET. Bits corresponding to a group of RBs not fully contained in the BWP within which the CORESET is configured may be set to zero.

FIG. 27 shows an example of configuration of a search space (e.g., SearchSpace IE). In an example, one or more search space configuration parameters of a search space may comprise at least one of: a search space ID (searchSpaceId), a control resource set ID (controlResourceSetId), a monitoring slot periodicity and offset parameter (monitoringSlotPeriodicityAndOffset), a search space time duration value (duration), a monitoring symbol indication (monitoringSymbolsWithinSlot), a number of candidates for an aggregation level (nrofCandidates), and/or a SS type indicating a common SS type or a UE-specific SS type (searchSpaceType). The monitoring slot periodicity and offset parameter may indicate slots (e.g., in a radio frame) and slot offset (e.g., related to a starting of a radio frame) for PDCCH monitoring. The monitoring symbol indication may indicate on which symbol(s) of a slot a wireless device may monitor PDCCH on the SS. The control resource set ID may identify a control resource set on which a SS may be located.

In an example, a wireless device, in RRC_IDLE or RRC_INACTIVE state, may periodically monitor paging occasions (POs) for receiving paging message for the wireless device. Before monitoring the POs, the wireless device, in RRC_IDLE or RRC_INACTIVE state, may wake up at a time before each PO for preparation and/or turn all components in preparation of data reception (warm up). The gap between the waking up and the PO may be long enough to accommodate all the processing requirements. The wireless device may perform, after the warming up, timing acquisition from SSB and coarse synchronization, frequency and time tracking, time and frequency offset compensation, and/or calibration of local oscillator. After that, the wireless device may monitor a PDCCH for a paging DCI in one or more PDCCH monitoring occasions based on configuration parameters of the PCCH configuration configured in SIB1. The configuration parameters of the PCCH configuration may be implemented based on example embodiments described above with respect to FIG. 25.

In an example, a base station may transmit one or more SSBs periodically to a wireless device, or a plurality of wireless devices. The wireless device (in RRC_idle state, RRC_inactive state, or RRC_connected state) may use the one or more SSBs for time and frequency synchronization with a cell of the base station. An SSB, comprising a primary synchronization signal (PSS), a secondary synchronization signal (SSS), a physical broadcast channel (PBCH), a PBCH DM-RS, may be transmitted based on example embodiments described above with respect to FIG. 11A. An SSB may occupy a number (e.g., 4) of OFDM symbols as shown in FIG. 11A. The base station may transmit one or more SSBs in a SSB burst, e.g., to enable beam-sweeping for PSS/SSS and PBCH. An SSB burst comprise a set of SSBs, each SSB potentially be transmitted on a different beam. SSBs in the SSB burst may be transmitted in time-division multiplexing fashion. In an example, an SSB burst may be always confined to a 5 ms window and is either located in first-half or in the second-half of a 10 ms radio frame. In this specification, an SSB burst may be equivalently referred to as a transmission window (e.g., 5 ms) in which the set of SSBs are transmitted.

In an example, the base station may indicate a transmission periodicity of SSB via RRC message (e.g., ssb-PeriodicityServingCell in ServingCellConfigCommonSIB of SIB1 message, as shown in FIG. 25). A candidate value of the transmission periodicity may be in a range of {5 ms, 10 ms, 20 ms, 40 ms, 80 ms, 160 ms}. The maximum number of candidate SSBs ($L_{max}$) within an SSB burst depends upon a carrier frequency/band of the cell. In an example, $L_{max}$=4 if $f_c$<=3 GHZ, wherein $f_c$ is the carrier frequency of the cell. $L_{max}$=8 if 3 GHZ<$f_c$<=6 GHZ. $L_{max}$=64 if $f_c$>=6 GHZ, etc.

In an example, a starting OFDM symbol index of a candidate SSB (occupying 4 OFDM symbols) within a SSB burst (5 ms) may depend on a subcarrier spacing (SCS) and a carrier frequency band of the cell.

FIG. 28 shows an example embodiment of starting OFDM symbol index determination.

As shown in FIG. 28, starting OFDM symbol indexes of SSBs in a SSB burst, for a cell configured with 15 kHz and carrier frequency $f_c$<3 GHZ ($L_{max}$=4), are 2, 8, 16, and 22. OFDM symbols in a half-frame are indexed with the first symbol of the first slot being indexed as 0. Starting OFDM symbol indexes of SSBs in a SSB burst, for a cell configured with 15 kHz and carrier frequency 3 GHZ<$f_c$<6 GHZ ($L_{max}$=8), are 2, 8, 16, 22, 30, 36, 44 and 50, etc. In an example, when the base station is not transmitting the SSBs with beam forming, the base station may transmit only one SSB by using the first SSB starting position.

Figure 29:
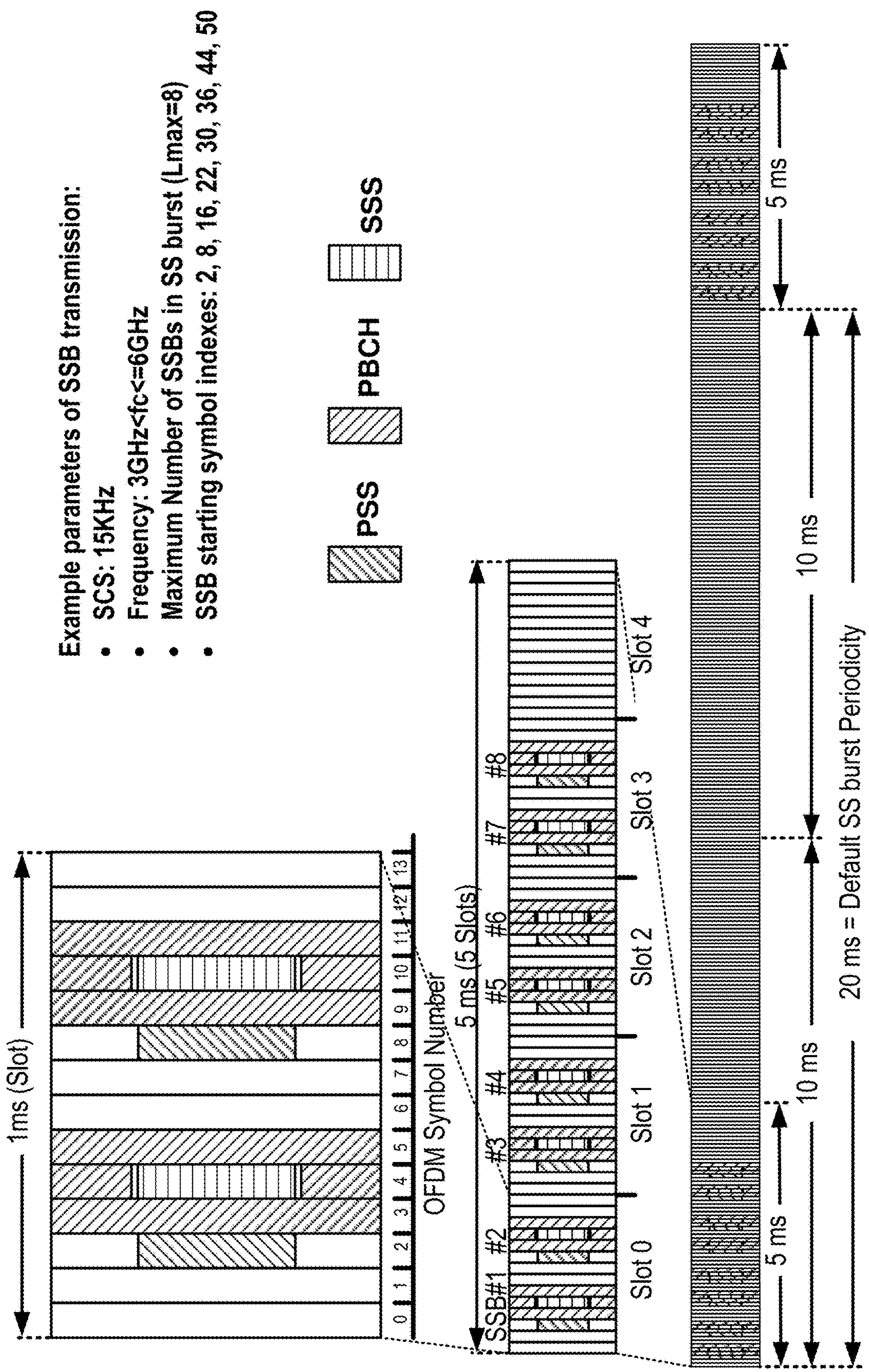
FIG. 29 shows an example of SSB transmissions of a base station.

FIG. 29 shows an example embodiment of SSB transmission of a cell by a base station. In the example of FIG. 29, a SCS of the cell is 15 kHz, and the cell is configured with 3 GHz<$f_c$<=6 GHZ. Based on example embodiment of FIG. 28, maximum number of candidate SSBs in a SSB burst is 8 ($L_{max}$=8). As shown in FIG. 29, SSB #1 starts at symbol #2 of 70 symbols in 5 ms, SSB #2 starts at symbol #8, SSB #3 starts at symbol #16, SSB #4 starts at symbol #22, SSB #5 starts at symbol #30, SSB #6 starts at symbol #36, SSB #7 starts at symbol #44, and SSB #8 starts at symbol 50. The SSB burst is transmitted in the first half (not the second half as shown in FIG. 29) of a radio frame with 10 ms.

In an example, the SSB bust (also for each SSB of the SSB burst) may be transmitted in a periodicity. In the example of FIG. 29, a default periodicity of a SSB burst is 20 ms, e.g., before a wireless device receives a SIB1 message for initial access of the cell. The base station, with 20 ms transmission periodicity of SSB (or SSB burst), may transmit the SSB burst in the first 5 ms of each 20 ms. The base station does not transmit the SSB burst in the rest 15 ms of the each 20 ms.

In an example embodiment, a base station may transmit a RRC messages (e.g., SIB1) indicating cell specific configuration parameters of SSB transmission. The cell specific configuration parameters may comprise a value for a transmission periodicity (ssb-PeriodicityServingCell) of a SSB burst, locations of a number of SSBs (e.g., active SSBs), of a plurality of candidate SSBs, comprised in the SSB burst. The plurality of candidate SSBs may be implemented based on example embodiments described above with respect to FIG. 28. The cell specific configuration parameters may comprise position indication of a SSB in a SSB burst (e.g., ssb-PositionsinBurst). The position indication may comprise a first bitmap (e.g., groupPresence) and a second bitmap (e.g., inOneGroup) indicating locations of a number of SSBs comprised in a SSB burst.

Figure 30:
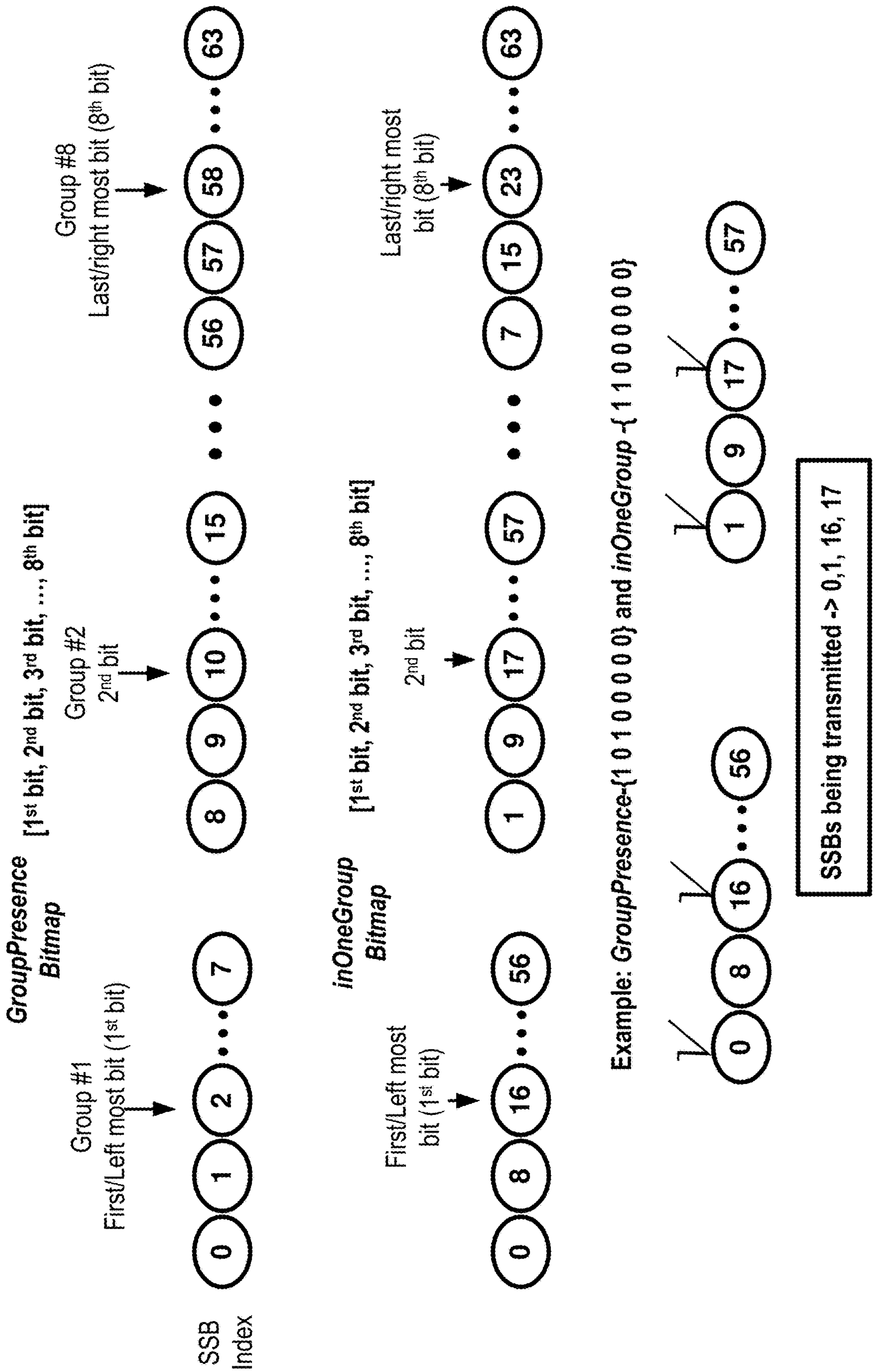
FIG. 30 shows an example of SSB transmissions of a base station.

FIG. 30 shows an example embodiment of SSB location indication in a SSB burst. In the example of FIG. 30, a maximum number of candidate SSBs in an SSB burst is 64. The candidate SSBs may comprise SSBs with indexes from 0 to 63. A first bitmap (groupPresence)(configured by SIB1 message) may comprise a number of bits (e.g., 8), each bit corresponding to a respective group of SSB groups of a plurality of SSBs (which may be the maximum number of candidate SSBs) in a SSB burst. In the example of FIG. 30, a first bit (e.g., left most bit of the first bitmap) may correspond to a first SSB group comprising $1^{st}$ SSB (with SSB index 0), $2^{nd}$ SSB (with SSB index 1), . . . and $8^{th}$ SSB (with SSB index 7). A second bit (e.g., the second bit of the first bitmap) may correspond to a second SSB group comprising $9^{th}$ SSB (with SSB index 8), $10^{th}$ SSB (with SSB index 9), . . . and $16^{th}$ SSB (with SSB index 15). A last bit (e.g., right most bit of the first bitmap) may correspond to an $8^{th}$ SSB group comprising $57^{th}$ SSB (with SSB index 56), $58^{th}$ SSB (with SSB index 57, . . . and $64^{th}$ SSB (with SSB index 63), etc. In an example embodiment, a SSB may belong to at most one SSB group of the first SSB groups. A bit, of the first bitmap, may indicate whether the base station transmit a SSB group, corresponding to the bit, in a SSB burst. In an example, the bit setting to a first value (e.g., 1) may indicate that the corresponding SSB group is transmitted in the SSB burst by the base station. In an example, the bit setting to a second value (e.g., 0) may indicate that the corresponding SSB group is not transmitted in the SSB burst by the base station, or vice versa.

As shown in FIG. 30, a second bitmap (inOneGroup) (configured by SIB1 message) may comprise a number of bits (e.g., 8), each bit corresponding to a respective group of SSB groups of the plurality of SSBs in a SSB burst. In the example of FIG. 30, a first bit (e.g., left most bit of the second bitmap) may correspond to a first SSB group comprising $1^{st}$ SSB (with SSB index 0), $2^{nd}$ SSB (with SSB index 8), . . . and $8^{th}$ SSB (with SSB index 56). A second bit (e.g., the second bit of the second bitmap) may correspond to a second SSB group comprising $1^{st}$ SSB (with SSB index 1), $2^{nd}$ SSB (with SSB index 9), . . . and $8^{th}$ SSB (with SSB index 57). A last bit (e.g., right most bit of the second bitmap) may correspond to an $8^{th}$ SSB group comprising $1^{st}$ SSB (with SSB index 7), $2^{nd}$ SSB (with SSB index 15, . . . and 8th SSB (with SSB index 63), etc. In an example, a SSB may belong to at most one SSB group of the second SSB groups. A bit, of the second bitmap, may indicate whether the base station transmit a SSB group, corresponding to the bit, in a SSB burst. In an example, the bit setting to a first value (e.g., 1) may indicate that the corresponding SSB group is transmitted in the SSB burst by the base station. In an example, the bit setting to a second value (e.g., 0) may indicate that the corresponding SSB group is not transmitted in the SSB burst by the base station, or vice versa.

In the example of FIG. 30, the plurality of SSBs (e.g., with SSB index from 0 to 63) may be grouped, for the first bitmap, into first SSB groups, each SSB comprising SSBs with continuous SSB indexes. A first SSB group of the first SSB groups comprises SSBs with SSB indexes from 0 to 7, a second SSB group comprises SSB indexes from 8 to 15, etc. The plurality of SSBs may be also grouped, for the second bitmap, into second SSB groups, each SSB comprising SSBs with discontinuous SSB indexes. A first SSB group of the second SSB groups comprises SSBs with SSB indexes {0, 8, 16, . . . 56}, SSB index gap between two neighbor SSB indexes being 8. A second SSB group of the second SSB groups comprises SSBs with SSB indexes {1, 9, 17, . . . 57}, etc.

In an example embodiment, when fc≤3 GHZ, maximum number of SSBs within SS burst equals to four and a wireless device may determine that the four leftmost bits of a bitmap (e.g., the first bitmap and/or the second bitmap) are valid. The wireless device may ignore the 4 rightmost bits of the first bitmap and/or the second bitmap.

In the example of FIG. 30, the first bitmap may be indicated, by the base station, as {1 0 1 0 0 0 0 0} and the second bitmap may be indicated as {1 1 0 0 0 0 0 0}. Based on the grouping configuration of the first SSB groups and the second SSB groups, the base station may transmit SSBs with indexes {0 1 16 17} in a SSB burst.

In an example, a base station may transmit a Master Information Block (MIB) on PBCH, to indicate configuration parameters (for CORESET #0) for a wireless device monitoring PDCCH for scheduling a SIB1 message. The base station may transmit a MIB message with a transmission periodicity of 80 millisecond (ms). The same MIB message may be repeated (according to SSB periodicity) within the 80 ms. Contents of a MIB message are same over 80 ms period. The same MIB is transmitted over all SSBs within a SS burst. In an example, PBCH may indicate that there is no associated SIB1, in which case a wireless device may be pointed to another frequency from where to search for an SSB that is associated with a SIB1 as well as a frequency range where the wireless device may assume no SSB associated with SIB1 is present. The indicated frequency range may be confined within a contiguous spectrum allocation of the same operator in which SSB is detected.

In an example, a base station may transmit a SIB1 message with a periodicity of 160 ms. The base station may transmit the same SIB1 message with variable transmission repetition periodicity within 160 ms. A default transmission repetition periodicity of SIB1 is 20 ms. The base station may determine an actual transmission repetition periodicity based on network implementation. In an example, for SSB and CORESET multiplexing pattern 1, SIB1 repetition transmission period is 20 ms. For SSB and CORESET multiplexing pattern 2/3, SIB1 transmission repetition period is the same as the SSB period. SIB1 may comprise information regarding the availability and scheduling (e.g., mapping of SIBs to SI message, periodicity, SI-window size) of other SIBs, an indication whether one or more SIBs are only provided on-demand and in which case, configuration parameters needed by a wireless device to perform an SI request.

In an example, a base station may be equipped with multiple transmission reception points (TRPs) to improve spectrum efficiency or transmission robustness. The base station may transmit DL signals/channels via intra-cell multiple TRPs (e.g., as shown in FIG. 31A) and/or via inter-cell multiple TRPs (e.g., as shown in FIG. 31B).

In an example, a base station may be equipped with more than one TRP. A first TRP may be physically located at a different place from a second TRP. The first TRP may be connected with the second TRP via a backhaul link (e.g., wired link or wireless link), the backhaul link being ideal backhaul link with zero or neglectable transmission latency, or the backhaul link being non-ideal backhaul link. A first TRP may be implemented with antenna elements, RF chain and/or baseband processor independently configured/managed from a second TRP.

Figure 31A:
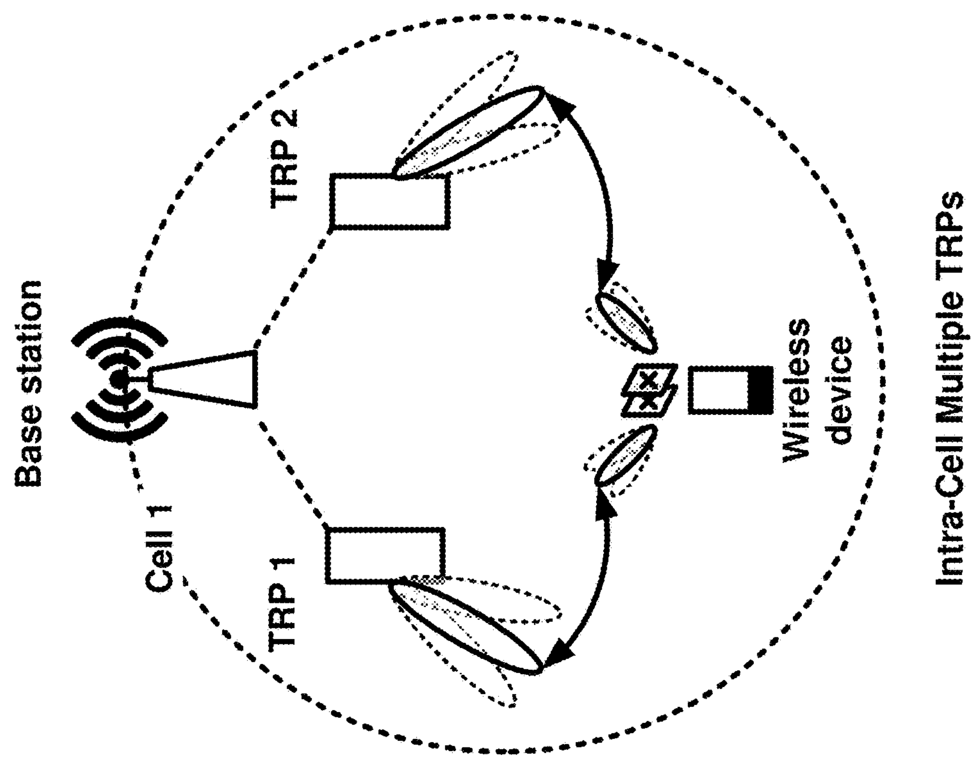
FIG. 31A and FIG. 31B show example embodiments of multiple TRPs configuration.
Figure 31B:
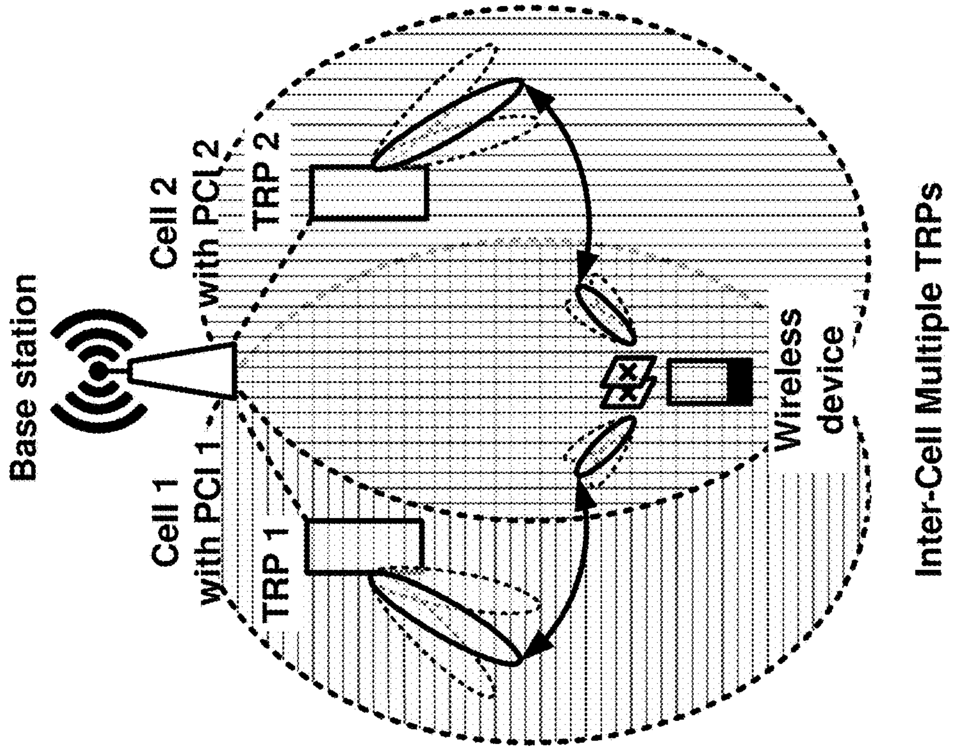

FIG. 31A shows an example of a communication between a base station (equipped with multiple TRPs) and a wireless device (equipped with single panel or multiple panels) based on intra-cell TRPs. Transmission and reception with multiple TRPs may improve system throughput and/or transmission robustness for a wireless communication in a high frequency (e.g., above 6 GHZ). In an example, the multiple TRPs are associated with a same physical cell identifier (PCI). Multiple TRPs on which PDCCH/PDSCH/PUCCH/PUSCH resources of a cell are shared may be referred to as intra-cell TRPs (or intra-PCI TRPs).

In an example, a TRP of multiple TRPs of the base station may be identified by at least one of: a TRP identifier (ID), a virtual cell index, or a reference signal index (or group index). In an example, in a cell, a TRP may be identified by a control resource set (coreset) group (or pool) index (e.g., CORESETPoolIndex as shown in FIG. 26) of a coreset group from which a DCI is transmitted from the base station on a coreset. In an example, a TRP ID of a TRP may comprise a TRP index indicated in the DCI. In an example, a TRP ID of a TRP may comprise a TCI state group index of a TCI state group. A TCI state group may comprise at least one TCI state with which the wireless device receives the downlink TBs, or with which the base station transmits the downlink TBs.

In an example, a base station may transmit to a wireless device one or more RRC messages comprising configuration parameters of a plurality of CORESETs on a cell (or a BWP of the cell). Each of the plurality of CORESETs may be identified with a CORESET index and may be associated with (or configured with) a CORESET pool (or group) index. One or more CORESETs, of the plurality of CORESETs, having a same CORESET pool index may indicate that DCIs received on the one or more CORESETs are transmitted from a same TRP of a plurality of TRPs of the base station. The wireless device may determine receiving beams (or spatial domain filters) for PDCCHs/PDSCHs based on a TCI indication (e.g., DCI) and a CORESET pool index associated with a CORESET for the DCI.

In an example, a wireless device may receive multiple PDCCHs scheduling fully/partially/non-overlapped PDSCHs in time and frequency domain, when the wireless device receives one or more RRC messages (e.g., PDCCH-Config IE) comprising a first CORESET pool index (e.g., CORESETPoolIndex) value and a second CORESET pool index in ControlResourceSet IE. The wireless device may determine the reception of full/partially overlapped PDSCHs in time domain only when PDCCHs that schedule two PDSCHs are associated to different ControlResourceSets having different values of CORESETPoolIndex.

In an example, a wireless device may assume (or determine) that the ControlResourceSet is assigned with CORESETPoolIndex as 0 for a ControlResourceSet without CORESETPoolIndex. When the wireless device is scheduled with full/partially/non-overlapped PDSCHs in time and frequency domain, scheduling information for receiving a PDSCH is indicated and carried only by the corresponding PDCCH. The wireless device is expected to be scheduled with the same active BWP and the same SCS. In an example, a wireless device can be scheduled with at most two codewords simultaneously when the wireless device is scheduled with full/partially overlapped PDSCHs in time and frequency domain.

In an example, when PDCCHs that schedule two PDSCHs are associated to different ControlResourceSets having different values of CORESETPoolIndex, the wireless device is allowed to the following operations: for any two HARQ process IDs in a given scheduled cell, if the wireless device is scheduled to start receiving a first PDSCH starting in symbol j by a PDCCH associated with a value of CORESETPoolIndex ending in symbol i, the wireless device can be scheduled to receive a PDSCH starting earlier than the end of the first PDSCH with a PDCCH associated with a different value of CORESETPoolIndex that ends later than symbol i; in a given scheduled cell, the wireless device can receive a first PDSCH in slot i, with the corresponding HARQ-ACK assigned to be transmitted in slot j, and a second PDSCH associated with a value of CORESETPoolIndex different from that of the first PDSCH starting later than the first PDSCH with its corresponding HARQ-ACK assigned to be transmitted in a slot before slot j.

In an example, if a wireless device configured by higher layer parameter PDCCH-Config that contains two different values of CORESETPoolIndex in ControlResourceSet, for both cases, when tci-PresentInDCI is set to 'enabled' and tci-PresentInDCI is not configured in RRC connected mode, if the offset between the reception of the DL DCI and the corresponding PDSCH is less than the threshold timeDurationForQCL, the wireless device may assume that the DM-RS ports of PDSCH associated with a value of CORESETPoolIndex of a serving cell are quasi co-located with the RS(s) with respect to the QCL parameter(s) used for PDCCH quasi co-location indication of the CORESET associated with a monitored search space with the lowest CORESET-ID among CORESETs, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the wireless device. If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint indicates two TCI states, the wireless device may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states.

FIG. 31B shows an example of a communication between a base station (equipped with multiple TRPs) and a wireless device (equipped with single panel or multiple panels) based on inter-cell TRPs (or inter-PCI TRPs). Different from FIG. 31A, the multiple TRPs are associated with different PCIs. In an example, different from FIG. 31A, the multiple TRPs are associated with (or belong to) different physical cells (Cell 1 with PCI 1 and Cell 2 with PCI 2), which may be referred to as inter-cell TRPs (or inter-PCI TRPs). A cell may be a serving cell or a non-serving (neighbor) cell of the wireless device. When operating the inter-cell TRPs for a wireless device, a base station may configure Cell 2 with PCI 2 as a part of Cell 1 with PCI 1 (e.g., a second TRP with a second PCI different from a first PCI of a first TRP), in which case, the wireless device may receive $1^{st}$ SSBs from Cell 1 with PCI 1 and receive $2^{nd}$ SSBs from Cell 2 with PCI 2. The $1^{st}$ SSBs and the $2^{nd}$ SSBs may have different configuration parameters, wherein the configuration parameters may be implemented based on example embodiments described above with respect to FIG. 28, FIG. 29 and/or FIG. 30. With the inter-cell TRPs, the wireless device may receive PDCCHs/PDSCHs and/or transmit PUCCH/PUSCHs on Cell 1 with PCI1 and Cell 2 with PCI 2 with different TCI states (e.g., one being associated with one of the $1^{st}$ SSBs, another being associated with one of the $2^{nd}$ SSBs, etc.).

In an example, a serving cell may be a cell (e.g., PCell, SCell, PSCell, etc.) on which the wireless device receives SSB/CSI-RS/PDCCH/PDSCH and/or transmits PUCCH/

PUSCH/SRS etc. The serving cell is identified by a serving cell index (e.g., ServCellIndex or SCellIndex configured in RRC message). For a wireless device in RRC_CONNECTED not configured with CA/DC, there is only one serving cell comprising of the primary cell. For a wireless device in RRC_CONNECTED configured with CA/DC the term 'serving cells' is used to denote the set of cells comprising of the Special Cell(s) and all secondary cells. For a wireless device configured with CA, a cell providing additional radio resources on top of Special Cell is referred to as a secondary cell.

In an example, a non-serving (or neighbor) cell may be a cell on which the wireless device does not receive MIBs/SIBs/PDCCH/PDSCH and/or does not transmit PUCCH/PUSCH/SRS etc. The non-serving cell has a physical cell identifier (PCI) different from a PCI of a serving cell. The non-serving cell may not be identified by (or associated with) a serving cell index (e.g., ServCellIndex or SCellIndex). The wireless device may rely on a SSB of a non-serving cell for Tx/Rx beam (or spatial domain filter) determination (for PDCCH/PDSCH/PUCCH/PUSCH/CSI-RS/SRS for a serving cell, etc.) if a TCI state of the serving cell is associated with (e.g., in TCI-state IE of TS 38.331) a SSB of the non-serving cell. The base station does not transmit RRC messages configuring resources of PDCCH/PDSCH/PUCCH/PUSCH/SRS of a non-serving cell for the wireless device.

In the example of FIG. 31B, for a specific wireless device, Cell 1 is a serving cell and is associated with a first TRP (TRP 1). Cell 2 is a non-serving (or neighbor) cell and is associated with a second TRP. A base station may transmit to a wireless device one or more RRC messages comprising configuration parameters of Cell 1. The configuration parameters of Cell 1 may indicate a plurality of additional PCI configurations (e.g., SSB-MTC-AdditionalPCI IE) for a plurality of (non-serving or neighbor) cells for cell 1, each additional PCI configuration corresponding to a (non-serving or neighbor) cell having a PCI different from the PCI value of the serving cell, and comprising: an additional PCI index (AdditionalPCIIndex) identifying the additional PCI configuration, a PCI of the non-serving cell, a SSB periodicity indication, position indications of (candidate) SSBs in a SSB burst, a transmission power indication of SSBs, etc. The configuration parameter of Cell 1 may further indicate a plurality of TCI states. Each TCI state of the plurality of TCI states may be associated with one or more TCI parameters comprising a TCI state identifier identifying the TCI state, one or more QCL information parameters comprising a SSB index identifying the SSB and a QCL type indicator indicating a QCL type of a plurality of QCL types, e.g., if the SSB is transmitted via Cell 1 (or in another serving cell). If a SSB of a TCI state is transmitted via a non-serving (neighbor) cell, the TCI state may be further associated with an additional PCI index (AdditionalPCIIndex) indicating a (non-serving or neighbor) cell configured in the SSB-MTC-AdditionalPCI IE. Similar to intra-cell multiple TRPs, the wireless device may receive downlink signals and/or transmit uplink signals based on a TCI state (activated/indicated) associated with a TRP. The difference between intra-cell multiple TRPs and inter-cell multiple TRPs is that a reference RS of a TCI state for a serving cell may come from (or be transmitted via) a (non-serving or neighbor) cell for the latter cases. A SSB may be implemented based on example embodiments described above with respect to FIG. 28, FIG. 29 and/or FIG. 30.

In the example of FIG. 31B, Cell 1 is a serving cell for a wireless device. Cell 2 is a (non-serving or neighbor) cell associated with Cell 1 for the wireless device. Cell 2 may be a serving cell for a second wireless device. Cell 1 may be a (non-serving or neighbor) cell for the second wireless device. Different wireless devices may have different serving cells and non-serving/neighbor cells.

In an example, the base station may use both TRPs for transmissions via Cell 1 to a wireless device. In an example, the base station may indicate (by DCI/MAC CE) a first TCI state associated with an SSB/CSI-RS transmitted via Cell 1 (or another serving cell) for a first transmission (via PDCCH/PDSCH/PUSCH/PUCCH/SRS resources of Cell 1) to the wireless device. In addition, the base station may indicate (by the same DCI/MAC CE or another DCI/MAC CE) a second TCI state associated with a second SSB transmitted via Cell 2 (which is the non-serving/neighbor) cell indicated by AdditionalPCIIndex in TCI configuration parameters) for a second transmission (via PDCCH/PDSCH/PUSCH/PUCCH/SRS resources of Cell 1) to the wireless device. The second SSB transmitted via Cell 2 is different from the first SSB transmitted via Cell 1. Using two TCI states from two TRPs (one is from a serving cell and another is from a non-serving/neighbor cell) may avoid executing time-consuming handover (HO) between Cell 1 to Cell 2 and improve coverage if the wireless device is moving at the edge of Cell 1 and Cell 2.

In the examples of FIG. 31A and FIG. 31B, a wireless device may be provided two TCI states, each TCI state corresponding to a TRP of multiple TRPs. A TCI state may be referred to as a channel-specific TCI state, when the TCI state is used for a specific channel (e.g., PDSCH/PDCCH/PUCCH/PUSCH), where different channels may be associated with different channel-specific TCI states. A TCI state may be referred to as a unified TCI state, when the TCI state is used for multiple channels (e.g., PDSCH/PDCCH/PUCCH/PUSCH), where different channels may be associated with the same unified TCI state. The base station may transmit RRC messages indicating whether a TCI state is a unified TCI state for the wireless device.

Based on FIG. 31A and FIG. 31B, a base station may perform data/signaling transmissions based on intra-cell multiple TRPs (e.g., which may be referred to as Intra-cell M-TRP or Intra-PCI M-TRP) for a wireless device, e.g., when the wireless device is close to the center of a cell, has more data to deliver and/or requires high reliability (e.g., for URLLC service). The base station may perform data/signaling transmissions based on inter-cell multiple TRPs (e.g., which may be referred to as Inter-cell M-TRP or Inter-PCI M-TRP) for a wireless device, e.g., when the wireless device is at the edge of a cell and is (moving or located) in the coverage of another cell (which may be or may not be a serving cell of the wireless device).

In exiting technologies, a base station may enable a power saving operation for a wireless device due to limited battery capacity of the wireless device, e.g., based on BWP management, SCell dormancy mechanism, wake-up/go-to-sleep indication, SSSG switching on an active BWP, and/or PDCCH skipping.

However, a base station, when indicating a power saving operation for a wireless device, may not be able to save energy from the viewpoint of the base station, e.g., when the base station is required to transmit some always-on downlink signals periodically (e.g., SSB, MIB, SIB1, SIB2, periodic CSI-RS, etc.) in some time period even when there is no active wireless device in transmitting to/receiving from the base station. The base station may be required to transmit some always-on downlink signals periodically (e.g., SSB, MIB, SIB1, SIB2, periodic CSI-RS, etc.) when the base station transitions a cell into a dormant state by switching an active BWP to a dormant BWP of the cell.

In an example, if a base station needs to reduce periodicity of the always-on downlink signal transmission for network energy saving, the base station may transmit a RRC message (e.g., SIB1) indicating a longer periodicity for the always-on downlink signal transmission.

In an example, a base station, before determining to power off (e.g., both RF modules and base band units (BBUs)) for network energy saving, may transmit RRC reconfiguration messages to each wireless device in a source cell to indicate a handover to a neighbor cell. A handover (HO) procedure may be implemented based on example embodiments of FIG. 32.

Figure 32:
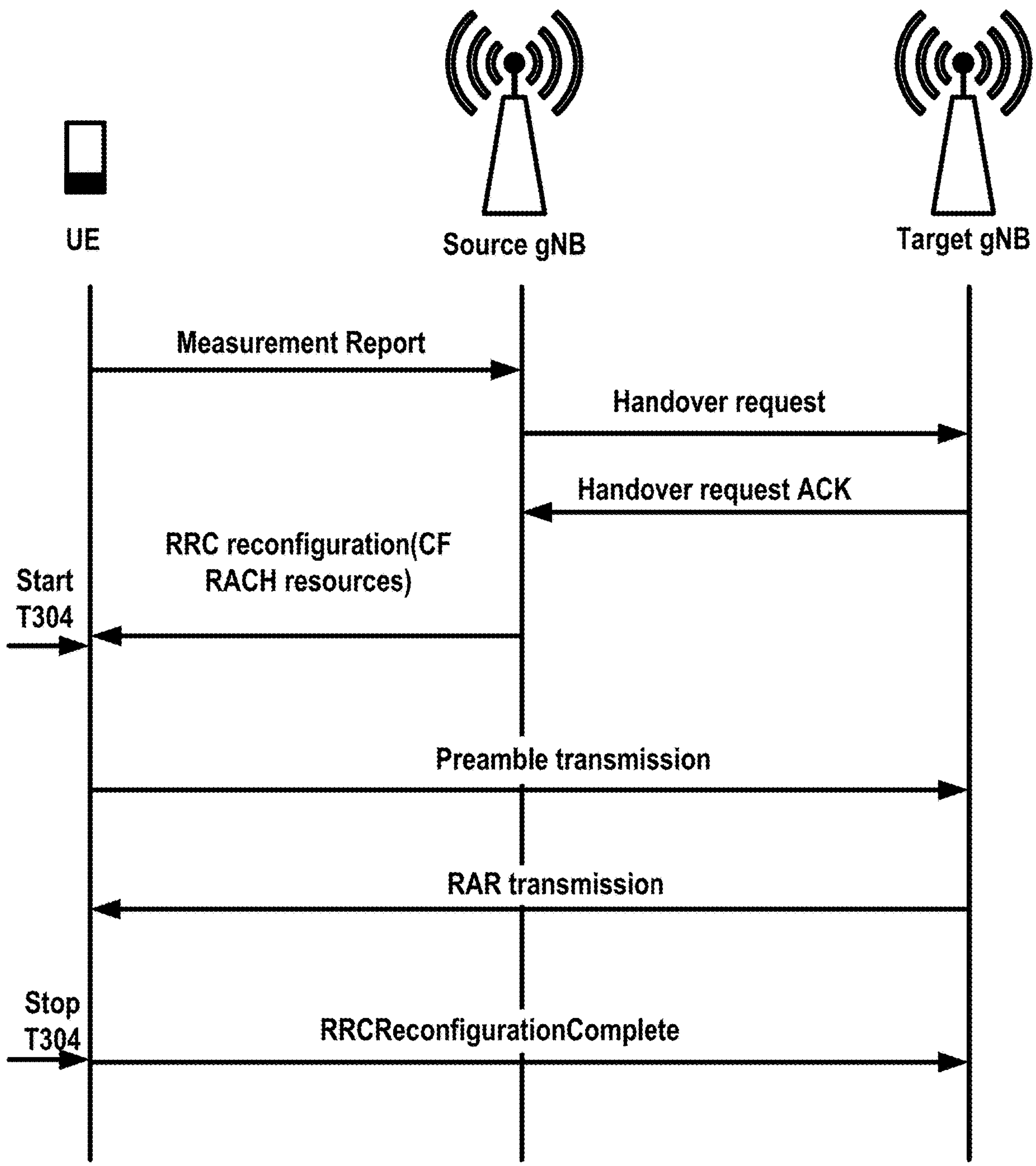
FIG. 32 shows an example embodiment of layer 3 based handover procedure.

FIG. 32 shows an example of executing HO procedure from a source gNB to a target gNB for a wireless device.

In an example, for network-controlled mobility in RRC_CONNECTED, the PCell may be changed using an RRC connection reconfiguration message (e.g., RRCReconfiguration) including reconfigurationWithSync (in NR specifications) or mobilityControlInfo in LTE specifications (handover). The SCell(s) may be changed using the RRC connection reconfiguration message either with or without the reconfigurationWithSync or mobilityControlInfo. The network may trigger the HO procedure e.g., based on radio conditions, load, QOS, UE category, and/or the like. The RRC connection reconfiguration message may be implemented based on example embodiments which will be described later in FIG. 33 and FIG. 34.

As shown in FIG. 32, the network may configure the wireless device to perform measurement reporting (possibly including the configuration of measurement gaps). The measurement reporting is a layer 3 reporting, different from layer 1 CSI reporting. The wireless device may transmit one or more measurement reports to the source gNB (or source PCell). In an example, the network may initiate HO blindly, for example without having received measurement reports from the wireless device. Before sending the HO message to the wireless device, the source gNB may prepare one or more target cells. The source gNB may select a candidate target PCell.

As shown in FIG. 32, based on the one or more measurement reports from the wireless device, the source gNB may provide the target gNB with a list of best cells on each frequency for which measurement information is available, for example, in order of decreasing RSRP values. The source gNB may also include available measurement information for the cells provided in the list. The target gNB may decide which cells are configured for use after HO, which may include cells other than the ones indicated by the source gNB. In an example, as shown in FIG. 32, the source gNB may transmit a HO request to the target gNB. The target gNB may response with a HO message. In an example, in the HO message, the target gNB may indicate access stratum configuration to be used in the target cell(s) for the wireless device.

In an example, the source gNB may transparently (for example, does not alter values/content) forward the HO message/information received from the target gNB to the wireless device. In the HO message, RACH resource configuration may be configured for the wireless device to access a cell in the target gNB. When appropriate, the source gNB may initiate data forwarding for (a subset of) the dedicated radio bearers.

As shown in FIG. 32, after receiving the HO message, the wireless device may start a HO timer (e.g., T304) with an initial timer value. The HO timer may be configured in the HO message. Based on the HO message, the wireless device may apply the RRC parameters of the target PCell and/or a cell group (MCG/SCG) associated with the target PCell of the target gNB and perform downlink synchronization to the target gNB. After or in response to performing downlink synchronization (e.g., searching a suitable/detectable SSB from candidate SSBs configured on the target gNB, based on examples of FIG. 29 and/or FIG. 30) to the target gNB, the wireless device may initiate a random access (e.g., contention-free, or contention-based, based on examples of FIG. 13A, FIG. 13B and/or FIG. 13C) procedure attempting to access the target gNB at the available RACH occasion according to a RACH resource selection, where the available RACH occasion may be configured in the RACH resource configuration (e.g., based on example embodiments of FIG. 34 which will be described later). When allocating a dedicated preamble for the random access in the target gNB, RAN may ensure the preamble is available from the first RACH occasion the wireless device may use.

In an example, the wireless device may activate the uplink BWP configured with firstActiveUplinkBWP-id and the downlink BWP configured with firstActiveDownlinkBWP-id on the target PCell upon performing HO to the target PCell.

In an example, the wireless device, after applying the RRC parameters of a target PCell and/or completing the downlink synchronization with the target PCell, may perform UL synchronization by conducting RACH procedure, e.g., based on example embodiments described above with respect to FIG. 13A, FIG. 13B and/or FIG. 13C. The performing UL synchronization may comprise transmitting a preamble via an active uplink BWP (e.g., a BWP configured as firstActiveUplinkBWP-id as shown in FIG. 33) of uplink BWPs of the target PCell, monitoring PDCCH on an active downlink BWP (e.g., a BWP configured as firstActiveDownlinkBWP-id as shown in FIG. 33) for receiving a RAR comprising a TA which is used for PUSCH/PUCCH transmission via the target PCell, receiving the RAR and/or obtaining the TA. After completing the UL synchronization, the wireless device obtains the TA to be used for PUSCH/PUCCH transmission via the target PCell. The wireless device, by using the TA to adjust uplink transmission timing, transmits PUSCH/PUCCH via the target PCell. The adjusting uplink transmission timing may comprise advancing or delay the transmissions by an amount indicated by a value of the TA, e.g., to ensure the uplink signals received at the target PCell are aligned (in time domain) with uplink signals transmitted from other wireless devices.

In an example, the wireless device may release RRC configuration parameters of the source PCell and an MCG/SCG associated with the source PCell.

In this specification, a HO triggered by receiving a RRC reconfiguration message (e.g., RRCReconfiguration) comprising the HO command/message (e.g., by including reconfigurationWithSync (in NR specifications) or mobilityControlInfo in LTE specifications (handover)) is referred to as a normal HO, an unconditional HO, which is contrast with a conditional HO (CHO) which will be described later in FIG. 35.

In an example, as shown in FIG. 32, the wireless device may transmit a preamble to the target gNB via a RACH resource. The RACH resource may be selected from a plurality of RACH resources (e.g., configured in rach-ConfigDedicated IE as shown in FIG. 33 and FIG. 34) based on SSBs/CSI-RSs measurements of the target gNB. The wireless device may select a (best) SSB/CSI-RS of the configured SSBs/CSI-RSs of the target gNB. The wireless device may select an SSB/CSI-RS, from the configured SSBs/CSI-RSs of the target gNB, with a RSRP value greater than a RSRP threshold configured for the RA procedure. The wireless device then determines a RACH occasion (e.g., time domain resources, etc.) associated with the selected SSB/CSI-RS and determines the preamble associated with the selected SSB/CSI-RS.

In an example, the target gNB may receive the preamble transmitted from the wireless device. The target gNB may transmit a random access response (RAR) to the wireless device, where the RAR comprises the preamble transmitted by the wireless device. The RAR may further comprise a TAC to be used for uplink transmission via the target PCell. In response to receiving the RAR comprising the preamble, the wireless device may complete the random access procedure. In response to completing the random access procedure, the wireless device may stop the HO timer (T304). The wireless device may transmit an RRC reconfiguration complete message to the target gNB, after completing the random access procedure, or before completing the random access procedure. The wireless device, after completing the random access procedure towards the target gNB, may apply first parts of CQI reporting configuration, SR configuration and SRS configuration that do not require the wireless device to know a system frame number (SFN) of the target gNB. The wireless device, after completing the random access procedure towards the target PCell, may apply second parts of measurement and radio resource configuration that require the wireless device to know the SFN of the target gNB (e.g., measurement gaps, periodic CQI reporting, SR configuration, SRS configuration), upon acquiring the SFN of the target gNB.

In an example, based on HO procedure (e.g., as shown in FIG. 32), for network energy saving purpose, a base station may instruct each wireless device in a source cell to perform a 4-step or 2-step RACH-based (contention free) HO to a neighbor cell. After the wireless devices complete the HO procedure to neighbor cells, the base station may turn off (RF parts and BBUs, etc.) for energy saving.

FIG. 33 shows an example embodiment of RRC message for HO. In the example of FIG. 33, a base station may transmit, and/or a wireless device may receive, a RRC reconfiguration message (e.g., RRCReconfiguration-IEs) indicating an RRC connection modification. It may convey information for measurement configuration, mobility control, radio resource configuration (including RBs, MAC main configuration and physical channel configuration) and AS security configuration. The RRC reconfiguration message may comprise a configuration of a master cell group (masterCellGroup). The master cell group may be associated with a SpCell (SpCellConfig). When the SpCellConfig comprises a reconfiguration with Sync (reconfigurationWithSync), the wireless device determines that the SpCell is a target PCell for the HO. The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. In an example, a dedicated RACH resource may comprise one or more RACH occasions, one or more SSBs, one or more CSI-RSs, one or more RA preamble indexes, etc.

FIG. 34 shows an example embodiment of RRC messages for RACH resource configuration for HO procedure based on example embodiments described above with respect to FIG. 33. As shown in FIG. 33, the reconfigurationWithSync IE comprises a dedicated RACH resource indicated by a rach-ConfigDedicated IE.

As shown in FIG. 34, a rach-ConfigDedicated IE comprises a contention free RA resource indicated by a cfra IE. The cfra IE comprises a plurality of occasions indicated by a rach-ConfigGeneric IE, a ssb-perRACH-Occasion IE, a plurality of resources associated with SSB (indicated by a ssb IE) or CSI-RS (indicated by a csirs IE). The ssb-perRACH-Occasion IE indicates a number of SSBs per RACH occasion. The rach-ConfigGeneric IE indicates configuration of CFRA occasions. The wireless device ignores preambleReceivedTargetPower, preambleTransMax, powerRampingStep, ra-ResponseWindow signaled within this field and use the corresponding values provided in RACH-ConfigCommon.

As shown in FIG. 34, when the plurality of resources for the CFRA configured in the reconfigurationWithSync IE are associated with SSBs, the resources (resources IE) comprise the ssb IE. The ssb IE comprises a list of CFRA SSB resources (ssb-ResourceList) and an indication of PRACH occasion mask index (ra-ssb-OccasionMaskIndex). Each of the list of CFRA SSB resources comprises a SSB index, a RA preamble index and etc. The ra-ssb-OccasionMaskIndex indicates a PRACH mask index for RA resource selection. The mask is valid for all SSB resources signaled in ssb-ResourceList.

A shown in FIG. 34, when the plurality of resources for the CFRA configured in the reconfigurationWithSync IE are associated with CSI-RSs, the resources (resources IE) comprise the csirs IE. The csirs IE comprises a list of CFRA CSI-RS resources (csirs-ResourceList) and a RSRP threshold (rsrp-ThresholdCSI-RS). Each of the list of CFRA CSI-RS resources comprises a CSI-RS index, a list of RA occasions (ra-OccasionList), a RA preamble index and etc.

In an example, executing the HO triggered by receiving a RRC reconfiguration message comprising a reconfigurationWithSync IE may introduce HO latency (e.g., too-late HO), e.g., when a wireless device is moving in a network deployed with multiple small cells (e.g., with hundreds of meters of cell coverage of a cell). An improved HO mechanism, based on measurement event triggering, is proposed to reduce the HO latency as shown in FIG. 35.

Figure 35:
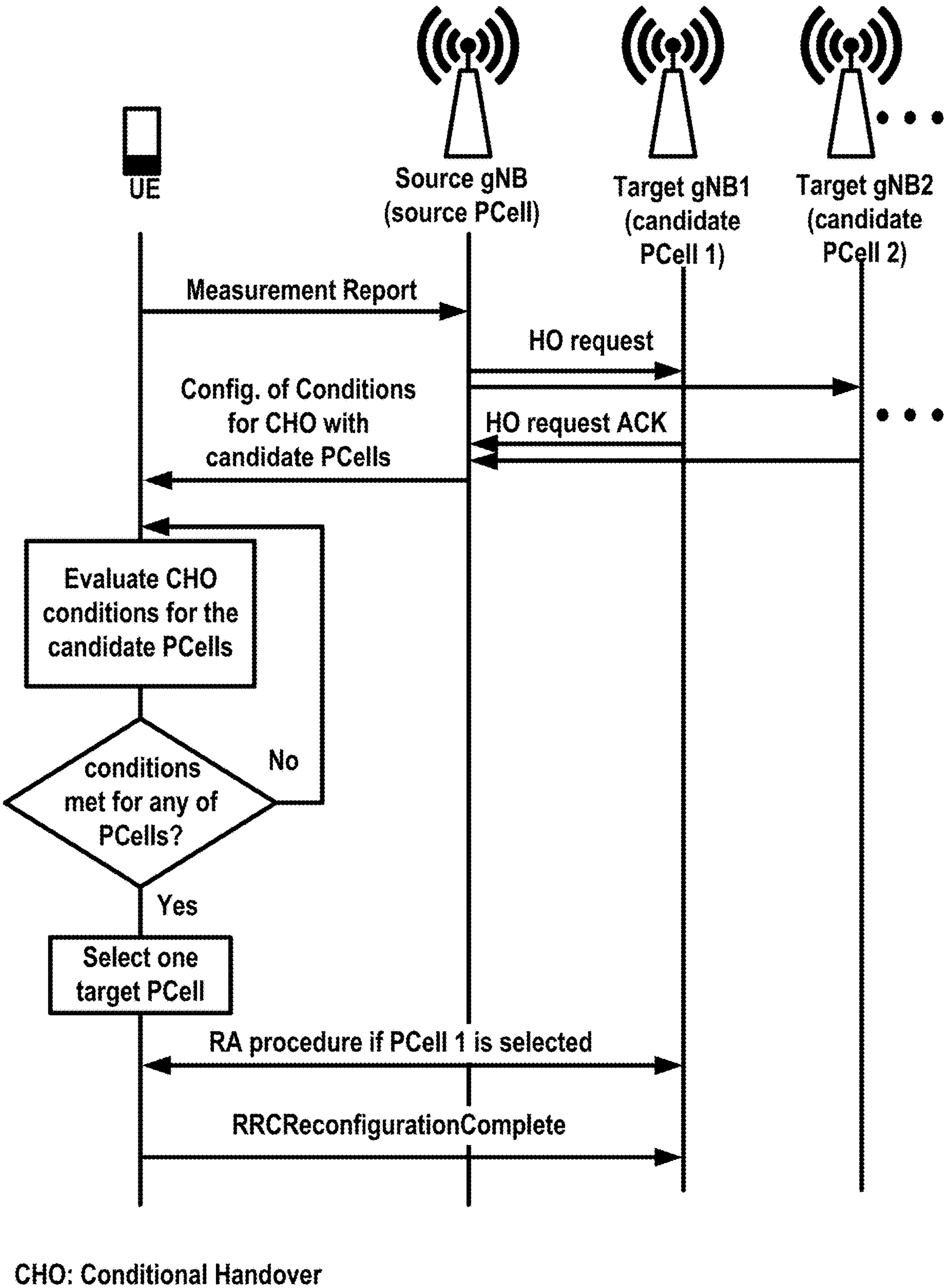
FIG. 35 shows an example embodiment of layer 3 based conditional handover procedure.

FIG. 35 shows an example embodiment of conditional handover (CHO) procedure. In an example, as shown in FIG. 35, the network (e.g., a base station, a source gNB) may configure the wireless device to perform measurement reporting (possibly including the configuration of measurement gaps) for a plurality of neighbor cells (e.g., cells from a candidate target gNB 1, a candidate target gNB 2, etc.). The measurement reporting is a layer 3 reporting, different from layer 1 CSI reporting. The wireless device may transmit one or more measurement reports to the source gNB (or source PCell).

As shown in FIG. 35, based on the one or more measurement reports from the wireless device, the source gNB may provide the target gNB with a list of best cells on each frequency for which measurement information is available, for example, in order of decreasing RSRP. The source gNB may also include available measurement information for the cells provided in the list. The target gNB may decide which cells are configured for use after the CHO, which may include cells other than the ones indicated by the source gNB. In an example, as shown in FIG. 35, the source gNB may transmit a HO request to the target gNB. The target gNB may response with a HO message. In an example, in the HO message, the target gNB may indicate access stratum configuration (e.g., RRC configurations of the target cells) to be used in the target cell(s) for the wireless device.

In an example, the source gNB may transparently (for example, does not alter values/content) forward the handover (e.g., contained in RRC reconfiguration messages of the target gNB) message/information received from the target gNB to the wireless device.

In an example, the source gNB may configure a CHO procedure different from a normal HO procedure (e.g., as shown in FIG. 32, FIG. 33 and/or FIG. 34), by comprising a conditional reconfiguration message (e.g., conditionalReconfiguration IE in RRC reconfiguration message, which will be described later in FIG. 36). The conditional reconfiguration message may comprise a list of candidate target PCells, each candidate target PCell being associated with dedicated RACH resources for the RA procedure in case a CHO is executed to the candidate target PCell. A CHO execution condition (or RRC reconfiguration condition) is also configured for each of the candidate target PCells, etc. In an example, a CHO execution condition may comprise a measurement event A3 where a candidate target PCell becomes amount of offset better than the current PCell (e.g., the PCell of the source gNB), a measurement event A4 where a candidate target PCell becomes better than absolute threshold configured in the RRC reconfiguration message, a measurement event A5 where the current PCell becomes worse than a first absolute threshold and a candidate target PCell becomes better than a second absolute threshold, etc.

In the example of FIG. 35, the wireless device, according to the received RRC reconfiguration messages comprising parameters of a CHO procedure, may evaluate the (RRC) reconfiguration conditions for the list of candidate target PCells and/or the current/source PCell. The wireless device may measure RSRP/RSRQ of SSBs/CSI-RSs of each candidate target PCell of the list of candidate target PCells. Different from the normal HO procedure described in FIG. 32, the wireless device does not execute the HO to the target PCell in response to receiving the RRC reconfiguration messages comprising the parameters of the CHO procedure. The wireless device may execute the HO to a target PCell for the CHO only when the (RRC) reconfiguration condition(s) of the target PCell are met (or satisfied). Otherwise, the wireless device may keep evaluating the reconfiguration conditions for the list of the candidate target PCells, e.g., until an expiry of a HO timer, or receiving a RRC reconfiguration indicating an abort of the CHO procedure.

In the example of FIG. 35, in response to a reconfiguration condition of a first candidate target PCell (e.g., PCell 1) being met or satisfied, the wireless device may execute the CHO procedure towards the first candidate target PCell. The wireless device may select on of multiple candidate target PCells by its implementation when the multiple candidate target PCells have reconfiguration conditions satisfied or met.

In an example, executing the CHO procedure towards the first candidate target PCell is same as or similar to executing the HO procedure as shown in FIG. 32. By executing the CHO procedure, the wireless device may release RRC configuration parameters of the source PCell and the MCG associated with the source PCell, apply the RRC configuration parameters of the PCell 1, reset MAC, perform cell group configuration for the received MCG comprised in the RRC reconfiguration message of the PCell 1, and/or perform RA procedure to the PCell 1, etc.

In an example, the MCG of the RRC reconfiguration message of the PCell 1 may be associated with a SpCell (SpCellConfig) on the target gNB 1. When the sPCellConfig comprises a reconfiguration with Sync (reconfigurationWithSync), the wireless device determines that the SpCell is a target PCell (PCell 1) for the HO. The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. In an example, a dedicated RACH resource may comprise one or more RACH occasions, one or more SSBs, one or more CSI-RSs, one or more RA preamble indexes, etc. In an example, the wireless device may perform cell group configuration for the received master cell group comprised in the RRC reconfiguration message of the PCell 1 on the target gNB 1 according to the example embodiments described above with respect to FIG. 32.

FIG. 36 shows an example of RRC message for CHO. In the example of FIG. 36, a base station may transmit, and/or a wireless device may receive, a RRC reconfiguration message (e.g., RRCReconfiguration-V1610-IEs) indicating an RRC connection modification. The RRC reconfiguration message may be comprised in a (parent) RRC reconfiguration message (e.g., RRCReconfiguration-IEs) as shown in FIG. 33, where the (parent) RRC reconfiguration message may comprise (L3 beam/cell) measurement configuration (e.g., measConfig IE).

In the example of FIG. 36, the RRC reconfiguration message (e.g., RRCReconfiguration-V1610-IEs) may comprise a conditional reconfiguration IE (conditionalReconfiguration IE). The conditional reconfiguration IE may comprise a list of conditional reconfigurations (condReconfigToAddModList). Each conditional reconfiguration corresponds to a respective candidate target cell (PCell) of a list of candidate target cells. For each conditional reconfiguration of the list of conditional reconfigurations, the base station may indicate one or more measurement events (condExecutionCond) for triggering the CHO on the candidate target PCell, a RRC reconfiguration message (condRRCReconfig) of a candidate target cell (PCell) which is received by the source gNB from the target gNB via X2/Xn interface. The RRC reconfiguration message of the candidate target cell may be implemented based on example embodiments described above with respect to FIG. 33 and/or FIG. 34. In an example, the RRC reconfiguration message may comprise a configuration of a master cell group (masterCellGroup) for the target gNB. The master cell group may be associated with a SpCell (SpCellConfig). When the sPCellConfig comprises a reconfiguration with Sync (reconfigurationWithSync), the SpCell is a target PCell for executing the CHO. The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. In an example, a dedicated RACH resource may comprise one or more RACH occasions, one or more SSBs, one or more CSI-RSs, one or more RA preamble indexes, etc.

In the example of FIG. 36, a measurement event (condExecutionCond) for triggering the CHO on the candidate target PCell is an execution condition that needs to be fulfilled (at the wireless device) in order to trigger the execution of a conditional reconfiguration for CHO. The indication of the measurement event may point to a measurement ID (Meas/d) which identifies a measurement configuration of a plurality of measurement configurations (e.g., comprised in measConfig IE) configured by the source gNB.

The measurement configuration may be associated with a measurement event (or a conditional event) of a plurality of measurements. A conditional event may comprise a conditional event A3, conditional event A4, and/or conditional event A5, etc. A conditional event A3 is that a candidate target PCell becomes amount of offset better than the current PCell (e.g., the PCell of the source gNB). A conditional event A4 is that a candidate target PCell becomes better than an absolute threshold configured in the RRC reconfiguration message. A conditional event A5 is that the current PCell becomes worse than a first absolute threshold and a candidate target PCell becomes better than a second absolute threshold, etc.

In an example, executing CHO by the wireless device's decision based on evaluating reconfiguration conditions (long-term and/or layer 3 beam/cell measurements against one or more configured thresholds) on a plurality of candidate target cells may cause load unbalanced on cells, and/or lead to CHO failure in case that the target cell changes its configuration (e.g., for network energy saving) during the CHO condition evaluation, etc. An improved handover based on layer 1/2 signaling triggering is proposed in FIG. 37. In an example, a layer 1 signaling may comprise a DCI transmitted via a PDCCH. A layer 2 signaling may comprise a MAC CE scheduled by a DCI. Layer 1/2 signaling is different from Layer 3 signaling, for HO/CHO, which comprises RRC reconfiguration message.

Figure 37:
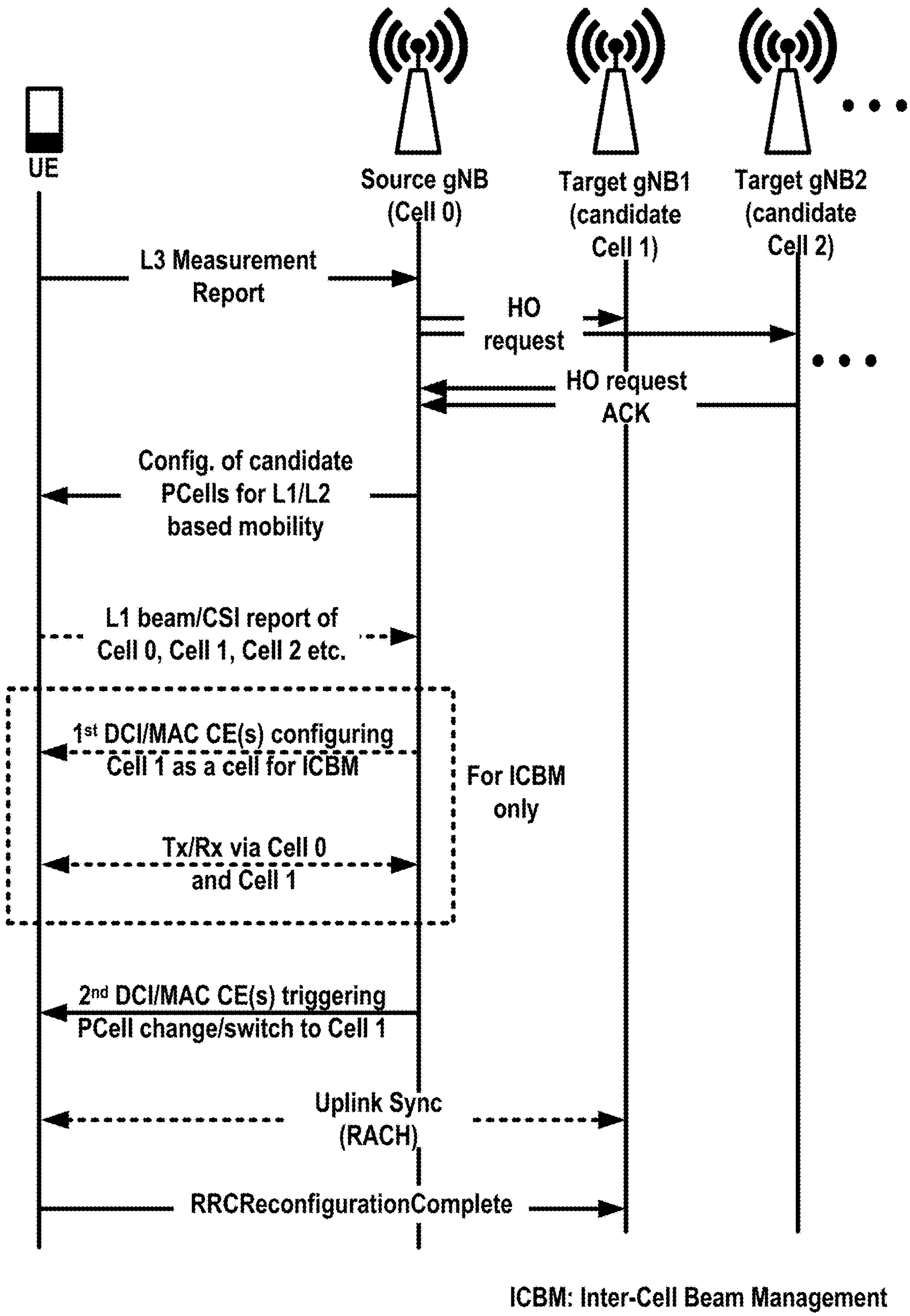
FIG. 37 shows an example embodiment of layer 1/2 triggered mobility.

FIG. 37 shows an example embodiment of layer 1/2 triggered HO procedure. In an example, as shown in FIG. 37, the network (e.g., a base station, a source gNB) may configure the wireless device to perform measurement reporting (possibly including the configuration of measurement gaps) for a plurality of neighbor cells (e.g., cells from a candidate target gNB 1, a candidate target gNB 2, etc.). The measurement reporting is a layer 3 reporting, different from layer 1 CSI reporting. The wireless device may transmit one or more measurement reports to the source gNB (or source PCell, cell 0 in FIG. 37).

As shown in FIG. 37, based on the one or more measurement reports from the wireless device, the source gNB may provide the target gNB with a list of best cells on each frequency for which measurement information is available, for example, in order of decreasing RSRP. The source gNB may also include available measurement information for the cells provided in the list. The target gNB may decide which cells are configured for use (as a target PCell, and/or one or more SCells) after HO, which may include cells other than the ones indicated by the source gNB. In an example, as shown in FIG. 37, the source gNB may transmit a HO request to the target gNB. The target gNB may response with a HO message. In an example, in the HO message, the target gNB may indicate access stratum configuration (e.g., RRC configurations of the target cells) to be used in the target cell(s) for the wireless device.

In an example, the source gNB may transparently (for example, does not alter values/content) forward the HO (e.g., contained in RRC reconfiguration messages of the target gNB, cell group configuration IE of the target gNB, and/or SpCell configuration IE of a target PCell/SCells of the target gNB) message/information received from the target gNB to the wireless device.

In an example, the source gNB may configure a Layer 1/2 signaling based HO (PCell switching/changing, mobility, etc.) procedure different from a normal HO procedure (e.g., as shown in FIG. 32, FIG. 33 and/or FIG. 34) and/or a CHO procedure (e.g., as shown in FIG. 35 and/or FIG. 36), by comprising a Layer 1/2 candidate PCell configuration message (e.g., a newly defined candidates-L1L2-Config IE) in RRC reconfiguration message of the source gNB. The Layer 1/2 candidate PCell configuration message may comprise a list of candidate target PCells, each candidate target PCell being associated with dedicated RACH resources for the RA procedure in case a Layer 1/2 signaling based HO is trigged by a Layer 1/2 signaling and executed to the candidate target PCell, etc. There may be multiple options for parameter configurations of a candidate target PCell.

In an example, as a first option for the parameter configuration, for each candidate target PCell, the RRC reconfiguration message of the source gNB may comprise a (capsuled) RRC reconfiguration message (e.g., RRCReconfiguration), of a candidate target gNB, received by the source gNB from a candidate target gNB via X2/Xn interface. The (capsuled) RRC reconfiguration message, of the candidate target gNB, may reuse the same signaling structure of the RRC reconfiguration message of the source gNB, as shown in FIG. 33 and/or FIG. 34.

In an example, as a second option for the parameter configuration, for each candidate target PCell, the RRC reconfiguration message of the source gNB may comprise a (capsuled) cell group configuration message (e.g., CellGroupConfig), of a candidate target gNB, received by the source gNB from a candidate target gNB via X2/Xn interface. The (capsuled) cell group configuration message, of the candidate target gNB, may reuse the same signaling structure of the cell group configuration message of the source gNB, as shown in FIG. 33 and/or FIG. 34. The second option may reduce signaling overhead of the parameter configuration of a candidate target PCell compared with the first option.

In an example, as a third option for the parameter configuration, for each candidate target PCell, the RRC reconfiguration message of the source gNB may comprise a (capsuled) SpCell configuration message (e.g., SpCellConfig), of a candidate target gNB, received by the source gNB from a candidate target gNB via X2/Xn interface. The (capsuled) SpCell configuration message, of the candidate target gNB, may reuse the same signaling structure of the SpCell configuration message of the source gNB, as shown in FIG. 33 and/or FIG. 34. The third option may reduce signaling overhead of the parameter configuration of a candidate target PCell compared with the second option.

In an example, for each candidate target PCell, the source gNB may indicate cell common and/or UE specific parameters (e.g., SSBs/CSI-RSs, BWPs, RACH resources, PDCCH/PDSCH/PUCCH/PUSCH resources etc.).

In the example of FIG. 37, the wireless device, according to the received RRC reconfiguration messages comprising parameters of a Layer 1/2 signaling based HO procedure, may perform Layer 1/2 measurement report (CSI/beam) for the list of candidate target PCells and/or the current PCell. The layer 1/2 measurement report may comprise layer 1 RSRP, layer 1 RSRQ, PMI, RI, layer 1 SINR, CQI, etc.

In an example, the layer 1/2 measurement report may be transmitted with a periodicity configured by the source gNB.

In an example, the layer 1/2 measurement report may be triggered when the measurement of the CSI/beam of a candidate target PCell is greater than a threshold, or (amount of offset) greater than the current PCell, etc.

In the example of FIG. 37, the base station may perform an inter-cell beam management (ICBM) procedure before transmitting a Layer 1/2 signaling triggering the HO procedure comprising switching PCell from the source gNB to a target gNB. The ICBM procedure may allow the base station and the wireless device to use resources (time/frequency/ spatial) of the target gNB (or a PCell/SCell of the target gNB) without executing HO procedure to the target gNB, therefore reducing frequently executing the HO procedure. The ICBM procedure may allow the base station and the wireless device to synchronize time/frequency/beam to a target PCell of the target gNB before executing the HO, which may reduce HO latency. The ICBM may be implemented based on example embodiments of FIG. 38 which will be described later.

In the example of FIG. 37, in response to the ICBM procedure being configured, the source gNB may transmit to the wireless device a first DCI/MAC CE configuring/indicating a first candidate target cell (e.g., Cell 1) of the candidate target cells (PCells/SCells) as a neighbor or non-serving cell, in addition to the current PCell (e.g., Cell 0), for the wireless device. The base station may select the first candidate target cell from the candidate target cells, based on layer 1/2 measurement report from the wireless device.

In an example, the first DCI/MAC CE (e.g., activating TCI states) may indicate that a reference RS (e.g., SSB/CSI-RS) associated with a first TCI state is from the first candidate target cell (Cell 1)(e.g., by associating the reference RS with an additional PCI, of Cell1, different from a PCI of the Cell 0), in addition to a reference RS associated with a second TCI state being from the current PCell (Cell 0). Association between a reference signal and a TCI state may be implemented based on example embodiments described above with respect to FIG. 31B. Activating, by a DCI/MAC CE, a TCI state with a RS of a neighbor (non-serving) cell as a reference RS, may allow the base station to use a beam of the neighbor cell to transmit downlink signals/channels or to receive uplink signals/channels, and/or use a beam of the current cell for the transmissions/receptions, without performing HO to the neighbor cell for the transmissions/receptions.

In the example of FIG. 37, the wireless device, in response to receiving the first DCI/MAC CE, may apply the first TCI state and the second TCI state for downlink reception and/or uplink transmission.

In an example, applying the first TCI state and the second TCI state for downlink reception may comprise: receiving (from Cell 1) PDCCH/PDSCH/CSI-RS with a reception beam/filter same as that for receiving the reference signal, transmitted from Cell 1, according to (or associated with) the first TCI state, and receiving (from cell 0) PDCCH/PDSCH/CSI-RS with a reception beam/filter same as that for receiving the reference signal, transmitted from Cell 0, according to (or associated with) the second TCI state.

In an example, applying the first TCI state and the second TCI state for uplink transmission may comprise: transmitting (via Cell 1) PUCCH/PUSCH/SRS with a transmission beam/filter same as that for receiving the reference signal, transmitted from Cell 1, according to (or associated with) the first TCI state, and transmitting (via cell 0) PUCCH/PUSCH/SRS with a transmission beam/filter same as that for receiving the reference signal, transmitted from Cell 0, according to (or associated with) the second TCI state.

In the example of FIG. 37, the base station may skip performing the ICBM procedure before transmitting the Layer 1/2 signaling triggering the HO procedure. The base station may skip performing the ICBM procedure, e.g., when beamforming is not used in the target PCell, or if there is no good SSB(s) from the target PCell, or if there are no available radio resources from the target PCell to accommodate the wireless device, or when the wireless device does not support ICBM and/or when the base station does not support ICBM.

In the example of FIG. 37, the source base station may determine to handover the wireless device from the source gNB (Cell 0) to the target gNB (Cell 1). The source base station may determine the handover based on a load/traffic condition, a CSI/beam report of the target gNB, a location/trajectory of the wireless device, a network energy saving strategy (e.g., the source base station determines to turn of the Cell 0 and/or one or more SCells for power saving), etc.

In the example of FIG. 37, the source base station may transmit a second DCI/MAC CE indicating a PCell changing from the current PCell (Cell 0) to a new cell (e.g., Cell 1).

In an example, the new cell may be one of the neighbor (non-serving) cells used in the ICBM procedure (e.g., indicated by the first DCI/MAC CE). The new cell may be cell 1 in the example of FIG. 37. When the ICBM procedure is supported and/or configured, the wireless device, before executing HO procedure indicated by the source base station, has already synchronized with the target gNB regarding which beam should be used for transmission/reception via the target gNB, which is different from layer 3 signaling based (C)HO (as shown in FIG. 32 and/or FIG. 35) where the wireless device needs to synchronize to the target gNB upon executing the HO/CHO and then obtains an indication of a new beam to be used for the target gNB.

In an example, the new cell may be one of a plurality of neighbor (non-serving) cells comprised in L1 beam/CSI report, e.g., with the best measurement report, with the distance closest to the wireless device, etc., when the ICBM procedure is not configured/supported/indicated/activated for the new cell.

In the example of FIG. 37, in response to receiving the second DCI/MAC CE, the wireless device may change the PCell from cell 0 to cell 1. The wireless device may apply the (stored/received) RRC parameters (comprised in RRCReconfiguration, CellGroupConfig, and/or SpCellConfig IE) of the target PCell (cell 1) as the current PCell.

In an example, when the ICBM is configured/supported/indicated/activated before receiving the $2^{nd}$ DCI/MAC CE, the wireless device may skip downlink (time/frequency/beam) synchronization (e.g., monitoring MIB/SSB/SIBs and/or selecting a SSB as a reference for downlink reception and/or uplink transmission) in case the wireless device has already synchronized with the target PCell based on the ICBM procedure.

In an example, the wireless device may skip performing RA procedure towards the target PCell before transmitting to and/or receiving from the target PCell, e.g., when the target PCell is close to the source PCell, or the uplink TA is same or similar for the source PCell and the target PCell, or the dedicated RACH resource is not configured in the RRC reconfiguration message of the target PCell.

In an example, the wireless device may perform downlink synchronization (SSB/PBCH/SIBs monitoring) and/or uplink synchronization (RA procedure) for the layer 1/2 signaling based HO (e.g., when ICBM is not configured/indicated/supported/activated) as it does for layer 3 signaling based HO/CHO based on example embodiments described above with respect to FIG. 32, FIG. 33, FIG. 34, FIG. 35 and/or FIG. 36.

Figure 38:
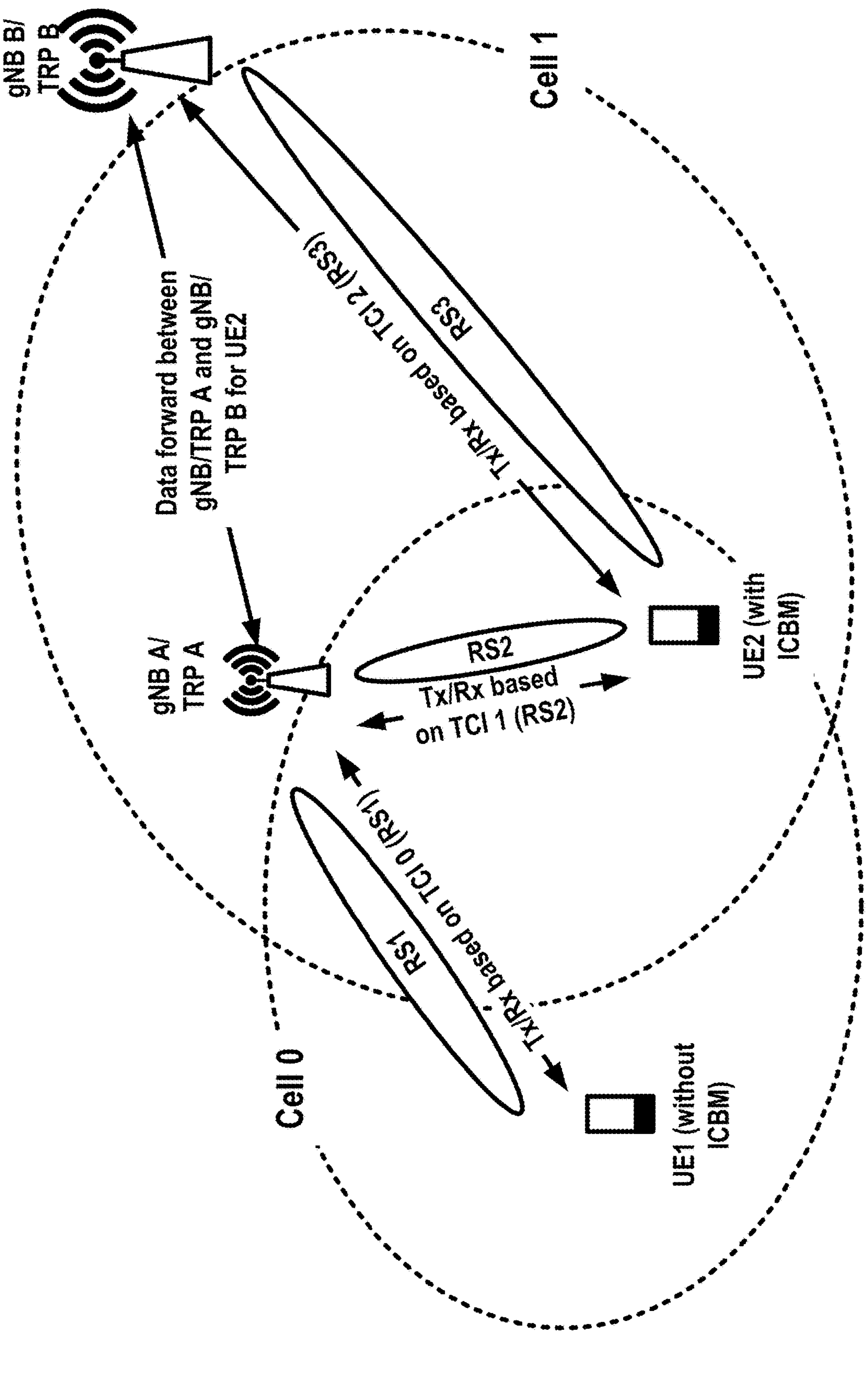
FIG. 38 shows an example embodiment of inter-cell beam management.

FIG. 38 shows an example embodiment of an ICBM procedure. In the example of FIG. 38, a first wireless device (UE1) may be in the coverage of Cell 0 deployed under a first node (e.g., gNB A or TRP A). UE1 is not in the coverage of Cell 1 deployed under a second node (e.g., gNB B or TRP B). Cell 0 and Cell 1 have different PCIs. UE1 may use the RSs (e.g., RS1) transmitted from Cell 0 as a reference RS for a TCI state (which is used for beam/spatial domain filter determination for downlink reception and/or uplink transmission (Tx/Rx based TCI state 0 associated with RS1)). UE1 does not use RSs (e.g., RS2 and/or RS3) transmitted from Cell 1 as the reference RS for the TCI state. UE1 configured with a TCI state, associated with a RS of a serving cell with a first PCI and not associated with a RS of another cell with a second PCI different from the first PCI, may be referred to as a wireless device without (configured/activated) ICBM in this specification.

In the example of FIG. 38, a second wireless device (UE2) may be in the coverage of Cell 0 deployed under a first node (e.g., gNB A or TRP A). UE2 is also in the coverage of Cell 1 deployed under a second node (e.g., gNB B or TRP B). Cell 0 and Cell 1 have different PCIs. UE2 may use the RSS (e.g., RS2) transmitted from Cell 0 as a reference RS for a first TCI state (which is used for beam/spatial domain filter determination for downlink reception and/or uplink transmission via Cell 0 (Tx/Rx based TCI state 1 associated with RS2). UE2 also uses RSs (e.g., RS3) transmitted from Cell 1 as the reference RS for a second TCI state (which is used for beam/spatial domain filter determination for downlink reception and/or uplink transmission via Cell 1 (Tx/Rx based TCI state 2 associated with RS3). UE2 configured with a first TCI state, associated with a RS of a serving cell with a first PCI and configured with a second TCI state associated with a RS of another cell with a second PCI different from the first PCI, may be referred to as a wireless device with (configured/activated) ICBM in this specification.

In an example, when gNB B or TRP B receives uplink signals/channels with the second TCI state, it may forward the uplink signals/channels to gNB A or TRPA for processing.

In an example, gNB A or TRP A may forward downlink signals/channels to gNB B or TRP B to transmit with the second TCI state to the wireless device.

In the ICBM procedure of FIG. 38, Cell 1 with the second PCI different from the first PCI of Cell 0 may be considered/configured as a part (e.g., a second TRP with a second PCI different from a first PCI of a first TRP) of cell 0 for UE2, e.g., based on example embodiments described above with respect to FIG. 31B. Cell 0 and Cell 1 may belong to a same DU (or gNB-DU) when Cell 1 is configured as the part of Cell 0. A gNB-DU may be implemented based on example embodiments described above with respect to FIG. 1A and/or FIG. 1B. The PDCCH/PDSCH/PUCCH/PUSCH resources are shared between Cell 1 and Cell 0 in a way that is transparent to UE2. However, SSBs/CSI-RSs of Cell 0 does not share the same resources with SSBs/CSI-RSs of Cell 1. SSBs/CSI-RSs of Cell 0 may have configuration parameters (e.g., number of beams, periodicity, transmission power, etc.) different than configuration parameters of SSBs/CSI-RSs of Cell 1.

In an example, Cell 1 with the second PCI different from the first PCI of Cell 0 may be considered/configured as a separate cell different from cell 0 for UE2, e.g., when Cell 1 is configured as a candidate target cell based on example embodiments described above with respect to FIG. 33 and/or FIG. 36. Cell 0 and Cell 1 may belong to different DUs (or gNB-DUs) associated with a same CU (or gNB-CU) or different CUs when Cell 1 is configured as a sperate cell from Cell 0. A gNB-DU and/or a gNB-CU may be implemented based on example embodiments described above with respect to FIG. 1A and/or FIG. 1B. Cell resources (SSB/CSI-RS/PDCCH/PDSCH/PUCCH/PUSCH) are not shared between Cell 1 and Cell 0. Cell 1 has configuration parameters, of the cell resources, different from (or independent of) configuration parameters of the cell resources of Cell 0.

In existing technologies, a base station configures, for a wireless device, RRC configuration parameters (SSBs, RACH resources, MAC parameters, PHY cell common and/or UE-specific parameters, as shown in FIG. 33, FIG. 34 and/or FIG. 36) of a target PCell for performing (C)HO to the target PCell from a source PCell. When performing the (C)HO to the target PCell, the wireless device applies the received/stored RRC configuration parameters. The wireless device starts to perform downlink synchronization towards the target PCell (e.g., time/frequency alignment by monitoring the SSBs configured on the target PCell, e.g., according to 3GPP TS 38.213 Section 4-Synchronization procedures). After the downlink synchronization is complete, the wireless device starts to perform uplink synchronization, e.g., by initiating a (CF) RA procedure based on the RACH resources configured on the target PCell. The wireless device receives a time alignment (TA) command in a RAR corresponding to a preamble transmitted by the wireless device.

In existing technologies, for transmitting a preamble for the CFRA procedure, when multiple beams are used for SSB transmissions (e.g., based on example embodiments described above with respect to FIG. 29 and/or FIG. 30) by the base station, the wireless device may select, based on a RSRP value of a first SSB being greater than a RSRP threshold, the first SSB from a plurality of candidate SSBs configured in the RACH resources (e.g., based on example embodiments described above with respect to FIG. 34) on the target PCell. The wireless device determines the preamble with a preamble index associated with the selected first SSB according to RACH resource configuration parameters. After selecting the first SSB, the wireless device determines a next available PRACH occasion from PRACH occasions corresponding to the selected first SSB permitted by the restrictions given by the ra-ssb-OccasionMaskIndex configured in the rach-ConfigDedicated IE as shown in FIG. 34. The wireless device transmits the preamble via the determined PRACH occasion to the target PCell. The wireless device monitors a PDCCH of the target PCell for receiving a RAR corresponding to the preamble. The wireless device receives the RAR comprising the preamble index and/or a TA command. The wireless device completes the CFRA procedure. The CFRA procedure may be implemented based on example embodiments described above with respect to FIG. 13B. After completing the CFRA procedure, the wireless device may receive, from the target PCell, a beam indication (or a TCI state indication) used for PDCCH/PDSCH/CSI-RS reception and/or PUCCH/PUSCH/SRS transmission for the target PCell. The wireless device may apply the beam (or the TCI state) for PDCCH/PDSCH/CSI-RS reception and/or PUCCH/PUSCH/SRS transmission for the target PCell.

In existing technologies, the wireless device, after receiving a HO command (e.g., RRC reconfiguration with a ReconfigurationWithSync IE), performs downlink synchronization and uplink synchronization, beam alignment/management via a target PCell. Performing downlink synchronization, uplink synchronization and/or beam alignment may be time consuming.

To reduce HO latency, especially the latency introduced for uplink synchronization, an early TA acquisition scheme is proposed.

Figure 39:
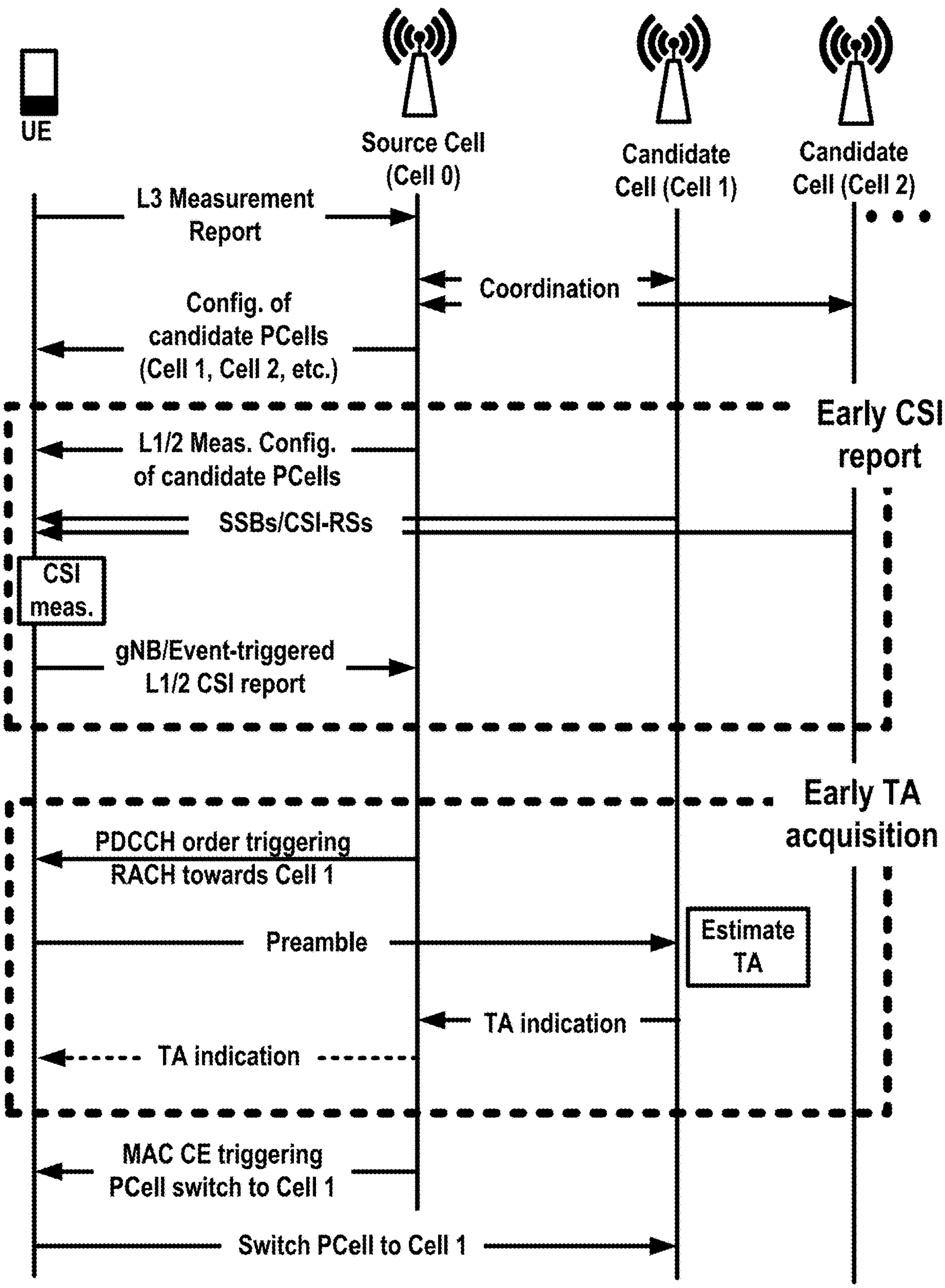
FIG. 39 shows an example embodiment of a layer 1/2 triggered mobility with early CSI report.

FIG. 39 shows an example of early TA acquisition (or ETA)-based HO procedure.

In an example, as shown in FIG. 39, the network (e.g., a base station, a source gNB) may configure the wireless device to perform (layer 3) measurement reporting (possibly including the configuration of measurement gaps) for a plurality of neighbor cells (e.g., Cell 1 from a candidate target gNB 1, Cell 2 from a candidate target gNB 2, etc.). The measurement reporting is a layer 3 reporting, different from layer 1 CSI reporting. The wireless device may transmit one or more layer 3 measurement reports (in RRC message) to the source gNB (or source PCell, cell 0 in FIG. 39).

As shown in FIG. 39, based on the one or more measurement reports from the wireless device, the source gNB may provide the target gNB with a list of best cells on each frequency for which measurement information is available, for example, in order of decreasing RSRP. The source gNB may also include available measurement information for the cells provided in the list. The target gNB may decide which cells are configured for use (as a target PCell, and/or one or more SCells) after HO, which may include cells other than the ones indicated by the source gNB.

In an example, the source gNB may transmit a HO request to the target gNB (not shown in FIG. 39). The target gNB may response with a HO message. In an example, in the HO message, the target gNB may indicate access stratum configuration (e.g., RRC configurations of the target cells) to be used in the target cell(s) for the wireless device.

In an example, the source gNB may configure a Layer 1/2 signaling based HO (PCell switching/changing, mobility, layer 1/2 triggered mobility, LTM, etc.) procedure different from a normal layer 3 based HO procedure (e.g., as shown in FIG. 32, FIG. 33 and/or FIG. 34) and/or a CHO procedure (e.g., as shown in FIG. 35 and/or FIG. 36), by comprising a Layer 1/2 candidate PCell configuration message (e.g., a newly defined candidates-L1L2-Config IE) in RRC reconfiguration message (e.g., Config. of candidate PCells (Cell 1, Cell 2, etc.) as shown in FIG. 39) of the source gNB. The Layer 1/2 candidate PCell configuration message may comprise a list of candidate target PCells, each candidate target PCell being associated with dedicated RACH resources for the RA procedure in case a Layer 1/2 signaling based HO is trigged by a Layer 1/2 signaling and executed to the candidate target PCell, etc. There may be multiple options for parameter configurations of a candidate target PCell.

In an example, as a first option for the parameter configuration, for each candidate target PCell, the RRC reconfiguration message transmitted from the source gNB may comprise a (capsuled) RRC reconfiguration message (e.g., RRCReconfiguration), of a candidate target gNB, received by the source gNB from a candidate target gNB via X2/Xn interface. The (capsuled) RRC reconfiguration message, of the candidate target gNB, may reuse the same signaling structure of the RRC reconfiguration message of the source gNB, as shown in FIG. 33 and/or FIG. 34.

In an example, as a second option for the parameter configuration, for each candidate target PCell, the RRC reconfiguration message transmitted from the source gNB may comprise a (capsuled) cell group configuration message (e.g., CellGroupConfig), of a candidate target gNB, received by the source gNB from a candidate target gNB via X2/Xn interface. The (capsuled) cell group configuration message, of the candidate target gNB, may reuse the same signaling structure of the cell group configuration message of the source gNB, as shown in FIG. 33 and/or FIG. 34. The second option may reduce signaling overhead of the parameter configuration of a candidate target PCell compared with the first option.

In an example, as a third option for the parameter configuration, for each candidate target PCell, the RRC reconfiguration message transmitted from the source gNB may comprise a (capsuled) SpCell configuration message (e.g., SpCellConfig), of a candidate target gNB, received by the source gNB from a candidate target gNB via X2/Xn interface. The (capsuled) SpCell configuration message, of the candidate target gNB, may reuse the same signaling structure of the SpCell configuration message of the source gNB, as shown in FIG. 33 and/or FIG. 34. The third option may reduce signaling overhead of the parameter configuration of a candidate target PCell compared with the second option.

In an example, for each candidate target PCell, the source gNB may indicate, in the RRC reconfiguration message, cell common and/or UE specific parameters (e.g., SSBs/CSI-RSs, BWPs, RACH resources, PDCCH/PDSCH/PUCCH/PUSCH resources etc.).

In an example, Cell 0, Cell 1 and/or Cell 2 may belong to a same gNB-DU, in which case, Cell 1 and/or Cell 2 may be configured as a part of Cell 0 which is a serving cell. The radio resources (PDCCH, PDSCH etc.) of Cell 0 are shared with Cell 1 and/or Cell 2. Cell 1 and/or Cell 2 may transmit SSBs different from SSBs transmitted via Cell 0, e.g., based on example of FIG. 38. A gNB-DU may be implemented based on example embodiments described above with respect to FIG. 1A and/or FIG. 1B.

In an example, Cell 0, Cell 1 and/or Cell 2 may belong to different gNB-DUs (which are associated with a same gNB-CU or associated with different gNB-CUs), in which case, Cell 1 and/or Cell 2 may be configured as sperate cells (non-serving cell) from Cell 0. The radio resources (PDCCH, PDSCH etc.) of Cell 0 are not shared with Cell 1 and/or Cell 2. Cell 1 and/or Cell 2 may transmit SSBs different from SSBs transmitted via Cell 0, e.g., based on example of FIG. 38. A gNB-DU and/or a gNB-CU may be implemented based on example embodiments described above with respect to FIG. 1A and/or FIG. 1B.

In the example of FIG. 39, the wireless device may perform Layer 1/2 measurement report (CSI/beam) for the list of candidate target PCells and/or the current PCell. The layer 1/2 measurement report may comprise layer 1 RSRP, layer 1 RSRQ, PMI, RI, layer 1 SINR, CQI, etc., which is different from L3 measurements as shown above. In order to facilitate the wireless device to perform L1/2 measurements, the base station may transmit RRC configuration messages comprising configuration parameters of L1/2 measurements for one or more candidate cells. The one or more candidate cells may be a subset of a plurality of candidate cells for which the wireless device reports L3 measurements to the base station.

In an example, the RRC configuration messages, comprising configuration parameters of L1/2 measurements for one or more candidate cells, may be the same as the RRC messages used for L3 measurement configuration or be the same as the RRC configuration messages for the candidate PCell configuration as shown above.

In an example, the RRC configuration messages, comprising configuration parameters of L1/2 measurements for one or more candidate cells, may be separate and/or independent from the RRC configuration messages for the candidate PCell configuration as shown above.

In an example, the RRC configuration messages, comprising the configuration parameters of L1/2 measurements, may be the same as a RRC message configuring a serving cell (Cell 0 as shown in FIG. 39), which comprise L1/2 measurement configurations of the serving cell.

In an example, L1/2 measurement configurations of a serving cell may be implemented based on example embodiments of FIG. 40, FIG. 41 and/or FIG. 42 which will be described later in the specification. In an example, the L1/2 measurement configuration of the serving cell may comprise a plurality of SSB resource sets (CSI-SSB-ResourceSets) for CSI (CQI/PMI/RI/L1-RSRP/L1-SINR etc.) measurements. A CSI-SSB-ResourceSet is identified by a CSI-SSB-Resource set identifier (ID) and comprises a list of SSB indexes, each SSB index being associated with a ServingAdditionalPCIIndex indicating a physical cell ID of the SSB, among multiple SSBs associated with the ServingAdditionalPCIInex. If a value of the ServingAdditionalPCIIndex is zero, the PCI of the SSB index is the PCI of the serving cell (e.g., Cell 0). If a value of the ServingAdditionalPCIIndex is not zero, the ServingAdditionalPCIIndex indicates an additionalPCIIndex of an SSB-MTC-AdditionalPCI configured using the additionalPCI-ToAddModList in ServingCellConfig, and the PCI is the additionalPCI (e.g., PCI of Cell 1, PCI of Cell 2, etc.) in the SSB-MTC-AdditionalPCI. A PCI of a cell is a cell identifier uniquely identifying the cell in a wireless communication system. In an example, a CSI-SSB-Resourceset of Cell 0 may indicate SSB 0 from Cell 0, SSB 1 from Cell 1, SSB 2 from Cell 2, etc.

In an example, based on the L1/2 measurement configurations of the serving cell (Cell 0), the wireless device may measure CSI (e.g., CQI/PMI/L1-RSRP/L1-RSRQ/L1-SINR) of each SSB of the SSBs configured in the CSI-SSB-ResourceSet of Cell 0, wherein each SSB may be from different cells (or different PCIs). In an example, if a CSI-SSB-Resourceset of Cell 0 indicates SSB 0 from Cell 0, SSB 1 from Cell 1, SSB 2 from Cell 2, etc., the wireless device may measure SSB 0 from Cell 0, SSB 1 from Cell 1 and SSB 2 from Cell 2 for the L1/2 CSI/beam measurement for the LTM procedure. The wireless device may measure CSI based on example embodiments of FIG. 43, FIG. 44A and/or FIG. 44B.

In an example, the wireless device, based on the measuring CSI of each SSB of the SSBs configured in the CSI-SSB-ResourceSet of Cell 0, may trigger a layer 1/2 measurement report. The triggering the layer 1/2 measurement report may be based on a triggering indication of the base station and/or a triggering event occurring at the wireless device.

In an example, the layer 1/2 measurement report may be triggered by a measurement event, e.g., when the measurement of the CSI of a candidate target PCell (e.g., Cell 1, Cell 2 etc.) is greater than a threshold, or (amount of offset) greater than the current PCell (Cell 0), etc.

In an example, the layer 1/2 measurement report may be triggered by receiving a triggering indication (e.g., a DCI or a MAC CE) indicating to report the layer 1/2 measurement of one or more candidate target PCell (e.g., Cell 1, Cell 2, etc.). In response to receiving the triggering indication, the wireless device may (after performing the L1/2 measurement) transmit the layer 1/2 measurement report indicating whether at least one candidate target PCell has better CSI measurement than the current PCell. In response to no candidate target PCell having better CSI measurement than the current PCell after receiving the triggering indication, the wireless device may skip transmitting the layer 1/2 measurement of candidate target PCell (Cell 1, Cell 2, etc.) or may transmit only layer 1/2 CSI measurement of the serving cell (Cell 0).

In an example, the layer 1/2 measurement report may be transmitted with a periodicity configured by the source gNB.

In an example, the layer 1/2 measurement report may be contained in a UCI via PUCCH/PUSCH, or a MAC CE (e.g., event-triggered, associated with a configured SR for the transmission of the MAC CE).

In this specification, the layer 1/2 measurement and/or reporting of a candidate target PCell, before actually switching to the candidate target PCell as a serving PCell, may be referred to as an early CSI report for a candidate target PCell, which is different from a CSI report of a serving PCell. Early CSI report for a candidate target PCell, before the wireless device performs a layer 1/2 triggered mobility procedure to switch to the candidate target PCell as the serving PCell, may enable the base station to obtain correct beam information, for example, in terms of which SSB can be used as beam reference for downlink transmission for the candidate target PCell, when later the wireless device switches to the candidate target PCell as the serving PCell, without waiting for beam management after the switching, therefore, improving (handover) latency of the PCell switching.

In the example of FIG. 39, the wireless device may determine that Cell 1 has better channel quality (L1-RSRP/L1-SINR/L1-RSRQ, etc.) than Cell 0. The wireless device may transmit the layer 1/2 measurement report indicating that Cell 1 has better channel quality than Cell 0.

In an example, the source base station and/or the target base station may determine which cell is used as the target PCell. The source base station, upon receiving the layer 1/2 measurement report, may coordinate with the candidate target base station regarding whether Cell 1 could be used as a candidate target PCell for future HO.

In the example of FIG. 39, when determining Cell 1 is used as the target PCell for future HO, the source base station (e.g., according to the request of the target base station if there is no time alignment obtained before for Cell 1), may transmit, from Cell 0 (or an activated SCell of the wireless device) a first layer 1/2 ($1^{st}$ L1/2) command (e.g., a DCI/MAC CE/RRC message comprising PDCCH order as shown in FIG. 39) triggering a preamble transmission (RACH, or other uplink signals like SRS) towards Cell 1. The DCI may be based on a PDCCH order in existing technology.

In the example of FIG. 39, the wireless device, upon receiving the first layer 1/2 command, may transmit the preamble (or SRS which is not shown in FIG. 39) to the target PCell (Cell 1). The target base station may monitor PRACH occasion for receiving the preamble to estimate the TA used for future uplink transmission from the wireless device after the wireless device switches the PCell from Cell 0 to Cell 1.

In the example of FIG. 39, the target base station may forward the estimated TA for Cell 1 to the source base station.

In the example of FIG. 39, the source base station may transmit the forwarded TA to the wireless device, e.g., via a RAR message, or via a TAC MA CE. In this case, the wireless device may monitor PDCCH (on Cell 0) for receiving the RAR message based on existing technologies (e.g., based on example embodiments described above with respect to FIG. 13A, FIG. 13B and/or FIG. 13C). The wireless device may maintain a TAT for a TAG associated with Cell 1. The wireless device may maintain Cell 1 as a non-serving cell. The TAC MAC CE may indicate (e.g., one or more bitfields of the MAC CE) whether the TAC is for a serving cell (or a TAG associated with the serving cell) or for a non-serving cell (e.g., Cell 1).

In an example, the source base station may skip transmitting the forwarded TA to the wireless device. Instead, the source base station may indicate the TA together with a second layer 1/2 command indicating/triggering PCell switching from Cell 0 to Cell 1. In this case, the wireless device may skip monitoring PDCCH (on Cell 0) for receiving the RAR message.

In the example of FIG. 39, the transmission of a preamble to a candidate target PCell, before receiving a (P)Cell switch command (with or without comprising a TA estimated by the target base station for the target PCell) indicating to switch the PCell to the target PCell, is referred to as an early TA acquisition (ETA) procedure/process/feature/scheme in this specification. By implementing the ETA, before the wireless device performs the HO, the target base station may obtain the TA to be used by the wireless device after performing the HO to the target PCell. The TA for the target PCell may be transmitted in a RAR or combined together with the L1/2 (or L1/L2) command indicating the PCell switching. The ETA procedure may reduce the latency for uplink synchronization with the target PCell upon performing HO procedure (or PCell switching procedure).

In the example of FIG. 39, the wireless device may receive a second L1/2 command (e.g., MAC CE as shown in FIG. 39) indicating the PCell switching from Cell 0 to Cell 1. The second L1/2 command may further indicate the TA (forwarded from the target base station to the source base station and used for the target PCell in future), e.g., if the TA is not received before receiving the second L1/2 command. The second L1/2 command may further indicate a beam information (a TCI state and/or a SSB index, which may be obtained in the early CSI report as described above) to be used for downlink reception and/or uplink transmission over Cell 1. In response to receiving the second L1/2 command, the wireless device may switch the PCell from Cell 0 to Cell 1 and transmit PUSCH/PUCCH via Cell 1 based on the TA. The wireless device may receive downlink signals and transmit uplink signals based on the indicated beam information. Switching the PCell from Cell 0 to Cell 1 may comprise at least one of: applying RRC configuration parameters of Cell 1, stopping applying RRC configuration parameters of Cell 0, resetting/reconfiguring MAC entity, receiving RRC messages/MIB/SSBs/SIBs/PDCCHs/PDSCHs from Cell 1 and stopping receiving RRC messages/MIB/SSBs/SIBs/PDCCHs/PDSCHs from Cell 0.

In an example, a PCell switch procedure based on a L1/2 command (e.g., combined with an early CSI report and/or an ETA procedure) may be referred to as a L1/2 triggered mobility (LTM) procedure, based on example embodiments described above with respect to FIG. 39.

FIG. 40, FIG. 41 and FIG. 42 show examples of RRC messages for layer 1/2 CSI measurement and/or report configuration. In an example, a base station may transmit to a wireless device, a RRC message of a serving cell (e.g., ServingCellConfig IE in FIG. 40) comprising configuration parameters of layer 1/2 measurements (e.g., csi-MeasConfig 1E) and layer 3 measurements (e.g., servingCellMO IE). A csi-MeasConfig IE may indicate a list of non-zero power CSI-RS resource (e.g., nzp-CSI-RS-ResourceToAddModList), a list of non-zero power CSI-RS resource sets (e.g., nzp-CSI-RS-ResourceSet ToAddModList), a list of SSB resource sets (e.g., csi-SSB-ResourceSetToAddList), a list of CSI resource configurations (e.g., csi-ResourceConfigToAddList), a list of CSI report configurations (e.g., csi-ReportConfigToAddList) and etc. A non-zero power CSI resource (e.g., NZP-CSI-RS-Resource) is identified by an NZP-CSI-RS-ResourceId and configured with a periodicity and offset parameter (CSI-ResourcePeriodicityAndOffset) and a QCL configuration (e.g., TCI-stateId), etc. A CSI-RS resource may be implemented based on example embodiments described above with respect to FIG. 11B. A non-zero power CSI resource set is identified by an NZP-CSI-RS-ResourceSetId and comprise a list of non-zero power CSI-RS resources.

As shown in FIG. 41, a csi-SSB-Resource Set is identified by a CSI-SSB-ResourceSetId and comprises a list of SSB indexes, each SSB index being associated with a respective ServingAdditionalPCIIndex of a list of additional PCIs (servingAdditionalPCIList). The servingAdditionalPCIList indicates the physical cell IDs (PCIs) of the SSBs in the csi-SSB-ResourceList. If the servingAdditionalPCIList is present in the csi-SSB-ResourceSet, the list has the same number of entries as csi-SSB-ResourceList. The first entry of the list indicates the value of the PCI for the first entry of csi-SSB-ResourceList, the second entry of this list indicates the value of the PCI for the second entry of csi-SSB-ResourceList, and so on. In an example, for each entry of the servingAdditionalPCIList, if the value is zero, the PCI is the PCI of the serving cell in which this CSI-SSB-Resource Set is defined, otherwise, the value is additionalPCIIndex-r17 of an SSB-MTC-AdditionalPCI-r17 configured using the additionalPCI-ToAddModList-r17 in ServingCellConfig, and the PCI is the additionalPCI-r17 in this SSB-MTC-AdditionalPCI-r17.

As shown in FIG. 41, based on the list of NZP-CSI-RS-ResourceSets and the list of csi-SSB-Resource Sets, the base station may configure, for each CSI resource configuration (CSI-ResourceConfig) identified by CSI-ResourceConfigId, a list of CSI-RS resource sets (csi-RS-ResourceSetList) comprising a list of non-zero power CSI-RS resource sets (nzp-CS-RS-ResourceSetList) and/or a list of csi-SSB-ResourceSets (csi-SSB-ResourceSetList) for CSI measurement, or comprising a list of csi-IM-Resource sets (csi-IM-ResourceSetList) for interference measurements. Each CSI resource of a CSI resource configuration is located in the DL BWP identified by the higher layer parameter BWP-id of the CSI resource configuration, and all CSI Resource lists linked to a CSI Report Setting have the same DL BWP.

As shown in FIG. 42, based on the CSI resource configurations described above with respect to FIG. 40 and/or FIG. 41, the base station may configure, for each CSI report configuration (CSI-ReportConfig) identified by a CSI report configuration identifier (e.g., CSI-ReportConfigId), a serving cell index indicating in which serving cell the CSI-ResourceConfig are to be found (if the field is absent, the resources are on the same serving cell as this report configuration), a CSI-ResourceConfigId indicating CSI resources for channel measurement, a report type indication indicating whether the CSI report is periodic, semi-persistent CSI report on PUCCH, semi-persistent CSI report on PUSCH, or aperiodic, a report quantity indication indicating a report quantity (e.g., CRI-RSRP, SSB-index-RSRP, etc.) (wherein SSB-index-RSRP is referred to as layer 1 RSRP (L1-RSRP) in this specification), a time domain restriction indication for channel measurements (timeRestrictionForChannelMeasurements), etc. A semi-persistent CSI report on PUCCH may be triggered by a SP CSI activation/deactivation MAC CE. A semi-persistent CSI report on PUSCH may be triggered by a DCI with CRC being scrambled by SP-CSI-RNTI. An aperiodic CSI report may be indicated by a DCI scheduling a PUSCH transmission and comprising a aperiodic CSI request field.

Based on the configurations of CSI measurement and reports via RRC messages of FIG. 40, FIG. 41 and/or FIG. 42, the wireless device may measure and transmit CSI report. For beam measurements, the wireless device may transmit L1-RSRP report.

In an example, a wireless device may be configured (e.g., based on example embodiments described above with respect to FIG. 40, FIG. 41 and/or FIG. 42) with CSI-RS resources, SS/PBCH Block resources or both CSI-RS and SS/PBCH block resources, when resource-wise quasi co-located with 'type C' and 'typeD' when applicable. In an example, the wireless device may be configured with CSI-RS resource setting up to 16 CSI-RS resource sets having up to 64 resources within each set. The total number of different CSI-RS resources over all resource sets is no more than 128.

In an example, for L1-RSRP reporting, if the higher layer parameter nrofReportedRS in CSI-ReportConfig is configured to be one, the reported L1-RSRP value is defined by a 7-bit value in the range [−140, −44] dBm with 1 dB step size, if the higher layer parameter nrofReportedRS is configured to be larger than one, or if the higher layer parameter groupBasedBeamReporting is configured as 'enabled', or if the higher layer parameter groupBasedBeamReporting-r17 is configured, the wireless device uses differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with reference to the largest measured L1-RSRP value which is part of the same L1-RSRP reporting instance.

In an example, when the higher layer parameter groupBasedBeamReporting-r17 in CSI-ReportConfig is configured, the wireless device indicates the CSI Resource Set associated with the largest measured value of L1-RSRP, and for each group, CRI or SSBRI of the indicated CSI Resource Set is present first.

In an example, if the higher layer parameter timeRestrictionForChannelMeasurements in CSI-ReportConfig is set to "notConfigured", the wireless device derives the channel measurements for computing L1-RSRP value reported in uplink slot n based on only the SS/PBCH or NZP CSI-RS, no later than a CSI reference resource, associated with the CSI resource setting. A CSI reference resource may be defined and implemented based on example embodiments of FIG. 43 which will be described later.

In an example, if the higher layer parameter timeRestrictionForChannelMeasurements in CSI-ReportConfig is set to "Configured", the wireless device derives the channel measurements for computing L1-RSRP reported in uplink slot n based on only the most recent, no later than the CSI reference resource, occasion of SS/PBCH or NZP CSI-RS associated with the CSI resource setting.

In an example, when the wireless device is configured with SSB-MTC-AddtionalPCI, a CSI-SSB-ResourceSet configured for L1-RSRP reporting includes one set of SSB indices and one set of PCI indices, where each SSB index is associated with a PCI index, as shown above with respect to FIG. 41.

In an example, when the wireless device is configured with a CSI-ReportConfig with the higher layer parameter reportQuantity set to 'cri-RSRP-Capability[Set]Index' or 'ssb-Index-RSRP-Capability[Set]Index', an index of wireless device capability value set, indicating the maximum supported number of SRS antenna ports, is reported along with the pair of SSBRI/CRI and L1-RSRP.

Figure 43:
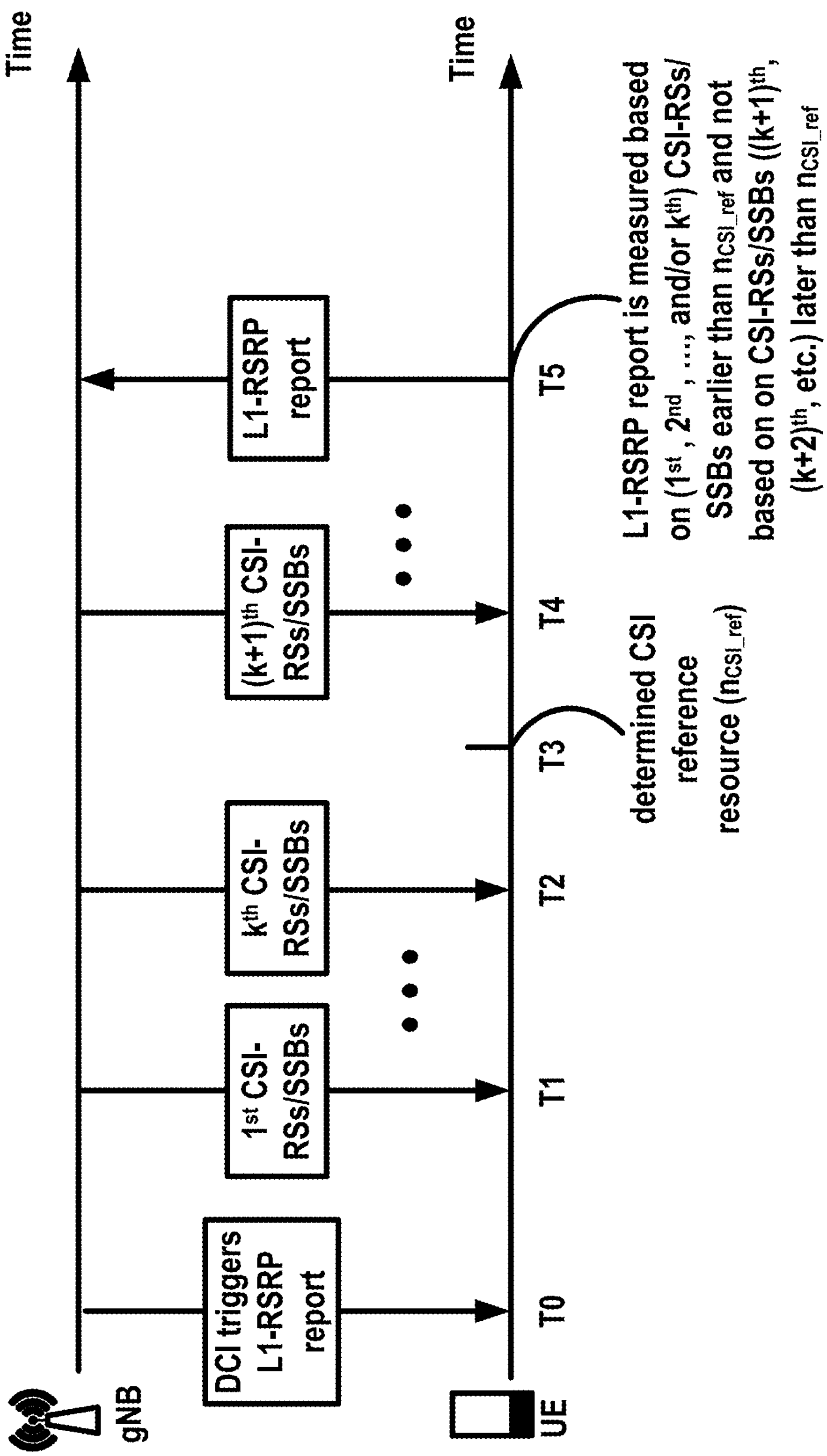
FIG. 43 shows an example embodiment of layer 1 CSI report.

FIG. 43 shows an example of CSI report (e.g., L1-RSRP report) for a serving cell. In an example, a base station may transmit to a wireless device (e.g., at TO) a DCI indicating/triggering a L1-RSRP report of a serving cell.

In an example, the DCI may indicate aperiodic CSI report comprising the L1-RSRP report via a PUSCH resource.

In an example, the DCI may trigger a semi-persistent CSI report (SP CSI report) comprising the L1-RSRP report of the serving cell via a PUSCH resource. The SP CSI report may be transmitted by the wireless device periodically based on the periodicity of the SP CSI report configuration.

In an example, the DCI may comprise a triggering indication of an aperiodic CSI-RS (AP-CSI-RS) for the L1-RSRP report. In response to receiving the triggering indication of the AP-CSI-RS, the wireless device may measure the AP-CSI-RS for the L1-RSRP report.

In an example, the L1-RSRP report may be measured based on periodic CSI-RS or SSBs.

In an example, the L1-RSRP report may be configured based on example embodiments described above with respect to FIG. 40, FIG. 41 and/or FIG. 42.

As shown in FIG. 43, the base station may transmit CSI-RSs and/or SSBs for the CSI reports, e.g., 1st CSI-RSs/SSBs at T1, . . . , kth CSI-RSs/SSBs at T2, (k+1)th CSI-RSs/SSBs at T4, etc. In an example, the wireless device may determine a CSI reference resource ($n_{CSI\_ref}$ which is T3 as shown in FIG. 43) for the serving cell for the L1-RSRP report which is to be transmitted at T5.

In an example, the wireless device derives the channel measurements for computing L1-RSRP value reported in uplink slot n (e.g., at T5) based on only the SS/PBCH or NZP CSI-RS (e.g., 1st CSI-RSs/SSBs at T1, . . . , Kth CSI-RSs/SSBs at T2 as shown in FIG. 43), no later than a CSI reference resource ($n_{CSI\_ref}$, which is T3 as shown in FIG. 43), associated with the CSI resource setting if the higher layer parameter timeRestrictionForChannelMeasurements in CSI-ReportConfig is set to "notConfigured".

In an example, the wireless device derives the channel measurements for computing L1-RSRP reported in uplink slot n (e.g., at T5) based on only the most recent (e.g., kth CSI-RSs/SSBs at T2 as shown in FIG. 43), no later than the CSI reference resource ($n_{CSI\_ref}$, which is T3 as shown in FIG. 43), occasion of SS/PBCH or NZP CSI-RS associated with the CSI resource setting, if the higher layer parameter timeRestrictionForChannelMeasurements in CSI-ReportConfig is set to "Configured".

In an example, a CSI reference resource ($n_{CSI\_ref}$, which is T3 as shown in FIG. 43) for a serving cell is defined, in frequency domain, by a group of downlink physical resource blocks (PRBs) corresponding to the band to which the derived CSI relates.

In an example, in time domain, a CSI reference resource ($n_{CSI\_ref}$, which is T3 as shown in FIG. 43) for a CSI reporting in uplink slot n' (e.g., T5 in FIG. 43) is defined by a single downlink slot $$n - n_{CSI\_ref} - K_{offset} \cdot \frac{2^{\mu_{DL}}}{2^{\mu_{K_{offset}}}},$$

where $K_{offset}$ is a parameter configured by higher layer (e.g., as specified in clause 4.2 of 3GPP TS 38.213), and where $\mu_{K_{offset}}$ is the subcarrier spacing configuration for $K_{offset}$ with a value of 0 for frequency range 1.

In an example, $$n = \left\lfloor n' \cdot \frac{2^{\mu_{DL}}}{2^{\mu_{UL}}} \right\rfloor + \left\lfloor \left( \frac{N^{CA}_{slot,\,offset,\,UL}}{2^{\mu_{offset,\,UL}}} - \frac{N^{CA}_{slot,\,offset,\,DL}}{2^{\mu_{offset,\,DL}}} \right) \cdot 2^{\mu_{DL}} \right\rfloor$$

and $\mu_{DL}$ and $\mu_{UL}$ are the subcarrier spacing configurations for DL and UL, respectively, and $$N^{CA}_{slot,\,offset}$$

and $\mu_{offset}$ are determined by higher-layer configured ca-SlotOffset for the cells transmitting the uplink and downlink.

In an example, for periodic and semi-persistent CSI reporting, if a single CSI-RS/SSB resource is configured for channel measurement, $n_{CSI\_ref}$ is the smallest value greater than or equal to $4 \cdot 2^{\mu_{DL}}$, such that it corresponds to a valid downlink slot, or if multiple CSI-RS/SSB resources are configured for channel measurement, $n_{CSI\_ref}$ is the smallest value greater than or equal to $5 \cdot 2^{\mu_{DL}}$, such that it corresponds to a valid downlink slot.

In an example, for aperiodic CSI reporting, if the wireless device is indicated by the DCI to report CSI in the same slot as the CSI request, $n_{CSI\_ref}$ is such that the reference resource is in the same valid downlink slot as the corresponding CSI request, otherwise $n_{CSI\_ref}$ is the smallest value greater than or equal to $$\lfloor Z' / N^{slot}_{symb} \rfloor,$$

such that slot $n - n_{CSI\_ref}$ corresponds to a valid downlink slot, where Z' corresponds to the delay requirement which will be described later in FIG. 44A and FIG. 44B.

In an example, when periodic or semi-persistent CSI-RS/CSI-IM or SSB is used for channel/interference measurements, the wireless device is not expected to measure channel/interference on the CSI-RS/CSI-IM/SSB whose last OFDM symbol is received up to Z' symbols before transmission time of the first OFDM symbol of the aperiodic CSI reporting.

In an example, a slot in a serving cell shall be considered to be a valid downlink slot if it comprises at least one higher layer configured downlink or flexible symbol and it does not fall within a configured measurement gap for the wireless device.

In an example, if there is no valid downlink slot for the CSI reference resource corresponding to a CSI Report Setting in a serving cell, CSI reporting is omitted for the serving cell in uplink slot n'.

In an example, after the CSI report (re) configuration, serving cell activation, BWP change, or activation of SP-CSI, the wireless device reports a CSI report only after receiving at least one CSI-RS transmission occasion for channel measurement and CSI-RS and/or CSI-IM occasion for interference measurement no later than CSI reference resource and drops the report otherwise.

In an example, when DRX is configured, the wireless device reports a CSI report only if receiving at least one CSI-RS transmission occasion for channel measurement and CSI-RS and/or CSI-IM occasion for interference measurement in DRX Active Time no later than CSI reference resource and drops the report otherwise.

In an example, a wireless device may spend non-zero amount of time for CSI computation to obtain/transmit CSI report in response to receiving a DCI indicating/triggering a CSI report. The amount of time for CSI computation may be referred to as CSI computation time. The wireless device determines the CSI computation time as follows, e.g., when a CSI request field on a DCI triggers a CSI report(s) on PUSCH, the wireless device provides a valid CSI report for the n-th triggered report if the first uplink symbol to carry the corresponding CSI report(s) including the effect of the timing advance, starts no earlier than at symbol $Z_{ref}$, and if the first uplink symbol to carry the n-th CSI report including the effect of the timing advance, starts no earlier than at symbol $Z'_{ref}(n)$.

In an example, $Z_{ref}$ is defined as the next uplink symbol with its CP starting $T_{proc,CSI} = (Z)(2048+144) \cdot \kappa 2^{-\mu} \cdot T_C + T_{switch}$ after the end of the last symbol of the PDCCH triggering the CSI report(s).

In an example, $Z'_{ref}(n)$, is defined as the next uplink symbol with its CP starting $T'_{proc,CSI} = (Z')(2048+144) \cdot \kappa 2^{-\mu} \cdot T_C$ after the end of the last symbol in time of the latest of: aperiodic CSI-RS resource for channel measurements, aperiodic CSI-IM used for interference measurements, and aperiodic NZP CSI-RS for interference measurement, when aperiodic CSI-RS is used for channel measurement for the n-th triggered CSI report, and where $T_{switch}$ is a receiving antenna switching delay based on the wireless device capability (e.g., based on existing standardization of clause 6.4 of TS 38.214) and is applied only if $Z_1$ of CSI computation delay requirement 1 (which will be described in FIG. 44A) is applied.

In an example, if the PUSCH indicated by the DCI is overlapping with another PUCCH or PUSCH, then the CSI report(s) are multiplexed (e.g., based on procedures specified in clause 9.2.5 of TS 38.213 and clause 5.2.5 of TS 38.214) when applicable, otherwise the CSI report(s) are transmitted on the PUSCH indicated by the DCI.

In an example, when the CSI request field on a DCI triggers a CSI report(s) on PUSCH, if the first uplink symbol to carry the corresponding CSI report(s) including the effect of the timing advance, starts earlier than at symbol $Z_{ref}$, the wireless device may ignore the scheduling DCI if no HARQ-ACK or transport block is multiplexed on the PUSCH.

In an example, when the CSI request field on a DCI triggers a CSI report(s) on PUSCH, if the first uplink symbol to carry the n-th CSI report including the effect of the timing advance, starts earlier than at symbol $Z'_{ref}(n)$, the wireless device may ignore the scheduling DCI if the number of triggered reports is one and no HARQ-ACK or transport block is multiplexed on the PUSCH, otherwise, the wireless device is not required to update the CSI for the n-th triggered CSI report.

In an example, when the PDCCH reception includes two PDCCH candidates from two respective search space sets (e.g., as described in clause 10.1 of TS 38.213), for the purpose of determining the last symbol of the PDCCH triggering the CSI report(s), the PDCCH candidate that ends later in time is used.

In an example, Z, Z' and μ are defined as:

$$Z = \max_{m=0, \ldots, M-1} (Z(m)) \text{ and } Z' = \max_{m=0, \ldots, M-1} (Z'(m)),$$

where M is the number of updated CSI report(s) (e.g., according to clause 5.2.1.6 of TS 38.214), (Z(m), Z'(m)) corresponds to the m-th updated CSI report and is defined as

- $(Z_1, Z'_1)$ of FIG. 4A if max $\{\mu_{PDCCH}, \mu_{CSI\text{-}RS}, \mu_{UL}\} \leq 3$ and if the CSI is triggered without a PUSCH with either transport block or HARQ-ACK or both when L=0 CPUs are occupied (e.g., according to clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typel-SinglePanel' or where reportQuantity is set to 'cri-RI-CQI', or
- $(Z_1, Z'_1)$ of FIG. 44B if the CSI to be transmitted corresponds to wideband frequency-granularity where the CSI corresponds to at most 4 CSI-RS ports in a single resource without CRI report and where CodebookType is set to 'typel-SinglePanel' or where reportQuantity is set to 'cri-RI-CQI', or
- $(Z_1, Z'_1)$ of FIG. 44B if the CSI to be transmitted corresponds to wideband frequency-granularity where the reportQuantity is set to 'ssb-Index-SINR', 'cri-SINR', 'ssb-Index-SINR-Capability[Set]Index', or 'cri-SINR-Capability[Set]Index', or
- $(Z_3, Z'_3)$ of FIG. 44B if reportQuantity is set to 'cri-RSRP', 'ssb-Index-RSRP', 'cri-RSRP-Capability[Set] Index' or 'ssb-Index-RSRP-Capability[Set]Index', where $X_u$ is according to wireless device reported capability beamReportTiming and $KB_l$ is according to wireless device reported capability beamSwitchTiming (e.g., as defined in TS 38.306 and/or as described later), or
- $(Z_2, Z'_2)$ of FIG. 44B otherwise.
- $\mu$ of FIG. 44A and FIG. 44B corresponds to the min $(\mu_{PDCCH}, \mu_{CSI\text{-}RS}, \mu_{UL})$ where the $\mu_{PDCCH}$ corresponds to the subcarrier spacing of the PDCCH with which the DCI was transmitted and $\mu_{UL}$ corresponds to the subcarrier spacing of the PUSCH with which the CSI report is to be transmitted and $\mu_{CSI\text{-}RS}$ corresponds to the minimum subcarrier spacing of the aperiodic CSI-RS triggered by the DCI.

FIG. 44A and FIG. 44B show example delay requirements for CSI computation. FIG. 44A shows CSI computation delay requirement 1. FIG. 44B shows CSI computation delay requirement 2. The wireless device may determine which one of FIG. 44A and FIG. 44B is used for CSI computation delay based on the embodiments described above.

In an example, X$\mu$ (where $\mu$ is SCS defined above) is according to the wireless device reported capability beamReportTiming. The reported beamReportingTiming indicates the number of OFDM symbols between the end of the last symbol of SSB/CSI-RS and the start of the first symbol of the transmission channel containing beam report. The wireless device may report a value of beamReportingTiming per SCS. In an example, in 3GPP Rel. 17 standardization, a value of beamReportingTiming for 15 kHz SCS may be one of 2, 4 and 8. A value of beamReportingTiming for 30 KHz SCS may be one of 4, 8, 14 and 28. A value of beamReportingTiming for 60 KHz SCS may be one of 8, 14 and 28. A value of beamReportingTiming for 120 KHz SCS may be one of 14, 28 and 56. The wireless device provides the capability for the band number for which the report is provided (where the measurement is performed). The wireless device includes this field for each supported sub-carrier spacing.

In an example, $KB_l$ is according to a wireless device reported capability beamSwitchTiming. The capability beamSwitchTiming, reported by the wireless device, indicates the minimum number of OFDM symbols between the DCI triggering of aperiodic CSI-RS and aperiodic CSI-RS transmission. The number of OFDM symbols is measured from the end of the last symbol containing the indication to the start of the first symbol of CSI-RS. The wireless device includes this field for each supported sub-carrier spacing. beam Switch Timing of value (sym224 or sym336 for 60 KHz with I=1 and 120 KHz SCS with I=2, sym896 or sym1344 for 480 KHz SCS with I=3 and sym1792 or sym2688 for 960 kHz SCS with I=4) may be used to determine wireless device expectation/behaviour for aperiodic CSI-RS for tracking and latency requirements for L1-RSRP reporting, while wireless device behaviour/assumption regarding before or after beam switch timing is unspecified for measuring AP CSI-RS for CSI acquisition (without trs-Info and without repetition) and for beam management (with repetition 'off').

In an example, in 3GPP NR Release17 (Rel.17 or R17), L1 CSI report for inter-cell multi-TRP has been supported and specified (e.g., as shown in FIG. 31B and/or FIG. 41) by configuring an SSB/CSI-RS with additional PCI different from PCI of a serving cell and configuring CSI report, of the serving cell, associated with the SSB/CSI-RS. The L1 CSI report for inter-cell multi-TRP specified in 3GPP NR Rel.17 has limitations which comprise: the SSB of the (non-serving) cell with different PCI from a serving cell being completely contained in the active BWP or associated with initial downlink BWP of the wireless device; the SSB of the (non-serving) cell with different PCI from the serving cell having the same SCS and center frequency as the SSB of the serving cell in frequency domain; and in time domain: the SSB of the (non-serving) cell with different PCI from the serving cell having the same sfn-SSB-Offset in time domain; the timing difference of arrival at the wireless device between the SSBs of the serving cell and the (non-serving) cell with different PCI being less than CP length of the corresponding SCS; and the wireless device having sent a valid L3 measurement report during the last 5 seconds. Otherwise, the L1-RSRP measurements for a (non-serving) cell with different PCI from the serving cell is not supported by the wireless device and/or the base station in 3GPP NR Rel.17.

In an example, for L3 beam/cell measurement supported in 3GPP NR Rel. 15~17, inter-frequency measurement and intra-frequency measurement are characterized as follow, where the intra-frequency measurement requires the center frequency of the SSB of the serving cell indicated for measurement and the center frequency of the SSB of the non-serving cell are the same, and the subcarrier spacing of the two SSBs are also the same, otherwise, the measurement is categorized as inter-frequency measurement (e.g., as specified in section 9.3 of TS38.133). The intra-frequency and inter-frequency measurement for CSI-RS based measurement are defined in section 9.10.2 and 9.10.3 of TS38.133, similarly as SSB-based measurement.

In an example, for inter-frequency L3 measurement, the wireless device may be configured with a measurement gap for measuring the non-serving cell or the candidate target cell.

In an example, the wireless device may transmit to the base station a wireless device capability parameter (e.g., interFrequencyMeas-NoGap-r16) indicating whether the wireless device can perform inter-frequency SSB based measurements without measurement gaps if the SSB is completely contained in the active BWP of the wireless device (e.g., as specified in TS 38.133). If this parameter is indicated for FR1 and FR2 differently, each indication corresponds to the frequency range of cells to be measured.

In an example, for intra-frequency L3 measurement, the wireless device may measure the non-serving cell or the target cell without applying the measurement gap.

In an example, for 3GPP Rel. 18 LTM, the early CSI report for a candidate cell and a serving cell may be considered as inter-frequency measurement, which is different from 3GPP REl. 17 inter-cell multi-TRP based measurement. The serving cell and the non-serving cell defined for 3GPP Rel.17 inter-cell multi-TRP may belong to the same DU (as exampled above with respect to FIG. 31B), which is referred to as intra-DU inter-cell deployment. However, the serving cell and the non-serving cell defined for 3GPP Rel. 18 LTM may belong to the same DU (which may be considered as intra-frequency deployment) or may not belong to the same DU which is referred to inter-DU inter-cell deployment (which may be considered as inter-frequency deployment). In an example, the scenarios not included in intra-frequency for 3GPP Rel. 18 LTM are regarded as inter-frequency, which includes at least the following scenarios: the frequency of the measured RS of a candidate cell not covered by any of the active BWPs of SpCell and SCells configured for a wireless device, but covered by some of the configured BWPs of SpCell and SCells configured for a wireless device; and the frequency of the measured RS of a candidate cell not covered by any of the configured BWPs of SpCell and SCells configured for a wireless device. In an example, when the wireless device performs the Layer 1/2 CSI measurement and/or report for a candidate target cell for 3GPP Rel.18 LTM, the time difference between the downlink signals from the serving (source) cell and the candidate target cell may be above CP which is different from the measurements for 3GPP Rel.17 inter-cell multi-TRP scenario.

In an example, given that the frequency deployment of a candidate target cell for 3GPP Rel. 18 LTM is different from 3GPP Rel.17 inter-cell multi-TRP and the time difference of a serving cell and the candidate target cell may be above CP, a measurement gap may be needed for L1/2 CSI measurement and report for the candidate target cell for 3GPP Rel. 18 LTM. The measurement gap for L1/2 CSI measurement and report for 3GPP Rel. 18 LTM may be shorter than the measurement gap for L3 inter-frequency measurement.

Figure 45:
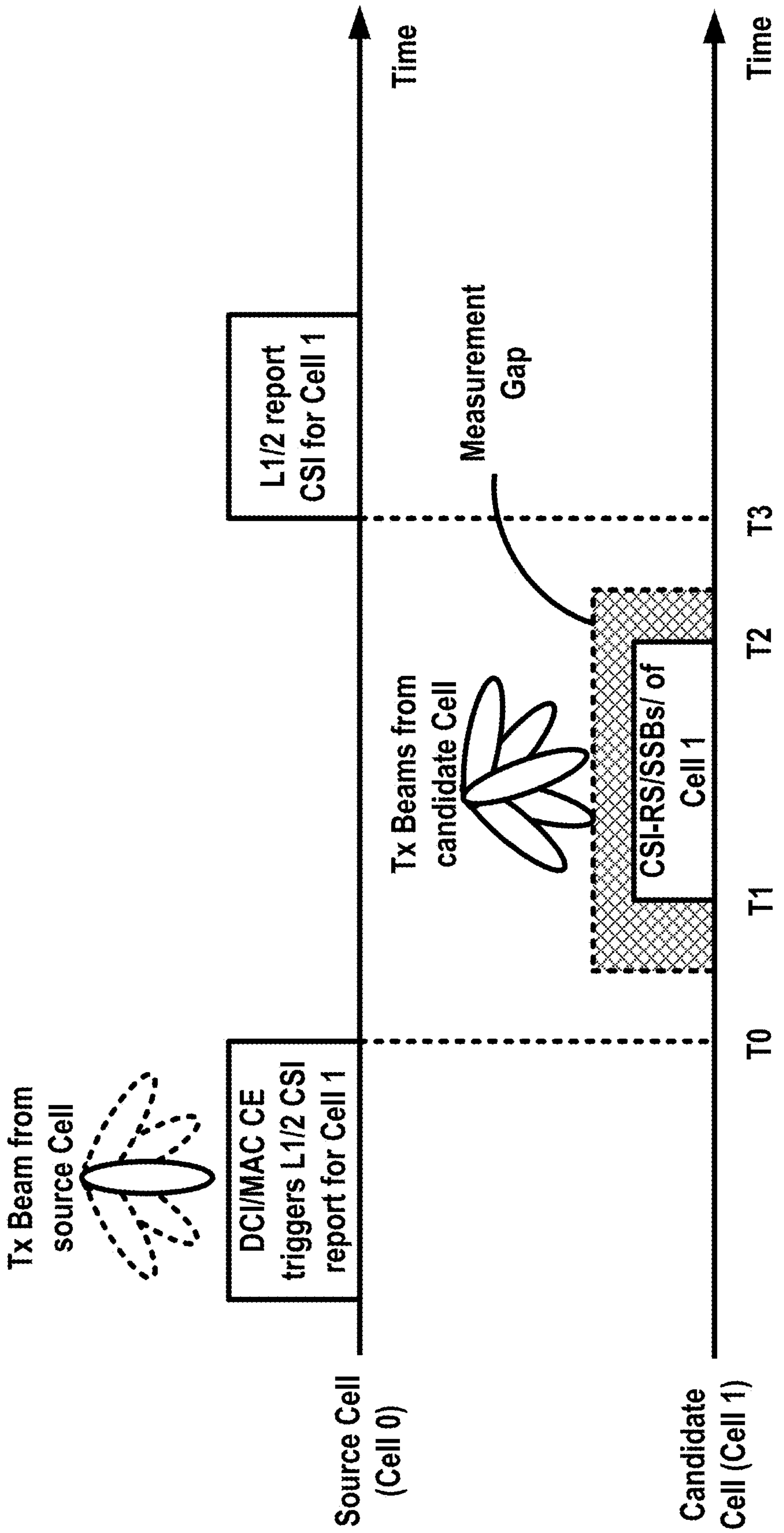
FIG. 45 shows an example embodiment of layer 1 measurement gap for layer 1/2 triggered mobility.

FIG. 45 shows an example of L1/2 CSI measurement and report (which is the early CSI report as shown in FIG. 39) for a candidate cell before a wireless device performs LTM for switching a serving PCell to the candidate cell.

In an example, a base station may transmit, via a serving/source cell (e.g., Cell 0) to a wireless device (e.g., at TO) a DCI or a MAC CE indicating/triggering a L1/2 CSI report (e.g., L1-RSRP/RSRQ/SINR)(or early CSI report for LTM procedure as defined in FIG. 39) for one or more candidate cells (e.g., Cell 1).

In an example, Cell 0 and Cell 1 may belong to the same DU (as explained above based on FIG. 38), in which case, Cell 0 and Cell 1 may be considered as intra-frequency deployment for the L1/2 CSI report for the LTM procedure if the transmissions of the CSI-RS/SSB from Cell 0 and Cell 1 meet the requirements defined above for the intra-frequency deployment.

In an example, Cell 0 and Cell 1 may belong to different DUs (as explained above) of the same CU or may belong to different DUs of different CUs. Cell 0 and Cell 1 may be considered as inter-frequency deployment for the L1/2 CSI report for the LTM procedure.

In an example, a base station may configure a measurement gap (or a layer 1 measurement gap differentiated from a layer 3 measurement gap) for the L1/2 CSI measurement and report for the LTM.

In an example, when configured with layer 3 measurement gap in existing technologies, the base station may indicate one or more configuration parameters for the layer 3 measurement gap (e.g., via RRC message comprising MeasGapConfig IE). The one or more configuration parameters comprise a FR1 measurement gap configuration (e.g., gapFR1 IE), a FR2 measurement gap configuration (gapFR2 IE). The one or more configuration parameters comprise a gapOffset indicating a starting point of the layer 3 measurement gap, a measurement length (mg/), a measurement periodicity (mgrp) and etc.

In an example, if gapFR1 is set to setup, and if an FR1 measurement gap configuration configured by gapFR1 is already setup, release the FR1 measurement gap configuration, the wireless device may setup the FR1 measurement gap configuration indicated by the gapFR1 in accordance with the received gapOffset, i.e., the first subframe of each gap occurs at an SFN and subframe meeting the following condition: SFN mod T=FLOOR (gapOffset/10), subframe=gapOffset mod 10 and with T=mgrp/10.

In an example, if gapFR2 is set to setup, and if an FR2 measurement gap configuration configured by gapFR2 is already setup, release the FR2 measurement gap configuration, the wireless device may setup the FR2 measurement gap configuration indicated by the gapFR2 in accordance with the received gapOffset, i.e., the first subframe of each gap occurs at an SFN and subframe meeting the following condition: SFN mod T=FLOOR (gapOffset/10), subframe=gapOffset mod 10 and with T=mgrp/10.

As shown in FIG. 45, the wireless device may switch to a first frequency/band where Cell 1 is deployed from a second frequency/band where Cell 0 is deployed, if Cell 0 and Cell 1 are considered/determined as inter-frequency deployment for the L1/2 CSI report for the LTM procedure. The wireless device may apply the measurement gap for measuring the L1/2 CSI quantities (L1-RSRP/RSRQ/SINR) of Cell 1, wherein during the measurement gap, the wireless device may stop receiving downlink signals from Cell 0 and/or stop transmitting uplink signals via Cell 0. During the measurement gap, the wireless device measures CSI-RSs/SSBs of Cell 1. The wireless device may determine whether measurements of CSI-RSs/SSBs of Cell 1 have better quality than measurements of CSI-RSs/SSBs of Cell 0. The wireless device may perform L1/2 CSI reports for Cell 1 and/or Cell 0 based on example embodiments described above with respect to FIG. 39.

In an example, a layer 1 measurement gap, compared to a measurement gap used for L3 measurement, may be smaller. The inter-cell layer 1 measurement for LTM may not require the wireless device to perform blind detection for the CSI-RSs/SSBs of the candidate target cell. In an example, the serving cell and the candidate cell may have some kind of synchronization (e.g., since the wireless device has performed L3 measurement as implemented based on example of FIG. 39 before the layer 1 measurement). In an example, the layer 1 measurement gap may be configured in symbol-level or slot-level.

In an example, if a layer 1 measurement gap is introduced for the early CSI report of the LTM procedure, a wireless device, by implementing existing technologies, may have difficulties in determining CSI reference resources for the early CSI report of a candidate target cell and/or determining a CSI computation time for the early CSI report. The existing method of determining CSI reference resources and/or computation time is applied for intra-frequency layer 1 measurement, but not applicable for inter-frequency layer 1 measurement. This is because there is no measurement gap for intra-frequency layer 1 measurement which however may be needed for inter-frequency layer 1 measurement. There is a need to improve the early CSI report for the LTM procedure when the serving cell and the candidate target cell are considered as inter-frequency deployment for CSI measurement and report.

In an example, for CSI (e.g., L1-RSRP/RSRQ/SINR) reporting for the LTM procedure, multiple CSI-RSs/SSBs resources may be configured, wherein different CSI-RS/SSBs are configured from different candidate target cells. The candidate target Cells are considered as inter-frequency deployment for the CSI reporting. A wireless device determines a CSI reference source, for the CSI reporting for the LTM procedure, $n_{CSI\_ref}$ is a value greater than the value used for intra-frequency CSI reporting specified in 3GPP Rel.17. The wireless device measures CSI-RSs/SSBs of the candidate target cells which are no later than the CSI reference source for the CSI reporting.

In an example, for periodic and/or semi-persistent CSI reporting for the LTM procedure, the determined CSI reference source, for the CSI reporting for the LTM procedure, $n_{CSI\_ref}$ is the smallest value greater than or equal to X. $2^{\mu_{DL}}$, such that it corresponds to a valid downlink slot, where X (e.g., 6, 7, 8 or any integer greater than 5) is greater than the value (e.g., 4 for single CSI-RS/SSB resource, or 5 for multiple CSI-RSs/SSBs) used for intra-frequency CSI reporting specified in 3GPP Rel.17.

In an example, for aperiodic CSI reporting, if the wireless device is indicated by the DCI to report CSI in the same slot as the CSI request, $n_{CSI\_ref}$ is such that the reference resource is in the same valid downlink slot as the corresponding CSI request, otherwise $n_{CSI\_ref}$ is the smallest value greater than or equal to $$\lfloor Z'_{inter-freq}/N_{symb}^{slot} \rfloor,$$

such that slot n-$n_{CSI\_ref}$ corresponds to a valid downlink slot, where $Z'_{inter-freq}$ corresponds to new CSI computation delay requirement, different from the existing CSI computation delay requirement (Z') for intra-frequency CSI measurement as described above with respect to FIG. 44A and/or FIG. 44B.

In an example, the wireless device may determine $Z'_{inter-freq}$ based on a new wireless device capability parameter (e.g., a new beamReportTiming) for beam reporting. The new beamReportingTiming indicates the number of OFDM symbols between the end of the last symbol of SSB/CSI-RS of a candidate target cell (with is considered as inter-frequency deployment from a serving cell for the early CSI measurement and report) and the start of the first symbol of the transmission channel containing beam report via the serving cell. The new beamReportTiming may be separately provided/transmitted by the wireless device from the existing beamReportTiming ($X_\mu$, μ=0,1,2,3,5,6, as shown above with respect to FIG. 44B) which is used to indicates the number of OFDM symbols between the end of the last symbol of SSB/CSI-RS of a serving cell and the start of the first symbol of the transmission channel containing beam report via the serving cell (or different serving cell). Considering the candidate target cell and the serving cell being as inter-frequency deployment, the new beamReportingTiming may be longer than the existing beamReportingTiming.

In an example, the wireless device provides the capability (indicating the value of the new beamReportingTiming) for the band number for which the report is provided (where the measurement is performed). The wireless device includes this field for each supported sub-carrier spacing.

In an example, the wireless device may determine $Z'_{inter-freq}$ based on a new wireless device capability parameter (e.g., a new beamSwitchTiming, or a new $KB_l$) for beam switching. The new beam Switch Timing indicates the minimum number of OFDM symbols between the DCI triggering of CSI report and CSI-RS/SSB transmission of a candidate target cell (with is considered as inter-frequency deployment from a serving cell for the early CSI measurement and report). The number of OFDM symbols is measured from the end of the last symbol containing the indication (or the DCI) to the start of the first symbol of CSI-RS/SSB. The new beamSwitchTiming may be separately provided/transmitted by the wireless device from the existing beamSwitchTiming ($KB_l$, I=1,2,3,4, as shown above with respect to FIG. 44B) which is used to indicates the minimum number of OFDM symbols between the DCI triggering of aperiodic CSI-RS and aperiodic CSI-RS transmission. Considering the candidate target cell and the serving cell being as inter-frequency deployment, the new beam Switch Timing may be longer than the existing beam Switch Timing.

In an example, the wireless device may transmit to the base station a wireless capability parameter (e.g., a layer 1 measurement gap for the LTM procedure) indicating a minimum number of OFDM symbols (slots, or microsecond, etc.) during which the wireless device performs the layer 1 CSI measurements on the one or more candidate target cells which may be considered as inter-frequency deployment for the layer 1 CSI measurements. The layer 1 measurement gap may be indicated per frequency band. The layer 1 measurement gap may be indicated separately from the existing layer 3 measurement gap. The layer 1 measurement gap may be shorter (e.g., in units of OFDM symbols, or slots) than the existing layer 3 measurement gap. During the layer 1 measurement gap, the wireless device may stop receiving downlink signals from the serving cell(s), and/or stop transmitting uplink signals via the serving cell(s).

In the one or more example embodiments, the wireless device may determine one or more CSI-RSs/SSBs of the one or more candidate target cells, for the early CSI report for the LTM procedure, from configured CSI-RSs/SSBs of the one or more candidate target cells, based on at least one of: the CSI reference resource; and/or the reported/configured layer 1 measurement gap. The CSI reference resource may be determined based on a predefined value or based on at least one of: the reported beamReportingTiming and the reported beamSwitchTiming. In an example, the reported beamReportingTiming (and/or the reported beam Switch Timing) may be provided by the wireless device for inter-frequency deployment for the early CSI report for the LTM procedure.

In an example, in response to receiving the DCI, at a first time/slot, indicating/triggering the layer 1/2 CSI report, the wireless device may start the layer 1 measurement gap, according to the configuration parameters of the layer 1 measurement gap, at a second time/slot, wherein the time gap between the first time/slot (e.g., the last OFDM symbol of the first time/slot) and the second time/slot (e.g., the start OFDM symbol of the second time/slot) is equal to or greater than a beam switching timing parameter (e.g., an existing beam Switch Timing for intra-frequency CSI measurement, or a new beamSwitchTiming for inter-frequency CSI measurement).

In an example, in response to receiving the DCI indicating/triggering the layer 1 (and/or layer 2, or layer 1/2) CSI report which the wireless device will transmit at a first time/slot, the wireless device may determine the layer 1 measurement gap, according to the configuration parameters of the layer 1 measurement gap, end at a second time/slot, wherein the time gap between the second time/slot (e.g., the last OFDM symbol of the second time/slot) and the first time/slot (e.g., the start OFDM symbol of the first time/slot) is equal to or greater than a beam reporting timing parameter (e.g., an existing beamReportingTiming for intra-frequency CSI measurement, or a new beamReportingTiming for inter-frequency CSI measurement).

Figure 46:
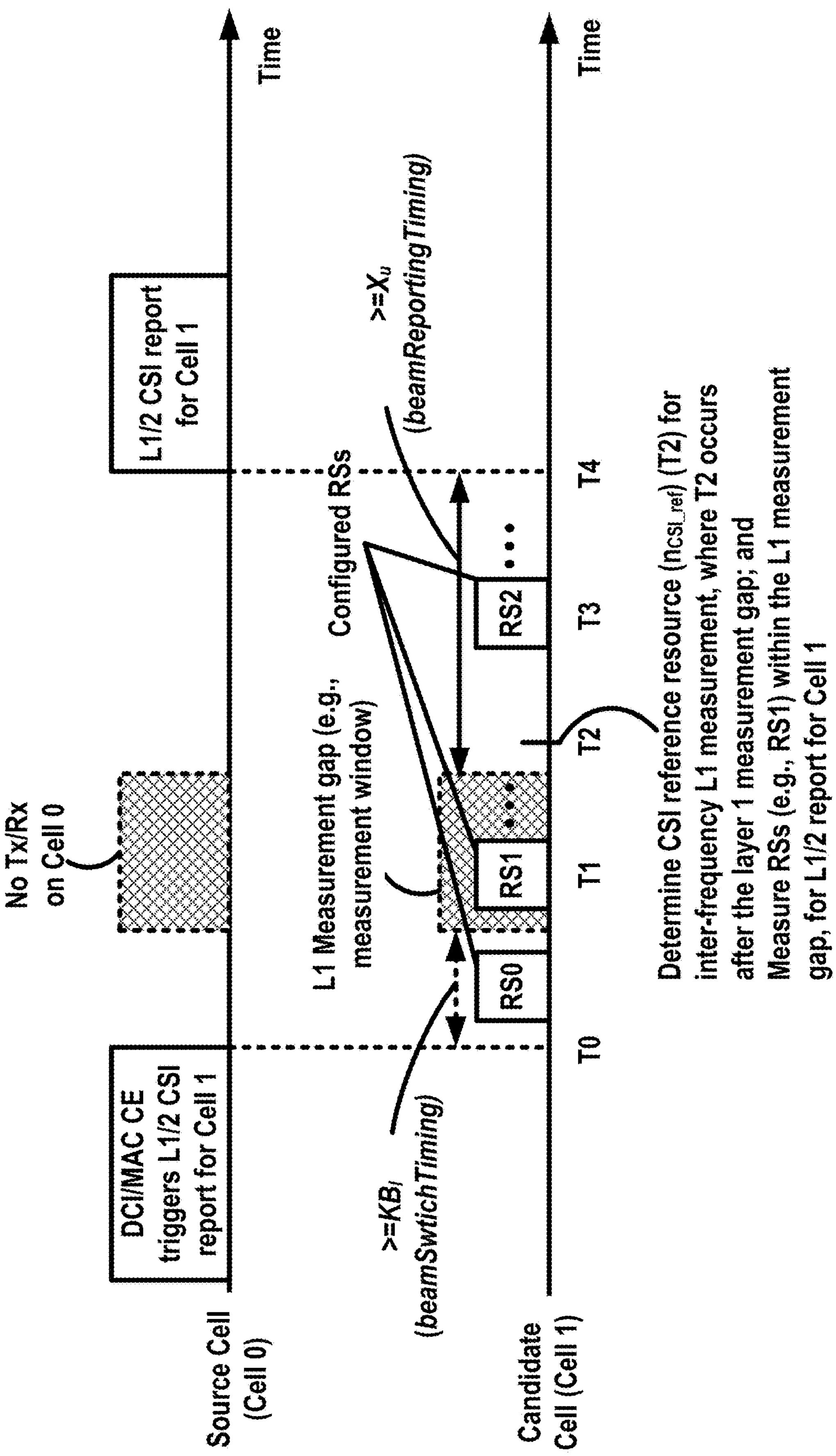
FIG. 46 shows an example embodiment of layer 1/2 CSI report for a layer 1/2 triggered mobility.

FIG. 46 shows an example embodiment of layer 1/2 CSI measurement and report for a candidate target cell for a LTM procedure, based on one or more example embodiments described above with respect to FIG. 39, FIG. 40, FIG. 41, FIG. 42, FIG. 43, FIG. 44A, FIG. 44B, and/or FIG. 45.

In an example, a base station may transmit to a wireless device, and/or a wireless device may receive, one or more RRC messages comprising configuration parameters of a first cell (e.g., Cell 0 in FIG. 46) and candidate cells or candidate target cells or candidate target PCells (e.g., Cell 1 in FIG. 46, and/or Cell 1 and Cell 2 in FIG. 39) for a LTM procedure. The LTM procedure may be implemented based on example embodiments described above with respect to FIG. 39. The one or more RRC messages may be implemented based on example embodiments described above with respect to FIG. 39 (e.g., corresponding to "Config. of candidate PCells (Cell 1, Cell 2, etc.)" in FIG. 39). In an example, the one or more RRC messages may comprise one or more Layer 1/2 candidate cell configuration messages (e.g., a newly defined candidates-L1L2-Config IE indicating configuration parameters of candidate cells (Cell 1, Cell 2, etc.) as shown in FIG. 39). A Layer 1/2 candidate PCell configuration message may comprise a list of candidate cells (Cell 1, Cell 2, etc.).

In an example, the candidates-L1L2-Config IE may comprise a list of CellGroupConfig IEs, each CellGroupConfig IE corresponding to a respective candidate cell (or candidate target PCell) of the candidate cells (or candidate target PCells). The CellGroupConfig IE of a candidate target PCell may be received by the source gNB (associated with Cell 0) from a candidate target gNB (associated with the candidate target PCell) via X2/Xn interface. The CellGroupConfig IE, of the candidate target PCell, may reuse the same signaling structure of the cell group configuration message of the serving cell (Cell 0), as shown in FIG. 33 and/or FIG. 34.

In an example, the one or more RRC messages may comprise configuration parameters of L1/2 (which may be equivalent as layer 1/2, layer 1 and/or layer 2 in this specification) CSI measurement and report (or early CSI report based on example embodiments described above with respect to FIG. 39) for the LTM procedure. The L1/2 CSI measurement and report for the LTM procedure may be implemented based on example embodiments described above with respect to FIG. 39, FIG. 40, FIG. 41 and/or FIG. 42. The L1/2 CSI measurement and report for the LTM procedure is different from a layer 3 beam/cell measurement, as shown in FIG. 39. The layer 3 beam/cell measurement is transmitted by the wireless device in a RRC message. The L1/2 CSI report is transmitted by the wireless device in a UCI via a PUCCH/PUSCH or in a MAC CE via a PUSCH.

As shown in FIG. 46, the wireless device may receive a DCI (or a MAC CE) indicating (or triggering) a L1/2 CSI report (semi-persistent, or aperiodic) for the LTM procedure. The L1/2 CSI report may be measured over CSI-RSs/SSBs of the serving/source cell (Cell 0 in FIG. 46) and/or the candidate target PCells (or candidate cells, candidate target cells, etc.)(Cell 1 in FIG. 46), which may comprise more than one candidate target PCell (which is not shown in FIG. 46).

In an example, when the L1/2 CSI report is a periodic report, the DCI (or the MAC CE) may be absent in FIG. 46. The wireless device may perform L1/2 CSI measurement based on L1/2 CSI report configuration of the one or more RRC messages, as described above with respect to FIG. 40, FIG. 41, and/or FIG. 42.

In an example, the wireless device may determine which RSs of a plurality of configured RSs (e.g., RS0, RS1, RS2, etc. as shown in FIG. 46) of the candidate cell to be measured for the L1/2 CSI report based on at least one of: a beam switch timing, a CSI reference resource, a layer 1 measurement gap and/or a beam report timing. The plurality of RSs for the L1/2 CSI report may be configured based on example embodiments described above with respect to FIG. 39, FIG. 40, FIG. 41, and/or FIG. 42.

As shown in FIG. 46, the wireless device may determine when to start measuring RSs of Cell 1. The wireless device may determine when to start measuring RSs of Cell 1 based on a beam switch timing ($KB_I$ which is indicated/reported as a wireless device capability parameter).

In an example, the beam switch timing may be a new beam Switch Timing, different from existing beamSwitchTiming which indicates the minimum number of OFDM symbols (which the wireless device supports) between a DCI triggering of aperiodic CSI-RS and aperiodic CSI-RS transmission for intra-frequency CSI measurement as shown in FIG. 44B) in existing technology, indicates the minimum number of OFDM symbols between the DCI triggering of CSI report and CSI-RS/SSB transmission of a candidate target cell (with is considered as inter-frequency deployment from a serving cell for the early CSI measurement and report). The number of OFDM symbols is measured from the end of the last symbol containing the indication (or the DCI) to the start of the first symbol of CSI-RS/SSB. The new beam Switch Timing may be separately provided/transmitted, e.g., per subcarrier spacing (SCS), by the wireless device from the existing beam Switch Timing ($KB_I$, I=1,2, 3,4, as shown above with respect to FIG. 44B). In an example, when the candidate target cell and the serving cell are considered/determined as inter-frequency deployment, the new beamSwitchTiming may be longer than the existing beam Switch Timing. In an example, the wireless device, based on the new beamSwitchTiming, or a new $KB_I$, may determine to start at a first symbol/slot, to measure RSs of Cell 1, wherein the first symbol/slot occurs KB/symbols/slots after the last OFDM symbol of the slot (TO in FIG. 46) on which the wireless device receives the DCI. By implementing example embodiment, a wireless device, by indicating, to the base station, the new beam switch timing for the early CSI measurement/report for a candidate cell which is inter-frequency deployed with a serving cell, may allow the wireless device to have enough time to switch not only beam direction, but also frequency point (e.g., RF chain retuning) for reception of RSs from the candidate cell. Otherwise, the base station and the wireless device may misalign on which RS of the candidate cell will be measured by the wireless device.

In the example of FIG. 46, in response to a time difference between the last symbol of TO and the first symbol of the RS0 being shorter than the new beam Switch Timing, or a new $KB_l$, the wireless device may skip measuring RS0.

In the example of FIG. 46, the wireless device may determine a L1 (or layer 1) measurement gap for the L1/2 CSI measurement and/or report for the LTM procedure.

In an example, the L1 measurement gap may be configured in the one or more RRC message described above.

In an example, the L1 measurement gap may be indicated in the DCI (or the MAC CE) triggering the L1/2 measurement and/or report.

In an example, the L1 measurement gap may be indicated, in the DCI (or the MAC CE) triggering the L1/2 measurement and/or report, from a plurality of L1 measurement gaps configured in the one or more RRC message.

In an example, the L1 measurement gap may be indicated/configured by the base station based on a wireless device reported capability.

In an example, the wireless device transmits RRC message (e.g., which may be the same RRC message indicating the beam switch timing or a different RRC message) comprising wireless device capability parameters indicating the L1 measurement gap (which the wireless device supports, or which is the minimum time duration of the L1 measurement so that the wireless device can obtain valid CSI report for the candidate cell), wherein the L1 measurement gap is different from a layer 3 measurement gap. The L1 measurement gap indicates a number of slots (or symbols) during which the wireless device performs L1/2 CSI measurements on the candidate cells (Cell 1 in FIG. 46 and other configured candidate cells) and/or stops receiving downlink signals and transmitting uplink signals via Cell 0 (and/or other serving cells). In an example, the wireless device capability parameters indicating the L1 measurement gap may be per cell indicated, or per frequency band indicated, or per frequency band combination indicated, etc. By implementing example embodiment, a wireless device, by transmitting the wireless device capability indicating a L1 measurement gap for the early CSI report of a candidate cell for the LTM procedure may allow the base station to configure/trigger the early CSI report appropriately. Otherwise, without the knowledge of the L1 measurement gap supported by the wireless device, the base station may incorrectly trigger the early CSI report of the candidate cell inter-frequency deployed with the serving cell.

In an example, the wireless device transmits RRC message (which may be the same RRC message indicating the beam switch timing and/or the L1 measurement gap, or a different RRC message) comprising wireless device capability parameters indicating a first beam reporting timing (e.g., $X_u$, in FIG. 46) for inter-frequency L1/2 CSI measurement/report, wherein the first beam reporting timing is different from a second beam reporting timing for intra-frequency L1/2 CSI measurement/report in existing technology as described above with respect to FIG. 44A and/or FIG. 44B. The first beam reporting timing (e.g., $X_u$, in FIG. 46) may be per SCS indicated, where for each SCS μ, a corresponding $X_u$ is indicated by the wireless device in the RRC message.

In existing technologies, μ, which is used to determine/select $X_u$ from the table(s) in FIG. 44A and/or FIG. 4B, corresponds to the min ($\mu_{PDCCH}$, $\mu_{CSI\text{-}RS}$, $\mu_{UL}$) where the $\mu_{PDCCH}$ corresponds to the subcarrier spacing of the PDCCH with which the DCI was transmitted and put corresponds to the subcarrier spacing of the PUSCH with which the CSI report is to be transmitted and $\mu_{CSI\text{-}RS}$ corresponds to the minimum subcarrier spacing of the aperiodic CSI-RS triggered by the DCI. However, for L1/2 CSI reporting for a candidate cell, SSB, instead of aperiodic CSI-RS is used for L1/2 CSI measurement. The SCS of the SSB may be different from the SCS of the aperiodic CSI-RS. Existing technologies may result in incorrect determination of μ, consequently result in incorrect selection of $X_u$ which may cause CSI measurement errors.

In an example embodiment, when SSB(s) of a candidate cell are used for L1/2 CSI measurement, the wireless device may determine μ, which is used to determine $X_u$ (which may be the first beam reporting timing as described above for inter-frequency beam measurement, or which may be the second beam reporting timing for intra-frequency beam measurement as shown in FIG. 44A and/or FIG. 4B), as the min ($\mu_{PDCCH}$, $\mu_{SSB}$, $\mu_{UL}$)(which corresponding to the longest OFDM symbol or slot length) where the $\mu_{PDCCH}$ corresponds to the subcarrier spacing of the PDCCH with which the DCI was received and $\mu_{UL}$ corresponds to the subcarrier spacing of the PUSCH with which the CSI report is to be transmitted and $\mu_{SSB}$ corresponds to the minimum subcarrier spacing of the SSBs measured by the wireless device for the candidate cells (and/or the serving cell if applicable). In an example, different candidate cells may be configured with SSBs with different SCSs. $\mu_{SSB}$ corresponds to the minimum subcarrier spacing of all SSBs measured by the wireless device for all the measured candidate cells. Based on example embodiment, the wireless device may correctly determine a beam reporting timing for L1/2 CSI reporting of a plurality of candidate cells where SSBs of different cells may be configured with different subcarrier spacing, and therefore the wireless device may transmit correct L1/2 CSI report of the candidate cell(s) to the base station based on the determined beam reporting timing.

In an example, the first beam reporting timing (which may be per SCS) indicates a number of OFDM symbols between the end of the last symbol of the RSs of the one or more candidate target cell and the start of the first symbol of the first slot in which the CSI measurement is transmitted via the serving cell, wherein the one or more candidate target cell and the serving cell may be considered as inter-frequency deployment. The second beam reporting timing indicates a number of OFDM symbols between the end of the last symbol of RSs of the serving cell and the start of the first symbol of the first slot in which the CSI measurement is transmitted via the serving cell. In an example, the first beam reporting timing for the inter-frequency L1/2 CSI measurement/report may be longer than the second beam reporting timing for the intra-frequency L1/2 CSI measurement/report.

By implementing example embodiment, a wireless device, by indicating, to the base station, the new beam reporting timing for the early CSI measurement/report for a candidate cell which is inter-frequency deployed with a serving cell, may allow the wireless device to have enough time to generate valid CSI report, switch frequency point (e.g., RF chain retuning) back to the serving cell and prepare transmission beam for the CSI report. Otherwise, without the knowledge of the beam reporting timing the wireless device supports for the inter-frequency L1/2 CSI measurement, the base station may incorrectly indicate an uplink transmission occasion, for the CSI report (which is aperiodic report in this case) for the candidate cell, when the wireless device is not ready for the transmission.

In an example, the wireless device, instead of transmitting three separate capability parameters comprising a first one for beam switch timing, a second one for L1 measurement gap and a third one for beam reporting timing, may transmit two capability parameters (per SCS, per cell, per frequency band, or per frequency band combination) comprising a first parameter and a second parameter. The first parameter indicates a number of symbols/slots the wireless device may spend/need to obtain valid CSI measurement of the candidate cell, during which the wireless device may switch receiving beams, switch the frequency point (RF chain retuning) of the serving cell to the frequency point of the candidate cell, identify the RSs of the candidate cell, which may be considered as a combination of beam switch timing and a L1 measurement gap. In existing technologies, the L1 measurement gap comprises a time duration used for switching frequency point (RF chain retuning) and does not comprise a time duration used for beam switching. In an example, the second parameter indicates a beam reporting timing indicating a number of OFDM symbols between the end of the last symbol of the RSs of the one or more candidate target cell and the start of the first symbol of the first slot in which the CSI measurement is transmitted via the serving cell, wherein the one or more candidate target cell and the serving cell may be considered as inter-frequency deployment. By implementing example embodiment, a wireless device, by transmitting two capability parameters indicating a first time gap for measuring a RS, received from a candidate cell in different frequency and in different beam direction from a serving cell, and a second gap for obtaining valid CSI report, may reduce signaling overhead for transmission of the wireless device capability parameters.

In an example, the wireless device, instead of transmitting three separate capability parameters comprising a first one for beam switch timing, a second one for L1 measurement gap and a third one for beam reporting timing, may transmit a single capability parameter (per SCS, per cell, per frequency band, or per frequency band combination) indicating a number of symbols/slots the wireless device may spend/need to obtain valid CSI measurement of the candidate cell, during which the wireless device may switch receiving beams, switch the frequency point (RF chain retuning) of the serving cell to the frequency point of the candidate cell, identify the RSs of the candidate cell, obtain the CSI report, switch back to the frequency point of the serving cell. In existing technologies, the L1 measurement gap comprises a time duration used for switching frequency point and does not comprise a time duration used for beam switching and/or a time duration used for beam reporting. By implementing example embodiment, a wireless device, by transmitting a single capability parameter indicating a time gap for measuring a RS, received from a candidate cell in different frequency and in different beam direction from a serving cell, and obtaining valid CSI report may reduce signaling overhead for transmission of the wireless device capability parameters.

In an example, the wireless device receives from the base station (or the source base station associated with Cell 0) an indication of the layer 1 measurement gap, wherein the indication indicates at least one of: a time offset of the starting position of the layer 1 measurement gap, a periodicity of the layer 1 measurement gap and/or a length of the layer 1 measurement gap.

In an example, the time offset may indicate a number of symbols/slots between the starting slot of a (reference) radio frame and the starting position of the layer 1 measurement gap.

In an example, the time offset may indicate a number of symbols/slots between the last symbol of a second slot on which the command is received and the starting position of the layer 1 measurement gap.

In an example, the indication may be comprised in at least one of: RRC messages comprising configuration parameters of the first cell and the one or more candidate cell and/or the command.

In an example, the layer 1 measurement gap may be a periodic measurement gap, configured in the one or more RRC message with a periodicity.

In an example, the layer 1 measurement gap may be an aperiodic measurement gap, indicated by the DCI (or the MAC CE).

In an example, the layer 1 measurement gap may be a semi-persistent measurement gap, activated by the DCI (or the MAC CE) and with a periodicity configured by the one or more RRC message.

In the example of FIG. 46, the wireless device may determine which RSs of the configured RSs of the candidate cell are to be measured by the wireless device based on the reported beam reporting timing ($X_u$) as described above for the inter-frequency beam reporting.

In an example, the wireless device may determine a CSI reference resource ($n_{CSI\_ref}$) based on the reported beam reporting timing.

In an example, for periodic and/or semi-persistent layer 1/2 CSI reporting for the LTM procedure, the determined CSI reference source, for the layer 1/2 CSI reporting for the LTM procedure, $n_{CSI\_ref}$ is the smallest value greater than or equal to $X \cdot 2^{\mu_{DL}}$, such that it corresponds to a valid downlink slot, where X (e.g., 6, 7, 8 or any integer greater than 5) is greater than the value (e.g., 4 for single CSI-RS/SSB resource, or 5 for multiple CSI-RSs/SSBs) used for intra-frequency layer 1 CSI reporting specified in 3GPP Rel.17. Defining a larger X for identifying the CSI reference source for the layer 1/2 CSI reporting for the LTM procedure, may allow the wireless device to have enough time for retuning RF chain to receive RSs from the candidate cell.

In an example, for aperiodic CSI reporting, if the wireless device is indicated by the DCI to report CSI in the same slot as the CSI request, $n_{CSI\_ref}$ is such that the reference resource is in the same valid downlink slot as the corresponding CSI request, otherwise $n_{CSI\_ref}$ is the smallest value greater than or equal to $$\lfloor Z'_{inter-freq}/N_{symb}^{slot} \rfloor,$$

such that slot n-$n_{CSI\_ref}$ corresponds to a valid downlink slot, where $Z'_{inter-freq}$ (which may be a reported KB as described above for inter-frequency beam reporting) corresponds to new CSI computation delay requirement, different from the existing CSI computation delay requirement (Z') for intra-frequency CSI measurement with respect to FIG. 44A and/or FIG. 44B.

In an example, when periodic or semi-persistent CSI-RS/SSB is used for layer 1 CSI measurements of the candidate cell, the wireless device is not expected to measure channel on the CSI-RS/SSB, of the candidate cell, whose last OFDM symbol is received up to $Z'_{inter-freq}$ (or existing Z as shown in FIG. 44B) symbols before transmission time of the first OFDM symbol of the aperiodic CSI reporting via the serving cell. The wireless device measures channel on the CSI-RS/SSB of the candidate cell, within the layer 1 measurement gap, and whose last OFDM symbol is received up to $Z'_{inter-freq}$ (or existing Z' as shown in FIG. 44B) symbols before a transmission time of the first OFDM symbol of the aperiodic CSI reporting (at T4) via the serving cell.

In the example of FIG. 46, based on one or more above example embodiments, the determined CSI reference resource ($n_{CSI\_ref}$) occurs at T2. The configured/indicated layer 1 measurement gap may end before T2. The wireless device may measure RS1 of the configured RSs (RS0, RS1, RS2, etc.) of the candidate cell, in response to RS1 being no later than T2 (the determined CSI reference resource) and RS1 being within the layer 1 measurement gap. The wireless device may not measure RS0 in response to RS0 being outside of the layer 1 measurement gap. The wireless device may not measure RS2 in response to RS2 being later than T2 and/or in response to RS2 being outside of the layer 1 measurement gap.

In an example, when periodic or semi-persistent CSI-RS/SSB is used for channel measurements of the candidate cell, the wireless device is not expected to measure channel on the CSI-RS/SSB (e.g., RS1 at T1, not RS0 or RS2 in the example of FIG. 46) of the candidate cell, whose last OFDM symbol is received up to $Z'_{inter\text{-}freq}$ symbols before transmission time of the first OFDM symbol of the aperiodic CSI reporting (at T4) via the serving cell. the wireless device measures channel on RS1 of the candidate cell based on RS1 being within the layer 1 measurement gap and the last OFDM symbol of RS1 being no later than T2 (determined based on the beam reporting timing as shown above).

In an example, when measuring, during a layer 1 measurement gap, RSs of a candidate cell for the layer 1 CSI report for the LTM procedure, the wireless device may have difficulties in determining whether a slot is valid downlink slot for layer 1 CSI measurement of the RSs of the candidate cell. In an example, based on existing technologies, a slot in a serving cell is considered to be a valid downlink slot, for layer 1 CSI measurement of the serving cell, if it comprises at least one higher layer configured downlink or flexible symbol and it does not fall within a configured measurement gap for the wireless device. Existing technologies may result in incorrect determination of a valid downlink slot for the layer 1 CSI measurement of the candidate cell.

In an example embodiment, the wireless device may determine whether a slot in a serving cell is considered to be a valid downlink slot for layer 1 CSI measurement of the candidate cell, if it comprises at least one higher layer configured downlink or flexible symbol, it does not fall within a configured layer 3 measurement gap, and it does fall within the layer 1 measurement gap.

In an example, when configured with a layer 3 measurement gap or layer 1 measurement gap, the wireless device may perform the layer 3 or layer 1 measurement for a candidate cell and stop receiving downlink signals from serving cell(s) and transmitting uplink signals to the serving cells. However, when both the layer 3 measurement gap for layer 3 based mobility and the layer 1 measurement gap for LTM procedure are configured, the two measurement gaps may overlap in time domain. A number of candidate cells measured for the layer 3 measurement may be larger than a number of candidate cells to be measured for the layer 1 measurement. The number of candidate cells measured for the layer 3 measurement may be different from the number of candidate cells measured for the layer 1 measurement. The wireless device, based on existing technologies, may have difficulties in determining which measurement (either layer 3 beam/cell measurement or layer 1 CSI measurement) the wireless device will perform and/or on which cell(s) the wireless device will perform the measurement. Existing technologies may result in incorrect or delayed measurement reports, which may increase latency of handover.

In an example embodiment, when both the configured layer 3 measurement gap and the indicated layer 1 measurement gap overlap (partially or fully) in time (over a number of symbols/slots), the wireless device may determine the layer 3 measurement have higher priority than the layer 1 CSI measurement. In an example, the layer 1 CSI measurement is for early beam acquisition which may be obtained in later stage. The wireless device may perform the layer 3 beam/cell measurement in the layer 3 measurement gap, and/or drop/delay/postpone the layer 1 CSI measurement of a candidate cell for the LTM procedure in the layer 1 measurement gap. In an example, the wireless device may report an invalid layer 1 CSI measurement of the candidate cell, or report a CSI measurement of the serving cell, or skip the layer 1 CSI reporting in an uplink transmission occasion of the layer 1 CSI reporting when the wireless device drops the layer 1 CSI measurement of the candidate cell (and/or the serving cell).

In an example embodiment, when both the configured layer 3 measurement gap and the indicated layer 1 measurement gap overlap in time, the wireless device may determine the layer 1 measurement have higher priority than the layer 3 beam/cell measurement. In an example, the layer 1 measurement report is aperiodic report triggered by the DCI/MAC CE and is expected by the base station. The wireless device may perform the layer 1 CSI measurement of a candidate cell for the LTM procedure in the layer 1 measurement gap, and/or drop/delay the layer 3 beam/cell measurement in the layer 3 measurement gap. The wireless device may perform the layer 3 beam/cell measurement in a next layer 3 measurement gap based on a periodicity of the layer 3 measurement gap.

In an example embodiment, when the configured layer 3 measurement gap comprises the indicated layer 1 measurement gap, the wireless device may perform both the layer 1 measurement and the layer 3 measurement. The wireless device may perform the layer 1 measurement on first candidate cell(s) configured for the LTM procedure in the layer 1 measurement gap and perform the layer 3 measurement on second candidate cell(s) configured for layer 3 based mobility.

Based on the one or more example embodiments, the wireless device may determine whether to perform the layer 1 CSI measurement for the LTM procedure or perform the layer 3 beam/cell measurement for layer 3 based mobility or perform both measurements based on whether the layer 3 measurement gap and the layer 1 measurement gap overlap in time, whether the layer 3 measurement has higher priority than the layer 1 CSI measurement, etc. Example embodiment may enable the wireless device to provide the required measurement report timely.

As shown in FIG. 46, based on the layer 1 measurement over RS1 of the candidate cell at T1, the wireless device may transmit the L1/2 CSI report for the candidate cell at T4.

In an example, the L1/2 CSI report may comprise a cell index indicating the candidate cell (Cell 1), a L1-RSRP value and a RS index indicating RS1 on which the wireless device obtains the L1-RSRP value.

In an example, the L1/2 CSI report may not comprise a cell index. The RS index reported in the L1/2 CSI report may be associated with a candidate cell based on higher layer configuration parameters (e.g., CSI-SSB-ResourceSet IE as shown in FIG. 41). The base station may obtain the cell index of the candidate cell based on the association between the RS index and a PCI index of the candidate cell.

In an example, the L1/2 CSI report may indicate the RS index of the candidate cell (and may not indicate the L1-RSRP of the RS index), when the L1-RSRP of the RS index of the candidate cell (Cell 1) is bigger (or is a configured amount bigger) than the L1-RSRP of the serving cell (Cell 0), or when the L1-RSRP of the RS index of Cell 1 is greater than a first absolute value and/or the L1-RSRP of Cell 0 is lower than a second absolute value.

In an example, the L1/2 CSI report may indicate a L1-RSRP of a RS of the serving cell (Cell 0)(and may not indicate any RS or L1-RSRP of Cell 1), when the L1-RSRP of the serving cell (Cell 0) is bigger (or is a configured amount bigger) than the L1-RSRP of the candidate cell (Cell 1), or when the L1-RSRP of Cell 0 is greater than a first absolute value and/or the L1-RSRP of Cell 1 is lower than a second absolute value.

In an example, the base station, based on the L1/2 CSI report, may indicate the wireless device to perform an early TA acquisition followed by a LTM procedure, e.g., based on example embodiments described above with respect to FIG. 39.

Based on one or more example embodiments of FIG. 46, the wireless device may determine the right time for measuring RSs of a candidate cell and determine the right RS(s) for the measurement. Example embodiments may improve accuracy of L1/2 CSI report of a candidate cell for a LTM procedure.

FIG. 46 may be extended to further improve the layer 1/2 CSI measurement and report.

In an example embodiment, the base station may configure (or indicate/trigger) the wireless device, a layer 1 CSI measurement/report gap, based on one or more wireless device capability parameters comprising a beam switch timing, a layer 1 measurement gap and/or a beam reporting timing (e.g., based on example embodiments described above with respect to FIG. 46), wherein the configured layer 1 CSI measurement/report gap may be equal to or bigger than a summation of the beam switch timing and the layer 1 measurement gap. The layer 1 CSI measurement/report gap may be configured as a time duration such that the layer 1 CSI measurement/report gap end no later than a number of symbols/slots (which is determined based on the beam reporting timing) before the transmission timing for the layer 1 CSI report. During the layer 1 CSI measurement/report gap, the wireless device performs beam switching from a beam direction for the serving cell to beam direction(s) for the candidate cell, RF chain retuning to the frequency of the candidate cell, identifying RSs of the candidate cell, obtaining CSI report, RF chain retuning back to the frequency of the serving cell, etc. The wireless device, in response to receiving the layer 1 CSI measurement/report gap, may perform layer 1/2 CSI measurement of a candidate cell within the layer 1 CSI measurement/report gap and transmit the layer 1/2 CSI measurement report to the base station at an uplink transmission occasion, by ignoring (or without applying) the beam switch timing and/or the beam reporting timing as implemented in existing technologies.

Figure 47:
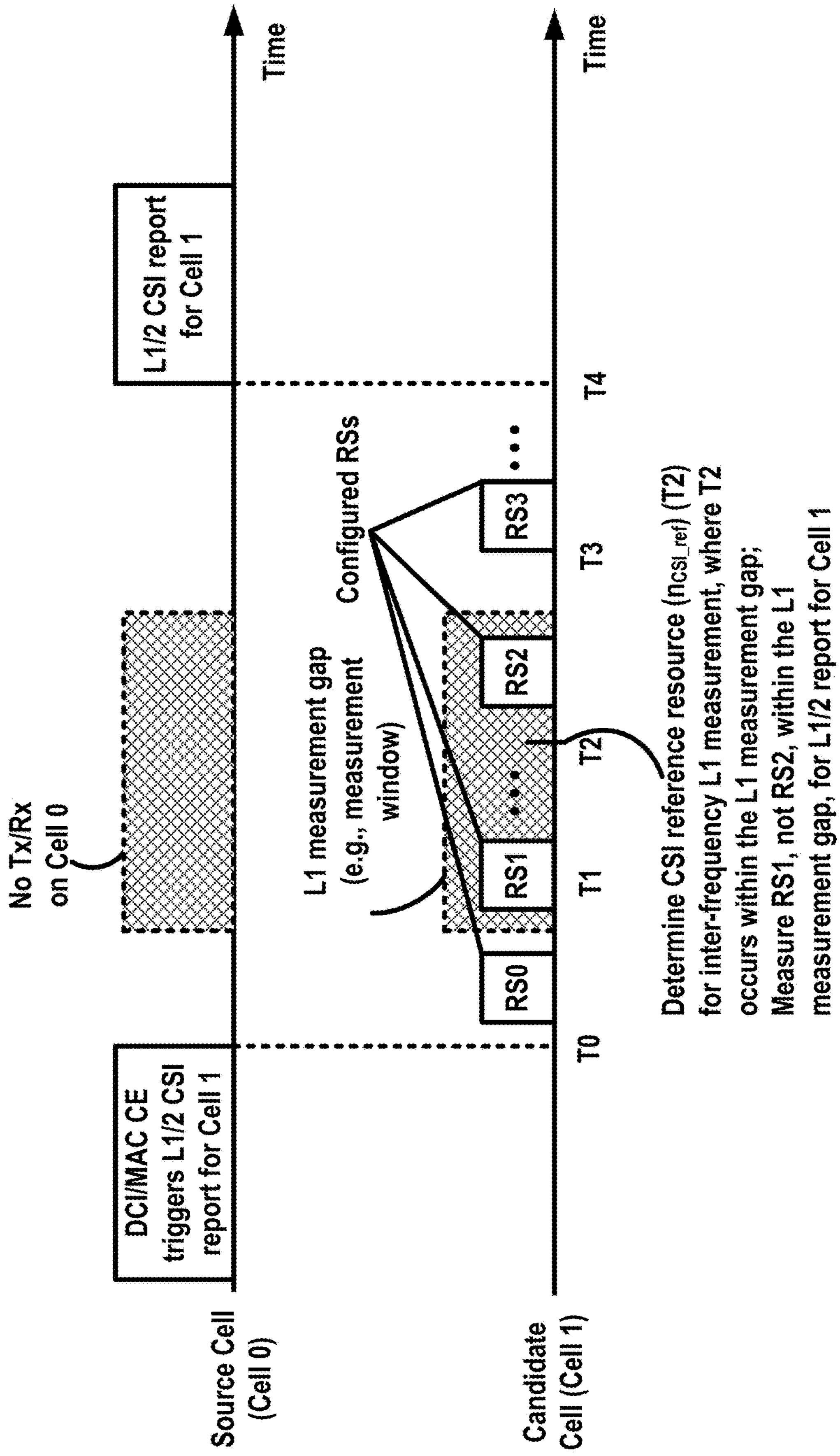
FIG. 47 shows an example embodiment of layer 1/2 CSI report for a layer 1/2 triggered mobility.

FIG. 47 shows an example embodiment of layer 1/2 CSI measurement and report for a candidate target cell for a LTM procedure, based on example embodiment(s) of FIG. 46.

In the example of FIG. 47, the determined CSI reference source (T2), e.g., based on a beam reporting timing, may be within a configured/indicated L1 measurement gap (e.g., the shadowed area in FIG. 47). Other than T2 is within the L1 measurement gap in FIG. 47, the rest (configurations/procedures) of FIG. 46 may be applied in a same/similar way for FIG. 47.

In the example of FIG. 47, based on one or more above example embodiments, the determined CSI reference resource ($n_{CSI\_ref}$) occurs at T2. The layer 1 measurement gap may end after T2. The wireless device may measure RS1 of the configured RSs (RS0, RS1, RS2, RS3, etc.) of the candidate cell, in response to RS1 being no later than T2 (the determined CSI reference resource) and RS1 being within the layer 1 measurement gap. The wireless device may not measure RS0 and RS3 in response to RS0 and RS3 being outside of the layer 1 measurement gap. The wireless device may not measure RS2 in response to RS2 being later than T2, even RS2 being within the layer 1 measurement gap.

In an example, when periodic or semi-persistent CSI-RS/SSB is used for channel measurements of the candidate cell, the wireless device is not expected to measure channel on the CSI-RS/SSB (e.g., RS1 at T1, not RS2 or RS3 in the example of FIG. 47) of the candidate cell, whose last OFDM symbol is received up to $Z'_{inter\text{-}freq}$ (or existing Z' as shown in FIG. 44B) symbols before transmission time of the first OFDM symbol of the aperiodic CSI reporting (at T4) via the serving cell. The wireless device measures channel on the CSI-RS/SSB of the candidate cell, within the layer 1 measurement gap, and whose last OFDM symbol is received up to $Z'_{inter\text{-}freq}$ (or existing Z as shown in FIG. 44B) symbols before a transmission time of the first OFDM symbol of the aperiodic CSI reporting (at T4) via the serving cell.

As shown in FIG. 47, based on the layer 1 measurement over RS1 of the candidate cell at T1, the wireless device may transmit the L1/2 CSI report for the candidate cell at T4.

In an example, the base station, based on the L1/2 CSI report, may indicate the wireless device to perform an early TA acquisition followed by a LTM procedure, or perform the LTM procedure without the early TA acquisition, e.g., based on example embodiments described above with respect to FIG. 39.

Based on one or more example embodiments of FIG. 47, the wireless device may determine the right time for measuring RSs of a candidate cell and/or determine the right RS for the measurement. Example embodiments may improve accuracy of L1/2 CSI report of a candidate cell for a LTM procedure.

Figure 48:
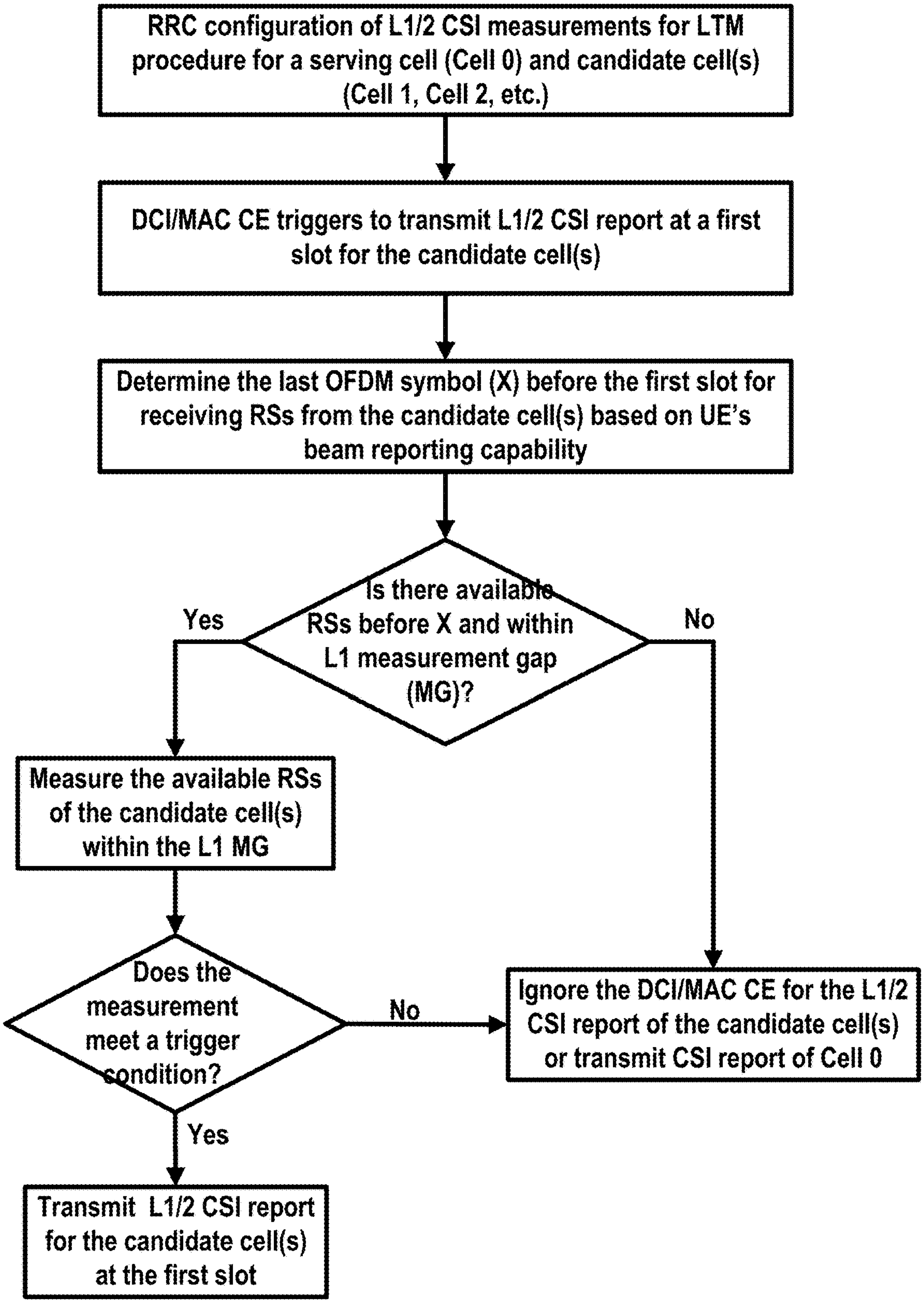
FIG. 48 shows an example flowchart of layer 1/2 CSI report for a layer 1/2 triggered mobility.

FIG. 48 shows an example flowchart of layer 1/2 CSI measurement and report for a candidate target cell for a LTM procedure, based on example embodiments described above with respect to FIG. 46 and/or FIG. 47.

In the example of FIG. 48, a wireless device receives from a base station RRC configuration (or RRC messages) of L1/2 CSI measurements for LTM procedure for a serving cell (e.g., Cell 0) and candidate cell(s)(e.g., Cell 1, Cell 2, etc.). The RRC configuration may be implemented based on example embodiments described above with respect to FIG. 46 and/or FIG. 47.

In an example, before receiving the RRC configuration of L1/2 CSI measurements, the wireless device may perform layer 3 measurements for layer 3 based mobility, e.g., based on example embodiments described above with respect to FIG. 32, FIG. 35 and/or FIG. 39.

In the example of FIG. 48, the wireless device receives a DCI/MAC CE triggering to transmit L1/2 CSI report (or early CSI report as described above with respect to FIG. 39) at a first slot for the candidate cell(s). The L1/2 CSI report, triggered by the DCI/MAC CE, may be an aperiodic CSI report, or a semi-persistent CSI report.

In an example, when configured with periodic L1/2 CSI report for the candidate cell(s), the wireless device may not receive the DCI/MAC CE. The DCI/MAC CE may be absent in FIG. 48.

In the example of FIG. 48, the wireless device may determine the last OFDM symbol (X)(or the CSI reference resource $n_{CSI-ref}$), for receiving RSs from the candidate cell(s) based on UE's beam reporting capability, before the first slot on which the wireless device will transmit the L1/2 CSI report for the candidate cell(s). The UE's beam reporting capability may be a number of symbols indicated by a value of beam reporting timing based on example embodiments described above with respect to FIG. 46 and/or FIG. 47. The last OFDM symbol (X) or the CSI reference resource ($n_{CSI-ref}$) may be implemented based on example embodiments described above with respect to FIG. 46 and/or FIG. 47.

In the example of FIG. 48, the wireless device may determine whether there is available RSs, of a plurality of RSs configured on the candidate cell(s) for the L1/2 CSI report, within a L1 measurement gap (MG) and whose last OFDM symbol is no later than X. The L1 MG may be implemented based on example embodiments described above with respect to FIG. 46 and/or FIG. 47.

In the example of FIG. 48, in response to there being available RSs being within the L1 MG and whose last OFDM symbol being no later than X, the wireless device may measure the available RSs of the candidate cell(s) within the L1 MG.

In the example of FIG. 48, the wireless device may determine whether the measurement of the candidate cell(s) meets a (report) trigger condition. In an example, the report trigger condition may comprise at least one of: L1-RSRP measured over the available RSs of at least one of the candidate cell(s) being greater than (or being a configured amount greater than) L1-RSRP of the serving cell (Cell 0); L1-RSRP measured over the available RSs of at least one of the candidate cell(s) being greater than a configured first absolute value; L1-RSRP value of the serving cell being lower than a configured second absolute value.

In the example of FIG. 48, in response to the measurement of the candidate cell(s) meeting one of the (report) trigger conditions, the wireless device may transmit the L1/2 CSI report for the candidate cell(s) at the first slot. The contents of the L1/2 CSI report may be implemented based on example embodiments described above with respect to FIG. 46 and/or FIG. 47.

In the example of FIG. 48, in response to no available RSs being within the L1 MG last OFDM symbol of the RSs being later than X, the wireless device may skip measuring L1/2 CSI for the candidate cell(s) within the L1 MG. The wireless device may ignore the DCI/MAC CE triggering the L1/2 CSI report for the candidate cell(s) and may not transmit L1/2 CSI report at the first slot.

In an example, in response to no available RSs being within the L1 MG last OFDM symbol of the RSs being later than X, the wireless device may skip measuring L1/2 CSI for the candidate cell(s) within the L1 MG. The wireless device may transmit CSI report of Cell 0 at the first slot. The CSI report may comprise a (valid) L1-RSRP of an RS of Cell 0 and/or may comprise an indication (e.g., with an (invalid) value of L1-RSRP associated with the candidate cell(s)) indicating no (valid) L1-RSRP is obtained for the candidate cell(s).

In the example of FIG. 48, in response to the measurement of the candidate cell(s) not meeting the (report) trigger conditions, the wireless device may ignore the DCI/MAC CE triggering the L1/2 CSI report for the candidate cell(s) and may not transmit L1/2 CSI report at the first slot.

In an example, in response to the measurement of the candidate cell(s) not meeting the (report) trigger conditions, the wireless device may transmit CSI report of Cell 0 at the first slot. The CSI report may comprise a (valid) L1-RSRP of an RS of Cell 0 and/or may not comprise a value of L1-RSRP associated with the candidate cell(s).

Based on one or more example embodiments of FIG. 48, the wireless device may determine the right time for measuring RSs of a candidate cell, determine the right RS for the measurement and/or determine the right contents of L1/2 CSI report for a LTM procedure. Example embodiments may improve accuracy of L1/2 CSI report of a candidate cell for the LTM procedure.

In an example embodiment, a wireless device receives from a first cell, a command indicating an uplink transmission, at a first slot, of a CSI measurement of one or more candidate cells for a LTM procedure. The first cell is a serving cell (e.g., PCell or SCell). The wireless device determines, a last symbol, before the first slot, for receiving RSs for the CSI measurement, based on a beam report timing. The wireless device transmits, at the first slot, the CSI measurement of first RSs of the one or more candidate cell, wherein the first RSs are received no later than the last symbol and within a layer 1 measurement gap.

According to an example embodiment, the command comprises at least one of a DCI and/or a MAC CE.

According to an example embodiment, the RSs comprises at least one of CSI-RSs, SSBs, and/or DMRSs.

According to an example embodiment, the CSI measurement comprise at least one of: L1-RSRP value(s), an indication of a first RS of the RSs, and/or an indication of a second cell of the one or more candidate cell, where the L1-RSRP is measured over the first RS of the second cell.

According to an example embodiment, the first cell and the one or more candidate cell are determined as inter-frequency operation/deployment, wherein frequency resources of RSs of the one or more candidate cell are not covered by (or fully/partially within) any of active BWPs of a PCell and SCells configured for the wireless device and are covered by some of configured BWPs of the PCell and the SCells, or frequency resources of the RSs are not covered by any of the configured BWPs of the PCell and the SCells, wherein the first cell is the PCell or one of the SCells.

According to an example embodiment, the wireless device receives RRC messages comprising configuration parameters of the first cell and the one or more candidate cell, wherein the first cell is different from any one of the one or more candidate cell. The configuration parameters of the first cell indicate a plurality of CSI resources for the CSI measurement, wherein the plurality of CSI resources comprise at least one of: a first CSI resource associated with a first PCI index indicating the first cell and a second CSI resource associated with a second PCI index indicating one of the one or more candidate cell, wherein the second PCI index is different from the first PCI index. The configuration parameters indicate, for each CSI resource of the plurality of CSI resources: frequency resources, a periodicity in time domain and a transmission power, wherein the CSI resource comprises at least one of SSB or CSI-RS.

According to an example embodiment, the wireless device receives, for the CSI measurement, the first RSs of the one or more candidate cell, wherein the first RSs are received no later than the determined last symbol and within the layer 1 measurement gap.

According to an example embodiment, the wireless device does not receive/measure, for the CSI measurement, second RSs of the one or more candidate cell, wherein time resources of the second RSs occurs after the determined last symbol or outside the layer 1 measurement gap.

According to an example embodiment, the CSI measurement of the one or more candidate cell is not based on second RSs of the one or more candidate cell, in response to the second RSs being received after the determined last symbol and outside the layer 1 measurement gap.

According to an example embodiment, the wireless device transmits RRC message comprising wireless device capability parameters indicating the beam report timing and a second beam report timing, wherein the beam report timing is different from a second beam report timing. In an example, the beam report timing indicates a number of OFDM symbols between the end of the last symbol of the RSs of the one or more candidate target cell and the start of the first symbol of the first slot in which the CSI measurement is transmitted via the first cell. The second beam report timing indicates a number of OFDM symbols between the end of the last symbol of RSs of the first cell and the start of the first symbol of the first slot in which the CSI measurement is transmitted via the first cell.

According to an example embodiment, the wireless device transmits RRC message comprising wireless device capability parameters indicating the layer 1 measurement gap, wherein the layer 1 measurement gap is different from a layer 3 measurement gap. The layer 1 measurement gap indicates a number of slots (or symbols) during which the wireless device performs the CSI measurements on the one or more candidate target cell and/or stops receiving downlink signals and transmitting uplink signals via the first cell.

According to an example embodiment, the wireless device receives from the base station an indication of the layer 1 measurement gap, wherein the indication indicates at least one of: a time offset of the starting position of the layer 1 measurement gap, a periodicity of the layer 1 measurement gap and/or a length of the layer 1 measurement gap. In an example, the time offset may indicate a number of symbols/slots between the starting slot of a radio frame and the starting position of the layer 1 measurement gap. In an example, the time offset may indicate a number of symbols/slots between the last symbol of a second slot on which the command is received and the starting position of the layer 1 measurement gap. In an example, the indication may be comprised in at least one of: RRC messages comprising configuration parameters of the first cell and the one or more candidate cell and/or the command.

According to an example embodiment, the layer 1 measurement gap may be a periodic gap, configured in RRC message with a periodicity.

According to an example embodiment, the layer 1 measurement gap may be an aperiodic gap, indicated by the command.

According to an example embodiment, the layer 1 measurement gap may be a semi-persistent gap, activated by the command and with a periodicity configured by RRC message.

According to an example embodiment, the CSI measurement may comprise an indication of: at least one of the first RSs of the one or more candidate cell, in response to the at least one of the one or more candidate cell having better channel quality than the first cell; or at least one of second RSs of the serving cell, in response to none of the one or more candidate cell having better channel quality than the first cell.

According to an example embodiment, the LTM procedure comprises at least one of: receiving a DCI indicating to transmit a preamble via a first candidate cell of the one or more candidate cell, transmitting the preamble to the first candidate cell, receiving a MAC CE indicating to switch from the first cell to the first candidate cell as the serving cell and/or switching to the first candidate cell as the serving cell. In an example, the one or more candidate cell are not activated when the first cell is the serving cell before receiving the MAC CE indicating to switch from the first cell to the first candidate cell.

According to an example embodiment, the first cell is a PCell.

According to an example embodiment, the uplink transmission of the CSI measurement is via at least one of: a PUSCH and/or a PUCCH.

According to an example embodiment, the uplink transmission of the CSI measurement comprises an aperiodic CSI report.

According to an example embodiment, the uplink transmission of the CSI measurement comprises a semi-persistent CSI report via a PUSCH or a PUCCH.

According to an example embodiment, the uplink transmission of the CSI measurement comprises a periodic CSI report.

What is claimed is:

1. A method comprising:

transmitting, by a wireless device, one or more first radio resource control (RRC) messages comprising wireless device capability parameters indicating that the wireless device supports, for a layer 1 and/or layer 2 triggered mobility (LTM) procedure and within a measurement window, synchronization signal block (SSB) based inter-frequency layer 1 reference signal received power (L1 RSRP) measurement of a candidate cell with a received time difference, between the candidate cell and a serving cell, being larger than a cyclic prefix (CP) length;

receiving one or more second RRC messages comprising a measurement configuration indicating a first measurement window;

receiving, via a serving cell, a command indicating an uplink transmission of a L1 RSRP report of the candidate cell for the LTM procedure, wherein the serving cell and the candidate cell are inter-frequency cells; and transmitting the L1 RSRP report of one or more first SSBs of the candidate cell, wherein the one or more first SSBs are received:

via the candidate cell with the received time difference, between the candidate cell and the serving cell, being greater than the CP length; and within the first measurement window.

2. The method of claim 1, wherein the first measurement window comprises a measurement gap for performing measurements for the L1 RSRP report.

3. The method of claim 2, wherein the measurement gap indicates a minimum number of orthogonal frequency division multiplexing (OFDM) symbols for performing measurements for the L1 RSRP report.

4. The method of claim 1, wherein the L1 RSRP report comprises at least one of:

a layer 1 reference signal received power (L1-RSRP);

an indication of the one or more first SSBs; and an indication of the candidate cell.

5. The method of claim 1, wherein the L1 RSRP report of the candidate cell is not based on second SSBs of the candidate cell in response to the second SSBs being received outside the first measurement window.

6. The method of claim 1, wherein the first measurement window indicates a number of slots or symbols during which the wireless device:

performs measurements on the candidate cell; and stops receiving downlink signals and transmitting uplink signals via the serving cell.

7. The method of claim 1, wherein the first SSBs are received, via the candidate cell, no later than a symbol before a first slot for the uplink transmission of the L1 RSRP, based on a beam report timing associated with the LTM procedure.

8. A wireless device comprising:

one or more processors; and memory storing instructions that, when executed by the one or more processors, cause the wireless device to:

transmit one or more first radio resource control (RRC) messages comprising wireless device capability parameters indicating that the wireless device supports, for a layer 1 and/or layer 2 triggered mobility (LTM) procedure and within a measurement window, synchronization signal block (SSB) based inter-frequency layer 1 reference signal received power (L1 RSRP) measurement of a candidate cell with a received time difference, between the candidate cell and a serving cell, being larger than a cyclic prefix (CP) length;

receive one or more second RRC messages comprising a measurement configuration indicating a first measurement window;

receive, via a serving cell, a command indicating an uplink transmission of a L1 RSRP report of the candidate cell for the LTM procedure, wherein the first cell and the candidate cell are inter-frequency cells; and transmit the L1 RSRP report of one or more first SSBs of the candidate cell, wherein the one or more first SSBs are received:

via the candidate cell with the received time difference, between the candidate cell and the serving cell, being greater than the CP length; and within the first measurement window.

9. The wireless device of claim 8, wherein the first measurement window comprises a measurement gap for performing measurements for the L1 RSRP report.

10. The wireless device of claim 9, wherein the measurement gap indicates a minimum number of orthogonal frequency division multiplexing (OFDM) symbols for performing measurements for the L1 RSRP report.

11. The wireless device of claim 8, wherein the L1 RSRP report comprises at least one of:

a layer 1 reference signal received power (L1-RSRP);

an indication of the one or more first SSBs; and an indication of the candidate cell.

12. The wireless device of claim 8, wherein the L1 RSRP report of the candidate cell is not based on second SSBs of the candidate cell in response to the second SSBs being received outside the first measurement window.

13. The wireless device of claim 8, wherein the first measurement window indicates a number of slots or symbols during which the wireless device:

performs measurements on the candidate cell; and stops receiving downlink signals and transmitting uplink signals via the serving cell.

14. The wireless device of claim 8, wherein the first SSBs are received, via the candidate cell, no later than a symbol before a first slot for the uplink transmission of the L1 RSRP, based on a beam report timing associated with the LTM procedure.

15. A non-transitory computer-readable medium comprising instructions that, when executed by one or more processors of a wireless device, cause the wireless device to:

transmit one or more first radio resource control (RRC) messages comprising wireless device capability parameters indicating that the wireless device supports, for a layer 1 and/or layer 2 triggered mobility (LTM) procedure and within a measurement window, synchronization signal block (SSB) based inter-frequency layer 1 reference signal received power (L1 RSRP) measurement of a candidate cell with a received time difference, between the candidate cell and a serving cell, being larger than a cyclic prefix (CP) length;

receive one or more second RRC messages comprising a measurement configuration indicating a first measurement window;

receive, via a serving cell, a command indicating an uplink transmission of a L1 RSRP report of the candidate cell for the LTM procedure, wherein the first cell and the candidate cell are inter-frequency cells; and transmit the L1 RSRP report of one or more first SSBs of the candidate cell, wherein the one or more first SSBs are received:

via the candidate cell with the received time difference, between the candidate cell and the serving cell, being greater than the CP length; and within the first measurement window.

16. The non-transitory computer-readable medium of claim 15, wherein the first measurement window comprises a measurement gap for performing measurements for the L1 RSRP report.

17. The non-transitory computer-readable medium of claim 15, wherein the L1 RSRP report comprises at least one of:

a layer 1 reference signal received power (L1-RSRP);

an indication of the one or more first SSBs; and an indication of the candidate cell.

18. The non-transitory computer-readable medium of claim 15, wherein the L1 RSRP report of the candidate cell is not based on second SSBs of the candidate cell in response to the second SSBs being received outside the first measurement window.

19. The non-transitory computer-readable medium of claim 15, wherein the first measurement window indicates a number of slots or symbols during which the wireless device:

performs measurements on the candidate cell for the L1 RSRP report; and stops receiving downlink signals and transmitting uplink signals via the serving cell.

20. The non-transitory computer-readable medium of claim 15, wherein the first SSBs are received, via the candidate cell, no later than a symbol before a first slot for the uplink transmission of the L1 RSRP, based on a beam report timing associated with the LTM procedure.

* * * * *